(12) United States Patent
Katcher et al.

(10) Patent No.: US 12,521,416 B2
(45) Date of Patent: Jan. 13, 2026

(54) ANTI-AGING COMPOSITIONS AND USES THEREOF

(71) Applicant: Yuvan Research, Inc., Mountain View, CA (US)

(72) Inventors: Harold Katcher, Salt Lake, UT (US); Akshay Sanghavi, Mumbai (IN)

(73) Assignee: Yuvan Research, Inc., Mountain View, CA (US)

( * ) Notice: Subject to any disclaimer, the term of this patent is extended or adjusted under 35 U.S.C. 154(b) by 0 days.

(21) Appl. No.: 17/569,282

(22) Filed: Jan. 5, 2022

(65) Prior Publication Data

US 2022/0233587 A1 Jul. 28, 2022

Related U.S. Application Data

(60) Provisional application No. 63/134,556, filed on Jan. 6, 2021.

(51) Int. Cl.
| | | |
|---|---|---|
| *A61K 35/16* | (2015.01) | |
| *A61K 9/00* | (2006.01) | |
| *A61K 35/19* | (2015.01) | |
| *A61K 38/17* | (2006.01) | |
| *A61P 39/00* | (2006.01) | |

(52) U.S. Cl.
CPC ............ *A61K 35/16* (2013.01); *A61K 9/0019* (2013.01); *A61K 35/19* (2013.01); *A61K 38/177* (2013.01); *A61K 38/1774* (2013.01); *A61P 39/00* (2018.01)

(58) Field of Classification Search
None
See application file for complete search history.

(56) References Cited

U.S. PATENT DOCUMENTS

| 10,905,779 | B2 | 2/2021 | Braithwaite | |
| 2015/0157664 | A1* | 6/2015 | Wyss-Coray | A61P 27/06 |
| | | | | 424/530 |
| 2017/0232118 | A1 | 8/2017 | Braithwaite et al. | |
| 2017/0296627 | A1 | 10/2017 | Tarnopolsky | |
| 2018/0110839 | A1* | 4/2018 | Bell | A61K 35/16 |
| 2019/0321449 | A1 | 10/2019 | Bell | |
| 2020/0129549 | A1* | 4/2020 | Castro | A61K 38/38 |
| 2020/0352994 | A1 | 11/2020 | Wyss-Coray et al. | |
| 2021/0315932 | A1 | 10/2021 | Braithwaite | |
| 2024/0033279 | A1 | 2/2024 | Sanghavi | |
| 2024/0207320 | A1 | 6/2024 | Eerdeng | |

FOREIGN PATENT DOCUMENTS

| CN | 110787187 A | 2/2020 |
| EP | 3660143 A2 | 6/2020 |
| WO | 02078742 A2 | 10/2002 |
| WO | 2012053976 A1 | 4/2012 |
| WO | 2015088915 A1 | 6/2015 |
| WO | 2018027116 A1 | 2/2018 |
| WO | 2018150440 A1 | 8/2018 |
| WO | 2018200560 A1 | 11/2018 |
| WO | 2019200063 A1 | 10/2019 |
| WO | 2019211285 A1 | 11/2019 |
| WO | 2019231562 A1 | 12/2019 |
| WO | 2019238693 A1 | 12/2019 |
| WO | 2020070700 A2 | 4/2020 |
| WO | 2020214100 A2 | 10/2020 |
| WO | 2021177473 A1 | 9/2021 |
| WO | 2022150818 A1 | 7/2022 |
| WO | 2022204350 A1 | 9/2022 |
| WO | 2022204955 A1 | 10/2022 |
| WO | 2022224644 A1 | 10/2022 |
| WO | 2024011127 A1 | 1/2024 |
| WO | 2024102965 A1 | 5/2024 |
| WO | 2024153847 A1 | 7/2024 |

OTHER PUBLICATIONS

Guo et al. Exosomes derived from platelet-rich plasma promote the re-epithelization of chronic cutaneous wounds via activation of YAP in a diabetic rat model Theranostics 2017, vol. 7, Issue 1: 81-96 (Year: 2017).*
Araki et al. Optimized Preparation Method of Platelet-Concentrated Plasma and Noncoagulating Platelet-Derived Factor Concentrates: Maximization of Platelet Concentration and Removal of Fibrinogen, Tissue Engineering Part C, vol. 18, No. 3: 176-185 (Year: 2012).*
Spencer et al. Out with the old, in with the new: Could plasma exchange be used to fill a therapeutic gap in neurology? Journal of the Neurological Sciences 432 (2022) 120056 (Year: 2022).*
Natesan et al. PEGylated Platelet-Free Blood Plasma-Based Hydrogels for Full-Thickness Wound Regeneration 2019 Advances in Wound Care, vol. 8, No. 7: 323-340 (Year: 2019).*
Graham et al. Naturalizing mouse models for immunology Nature Immunology | vol. 22 | Feb. 2021 | 111-117 | (Year: 2021).*
Jackson Lab (" Body Weight Information for NSG(005557)"; Accessed Jan. 30, 2025), (Year: 2025).*
Pilny et al. Clinical Hematology of Rodent Species, Vet Clin Exot Anim, 2008, 523-533 (Year: 2008).*
Wu et al. Separation and characterization of extracellular vesicles from human plasma by asymmetrical flow field-flow fractionation, Analytica Chimica Acta 1127 (2020) 234-245 (Year: 2020).*
Crawford et al. The Presence of contractile proteins in platelet microparticles isolated from human and animal platelet free plasma, British Journal of Hematology, 1971, 21, 53-69 (Year: 1971).*
Lugli G et al. (2015) Plasma Exosomal miRNAs in Persons with and without Alzheimer Disease: Altered Expression and and Prospects for Biomarkers. PLoS One 10(10): (Year: 2015).*
Wang FASEB J. 32, 5899å5912 (2018). (Year: 2018).*
Smolarz et al., Proteomes 2019, 7, 18; (Year: 2019).*

(Continued)

*Primary Examiner* — Maria G Leavitt
*Assistant Examiner* — Alexandra F Connors
(74) *Attorney, Agent, or Firm* — Morrison & Foerster LLP

(57) ABSTRACT

Provided herein is a composition comprising a concentrated purified plasma fraction that can be used to treat age-related disorders. Also provided herein are methods for producing a composition comprising a concentrated purified plasma fraction.

18 Claims, 21 Drawing Sheets

(56) References Cited

OTHER PUBLICATIONS

Anonymous (Apr. 30, 2014-May 3, 2014, e-pub. Apr. 25, 2014). "Third International Meeting of ISEV 2014: Rotterdam, The Netherlands, Apr. 30-May 3, 2014," Journal of Extracellular Vesicles 3(1) 24214, 157 pages, as retrieved on https://www.tandfonline.com/doi/pdf/10.3402/jev.v3.24214.

Cvjetkovic, A. et al. (Apr. 2018). "Proteomic Analysis of Tumour Tissue Resident Evs in Breast Cancer," Journal of Extracellular Vesicles 7(20):87.

Flores, J. et al. (Sep. 25, 2018). "Caspase-1 Inhibition Alleviates Cognitive Impairment and Neuropathology in an Alzheimer's Disease Mouse Model," Nature Communications 9(3916):1-14.

Gamez-Valero, A. et al. (Sep. 19, 2016). "Size-Exclusion Chromatography-Based Isolation Minimally Alters Extracellular Vesicles' Characteristics Compared To Precipitating Agents," Scientific Reports 6(1):1-9.

International Search Report and Written Opinion of the International Searching Authority mailed Apr. 14, 2022, for Patent Application No. PCT/US22/070048, filed Jan. 5, 2022, 17 pages.

Konoshenko, M.Y. et al. (Jan. 30, 2018). "Isolation of Extracellular Vesicles: General Methodologies and Latest Trends," Biomed Research International 2018(8545347):1-27.

Lobb, R.J. et al. (Jul. 17, 2015). "Optimized Exosome Isolation Protocol for Cell Culture Supernatant and Human Plasma," Journal of Extracellular Vesicles 4(27031):1-11.

Chen, B. H. et al. (Sep. 2016). "DNA Methylation-Based Measures of Biological Age: Meta-Analysis Predicting Time to Death," Aging (Albany NY) 8(9):1844-1859.

Horrington, E. M. et al. (1960). "Age Changes in the Bones, Blood Pressure, and Diseases of Rats in Parabiosis," Gerontology 4(1):21-31.

Horvath, S. et al. (May 8, 2020). "Reversing Age: Dual Species Measurement of Epigenetic Age With a Single Clock," bioRxiv, 30 pages, as retrieved on https://www.biorxiv.org/content/10.1101/2020.05.07.082917v1.

Ludwig, F. C. et al. (Nov. 1972). "Mortality in Syngeneic Rat Parabionts of Different Chronological Age," Transactions of the New York Academy of Sciences 34(7 Series II):582-587.

Maas, S. L. et al. (Oct. 19, 2014). "Quantification and Size-Profiling of Extracellular Vesicles Using Tunable Resistive Pulse Sensing," JoVE (Journal of Visualized Experiments)(92):e51623, 7 pages.

Petkovich, D. A. et al. (Apr. 4, 2017). "Using DNA Methylation Profiling to Evaluate Biological Age and Longevity Interventions," Cell Metabolism 25(4):954-960.

Scudellari, M. (Jan. 22, 2015). "Blood to Blood," Nature 517(7535):426-429.

Swaim, A. F. et al. (2010, e-pub. Oct. 20, 2010). "Platelets Contribute to Allograft Rejection Through Glutamate Receptor Signaling," The Journal Of Immunology 185(11):6999-7006.

Thompson, M. J. (Mar. 2017, e-pub. Mar. 26, 2017). "An Epigenetic Aging Clock for Dogs and Wolves," Aging (Albany NY) 9(3):1055-1068.

Zhang, H. et al. (Mar. 2018, e-pub. Sep. 1, 2018). "Identification of Distinct Nanoparticles and Subsets of Extracellular Vesicles by Asymmetric Flow Field-Flow Fractionation," Nature Cell Biology 20(3):332-343, 26 pages.

Zhang, Y. et al. (Dec. 2019, e-pub. Jul. 1, 2019). "Lncrna MALAT1 Promotes Osteoarthritis by Modulating Mir-150-5p/AKT3 Axis," Cell & Bioscience 9(1):1-12.

Abramowicz, A. et al. (Jun. 2, 2020). "The Long and Short of It: The Emerging Roles of Non-Coding RNA in Small Extracellular Vesicles," Cancers 12(6):1445, 17 pages.

International Preliminary Report on Patentability, issued Jul. 4, 2023, for PCT Application No. PCT/US22/070048, filed Jan. 5, 2022, 9 pages.

Stoeger, T. et al. (Dec. 2022, e-pub. Dec. 9, 2022). "Aging Is Associated With a Systemic Length-Associated Transcriptome Imbalance," Nature Aging 2(12):1191-1206, 30 pages.

College of Veterinary Medicine (2024). "Chemistry (Cobras)," Cornell University, 2 pages, as retrieved on Jul. 31, 2024 from https://www.vet.cornell.edu/animal-health-diagnostic-center/laboratories/clinical-pathology/reference-intervals/chemistry-cobas.

College of Veterinary Medicine (2024). "Hematology (Advia 2120): Routine Hemogram Reference Intervals," Cornell University, 4 pages, as retrieved on Jul. 31, 2024 from https://www.vet.cornell.edu/animal-health-diagnostic-center/laboratories/clinical-pathology/reference-intervals/hematology-advia-2120.

Dicorato, A. (Apr. 27, 2023). "Genomes From 240 Mammalian Species Reveal What Makes the Human Genome Unique," Broad Institute, as retrieved on https://www.broadinstitute.org/news/zoonomia, 6 pages.

Forn-Cuní, G. et al. (Feb. 3, 2017). "Conserved Gene Regulation During Acute Inflammation Between Zebrafish and Mammals," Scientific Reports 7(41905):1-9.

Hirano, T. (2021, e-pub. Dec. 18, 2020). "IL-6 in Inflammation, Autoimmunity and Cancer," Int Immunol. 33 (3):127-148.

Ibrahim, S.A. et al. (Jan. 2024). "Histology, Extracellular Vesicles," StatPearls, NCBI Bookshelf, last updated Aug. 14, 2023, 8 pages.

International Search Report and Written Opinion of the International Searching Authority mailed Nov. 8, 2023, for Patent Application No. PCT/US23/069639, filed Jul. 5, 2023, 13 pages.

Jiménez, A.G. (2023, e-pub. May 17, 2023). "Inflammaging in Domestic Dogs: Basal Level Concentrations of IL-6, IL-1β, and TNF-A in Serum of Healthy Dogs of Different Body Sizes and Ages," Biogerontology 24(4):593-602.

Lavazza, A. et al. (2020, e-pub. May 23, 2020). "Vampires 2.0? The Ethical Quandaries of Young Blood Infusion in the Quest for Eternal Life," Medicine, Health Care and Philosophy 23:421-432.

Ludwig, H. et al. (1991). "Interleukin-6 Is a Prognostic Factor in Multiple Myeloma," Blood 77:2794, 2 pages.

Madhok, R. et al. (1993). "Serum Interleukin 6 Levels in Rheumatoid Arthritis: Correlations With Clinical and Laboratory Indices of Disease Activity," Annals of the Rheumatic Diseases 52(3):232-234.

Maggio, M. et al. (Jun. 2006). "Interleukin-6 in Aging and Chronic Disease: A Magnificent Pathway," Journals of Gerontology Series A Biological Sciences and Medical Sciences 61(6):575-584, 20 pages.

Mitsuyama, K. et al. (1995). "Soluble Interleukin-6 Receptors in Inflammatory Bowel Disease: Relation to Circulating Interleukin-6," Gut 36(1):45-49.

MSD Manual Veterinary Manual (2024). "Hematology (Complete Blood Count) Reference Ranges," Merck & Co., Inc., 4 pages, as retrieved on Jul. 31, 2024 from https://www.msdvetmanual.com/multimedia/table/hematology-complete-blood-count-reference-ranges.

Sanghavi, A. "Research Listing," retrieved from the Internet, <https://scholar.google.com/citations?user=0CkC_RgAAAAJ&hl=en>, last visited Aug. 1, 2024, 1 page.

Sanghavi, A. "Webpage Profile," retrieved from the Internet, < https://www.researchgate.net/profile/Akshay-Sanghavi>, last visited Aug. 1, 2024, 5 pages.

Shytikov, D. et al. (Oct. 2014). "Aged Mice Repeatedly Injected With Plasma From Young Mice: A Survival Study," BioResearch Open Access 3(5):226-232.

Zhou, X. et al. (2020, e-pub. Mar. 19, 2020). "The Function and Clinical Application of Extracellular Vesicles in Innate Immune Regulation," Cellular & Molecular Immunology 17(4):323-334.

Zoonomia Consortium. (Nov. 12, 2020, e-pub. Nov. 11, 2020). "A Comparative Genomics Multitool for Scientific Discovery and Conservation," Nature 587:240-245, 16 pages.

Sarkar, D. et al. (May 8, 2006). "Molecular Mechanisms of Aging-Associated Inflammation," Cancer Letters 236 (1):13-23.

International Preliminary Report on Patentability, issued Dec. 18, 2024, for PCT Application No. PCT/US2023/069639, filed Jul. 5, 2023, 6 pages.

Zhang, X. et al. (Apr. 20, 2018). "Isolation of Extracellular Vesicles From Human Plasma Using a Novel Three-Step Protocol," Journal of Extracellular Vesicles 7:152.

* cited by examiner

ANTI-AGING COMPOSITIONS AND USES THEREOF

CROSS REFERENCE TO RELATED APPLICATION

This application claims the priority benefit of U.S. Provisional Application No. 63/134,556 filed Jan. 6, 2021, the contents of which are incorporated herein by reference in its entirety.

FIELD

The present disclosure relates in some aspects to methods of purifying a concentrated plasma fraction, and compositions thereof, for use in treating age-related disorders.

BACKGROUND

Aging is often characterized by a progressive decline in physiological function that is often accompanied by the onset and progression of age-related disorders, metabolic diseases, and neurological or neurodegenerative diseases, such as arthrosclerosis, senescence, scarcopenia, type II diabetes along with its related complications, chronic obstructive pulmonary disease (COPD), inflammatory bowel disease (IBD), arthritis, osteoporosis, Alzheimer's disease, Parkinson's disease, dementia, fatty liver disease, chronic kidney disease, cardiovascular disease, stroke, cerebellar infarction, myocardial infarction, osteoarthritis, atherosclerosis, tumorigenesis and malignant cancer development, neurodegenerating disease, myocardial infarction (heart attack), heart failure, atherosclerosis, hypertension, osteoarthritis, osteoporosis, sarcopenia, loss of bone marrow, cataract, multiple sclerosis, Sjogren, Rheumatoid arthritis, degraded immune function, diabetes, Idiopathic pulmonary fibrosis age-related macular degeneration, Huntington's disease, disorders caused by the decline in testosterone, estrogen, growth hormone, IGF-I, or energy production, and obesity ocular neovascularization, diabetic retinopathy, glaucoma, obesity, as well as an increase in mortality. As human lifespan increases, it is very important to uncover means to treat aging and age-related disorders.

By splicing animals together, scientists have shown that young blood rejuvenates old tissues. Parabiosis is a 150-year-old surgical technique that unites the vasculature of two living animals. It mimics natural instances of shared blood supply, such as in conjoined twins or animals that share a placenta in the womb. In one early parabiotic ageing experiment, after old and young rats were joined for 9-18 months, the older animals' bones became similar in weight and density to the bones of their younger counterparts (Horrington et al., Gerontologia, 4: 21-31, 1960).

In 1972, two researchers at the University of California studied the lifespans of old-young rat pairs. Older partners fused to young rats lived for four to five months longer than controls, suggesting for the first time that circulation of young blood might affect longevity (Ludwig F & Elashoff R, Trans New York Acad. Sci., 34: 582-587, 1972).

More recently scientists have tested whether young blood is rejuvenating for humans. (Scudellari M, Nature, 517: 426-429, 2015.) However, experiments to test such claims would require long timelines, and data surrounding young blood or plasma extending lifespan has not been produced. To date, despite the prevalence of aging and age-related diseases, an effective therapy for aging and age-related disorders has likewise not yet been developed. Thus, there is a need for effective treatments of aging and age-related diseases.

SUMMARY OF THE INVENTION

As detailed herein, the present applicants have discovered methods and compositions comprising a concentrated, purified plasma fraction. The plasma fraction may provide an effective treatment for aging and age-related diseases, without causing an immune reaction in the intended recipient. For example, the present composition may be able to reset gene expression, the epigenome, the transcriptome and/or proteome in the recipient to more closely resemble that of a younger individual, thus resulting in a reduction of any of a number of anti-aging phenotypes. The donor of the plasma may be a member of a different species (e.g., livestock) than the recipient (e.g., human), thus crucially circumventing the need for human donor plasma. Also provided herein are novel methods of preparing such compositions that comprise incubating a crude plasma fraction with PEG, sedimenting the fraction, and applying the resuspended sediment to a size exclusion chromatography column.

Provided herein is a method of preparing a composition comprising a concentrated, purified plasma fraction, wherein the method comprises the following steps in order a) isolating a crude plasma fraction from a composition comprising plasma and platelets; b) incubating a solution comprising the crude plasma fraction of step a) with polyethylene glycol (PEG); c) centrifuging the plasma fraction and polyethylene glycol solution of step b) to generate a sediment; d) resuspending the sediment in a buffer and applying the resuspended sediment to a size exclusion chromatography matrix; e) eluting fractions from the size exclusion chromatography matrix; and f) concentrating the eluted fractions to provide the concentrated, purified plasma fraction.

In some embodiments, the composition comprising plasma and platelets is obtained from a mammal. In some embodiments, the mammal is a pig, a cow, a goat, a sheep, or a human. In some embodiments, the mammal is selected such that its plasma will not cause an immune reaction with an intended recipient. In some embodiments, the mammal is a healthy juvenile or adolescent mammal. In some embodiments, the intended recipient is a human.

In some embodiments, isolating the crude plasma fraction from a composition comprising plasma and platelets in step a) comprises centrifugation of the composition comprising plasma and platelets. In some embodiments, the composition comprising plasma and platelets is centrifuged at room temperature.

In some embodiments, the PEG has an average molecular weight of between 15 kD to 30 kD.

In some embodiments, the solution comprising the crude plasma fraction and PEG is incubated for about 7 to about 14 hours in step b). In some embodiments, in step c), the crude plasma fraction and polyethylene glycol solution is centrifuged at about 1000×g for at least five minutes at about 4° C.

In some embodiments, the size exclusion chromatography matrix is a Sephadex G100® column. In some embodiments, the size exclusion chromatography matrix comprises repeating glucose units attached by α-1,6 glucosidic bonds with a filtration range of 4 kD to 150 kD for globular proteins and 1 kD to 100 kD for dextrans. In some embodiments, the size exclusion chromatography matrix comprises a bead size of 40-120 In some embodiments, the size exclusion chromatography matrix is a Sephacryl S-300 column. In some embodiments, the size exclusion chromatography matrix comprises allyldextran crosslinked with N,N'-methylenebisacrylamide with a filtration range of 100 kD to 1,500 kD for globular proteins. In some embodiments, the size exclusion chromatography matrix comprises a bead size of about 25 μm to about 75 μm.

In some embodiments, the eluted fractions are concentrated in step f) by dialyzing the eluted fractions with a membrane with a molecular weight cut off of from 12 kD to 14 kD.

In some embodiments, the method further comprises resuspending the concentrated, purified plasma fraction in step f) in saline to produce a pharmaceutical composition.

In some embodiments, the method further comprises lyophilizing the pharmaceutical composition.

In some embodiments, the method further comprises measuring the protein level in the crude plasma fraction produced in step a). In some embodiments, the protein concentration in the crude plasma fraction is 6 g/dL to 11 g/dL.

In some embodiments, the crude plasma fraction in step a) is not hemolyzed.

In some embodiments, the composition comprising plasma and platelets is blood. In some embodiments, the blood is obtained by venipuncture of a jugular vein. In some embodiments, the blood is collected in a container comprising acid citrate dextrose buffer. In some embodiments, the blood is collected aseptically.

Also provided herein is a concentrated, purified plasma fraction produced by the methods described herein. In some embodiments, the composition is a pharmaceutical composition. In some embodiments, the composition is a lyophilized pharmaceutical composition suitable for reconstitution with a pharmaceutically acceptable liquid carrier such as saline. In some embodiments, the pharmaceutical composition is sterile.

Also provided herein is a composition comprising a concentrated, purified plasma fraction obtained from a mammal, wherein the composition comprises a plasma fraction that is concentrated at least 10 fold compared to the mammal from which the fraction was obtained (e.g., the donor). For example, the composition may comprise a plasma fraction concentration that is calculated based on the blood and plasma volume of the donor. In some embodiments, the composition comprises a plasma fraction that is equivalent to 2 times the total plasma volume of the animal. In some embodiments, the composition comprises a plasma fraction that is concentrated at least 2 fold compared to an unconcentrated sample. In some embodiments, the composition comprises a protein, nucleic acid, or lipid at a concentration that is at least 2 times the level present in the plasma. In some embodiments, the composition comprises a protein, nucleic acid, or lipid at a concentration that is at least 10 times the level present in the plasma. In some embodiments, the composition comprises a protein, nucleic acid, or lipid at a concentration that is at least 2 times the level present in the unconcentrated sample. In some embodiments, the composition comprises a protein, nucleic acid, or lipid at a concentration that is at least 10 times the level present in the unconcentrated sample.

In some embodiments, the composition comprises one or more of extracellular vesicles, exosomes, exomeres, non-membrane bound proteins, exogenous proteins, and other molecules and molecular complexes such as protein associated with extracellular vesicles, exosomes, exomeres, or combinations thereof. In some embodiments, a composition comprising a concentrated, purified plasma fraction or pharmaceutical composition thereof comprises CD63, CD81, and/or CD9.

Also provided herein is a method of treating aging or an age-related disorder in an individual comprising administering a composition comprising a concentrated, purified plasma fraction or pharmaceutical composition thereof to the individual, wherein the composition or pharmaceutical composition is obtained from a young animal of a different species than the individual, wherein the individual and the young animal are both mammals. In some embodiments, memory and/or learning ability is improved in the individual upon administration of a composition comprising a concentrated, purified plasma fraction or a pharmaceutical composition thereof. In some embodiments, one or more marker of inflammation or oxidative stress is reduced in the individual upon administration of a composition comprising a concentrated, purified plasma fraction or a pharmaceutical composition thereof. In some embodiments, one or more markers of inflammation or oxidative stress is reduced in the individual for at least two consecutive days as measured at least one day following administration of a composition comprising a concentrated, purified plasma fraction or a pharmaceutical composition thereof. In some embodiments, one or more marker of aging, inflammation, and/or oxidative stress, is improved within 4 days, 1 week, 2, weeks, 3 weeks, 4 weeks, 5 weeks, 6 weeks, 7 weeks, 8 weeks, 2 months, or 4 months following treatment. In some embodiments, the improvement persists for 4 days, 1 week, 2, weeks, 3 weeks, 4 weeks, 5 weeks, 6 weeks, 7 weeks, 8 weeks, 2 months, or 4 months following treatment.

The one or more markers of inflammation may be measured by, for example, sandwich enzyme linked immunosorbent assay (ELISA) methods. The one or more markers of inflammation may comprise, but are not limited to, interleukin 6 (IL-6) and tumor necrosis factor alpha (TNFα), or combinations thereof. The one or more markers of oxidative stress may be measured by, for example, treatment of tissue homogenates with phosphoric acid and thiobarbituric acid, heating the reaction mixture, extracting with n-butanol, and reading the absorbance of the pink complex formed at 532 nm, In some embodiments, the one or more markers of oxidative stress are measured by treatment of tissue homogenates with 5,5'-dithiobis-(2-nitrobenzoic acid) (i.e., the DTNB method). In some embodiments, the one or more markers of oxidative stress are measured by treatment of tissue homogenates with hydrogen peroxide ($H_2O_2$) and measuring the reduction in optical density at 240 nm. The one or more markers of oxidative stress may comprise, but are not limited to, lipid peroxidation (e.g., malondialdehyde (MDA)), glutathione, catalase, superoxide dismutase (SOD), Nuclear factor erythroid 2-related factor 2 (Nrf2), or combinations thereof.

In some embodiments, the method is a method of treating aging. Treatment of aging may comprise, for example, reducing risk of mortality from an age-related disorder. In some embodiments, treatment of aging comprises increasing a predicted age of mortality. In some embodiments, treatment of aging comprises reducing age-related phenotypes, such as but not limited to, increased inflammation and increased oxidative stress compared with younger individuals. In some embodiments, the method is a method of treating an age-related disorder. In some embodiments, the method is a method of treating a metabolic disease. In some embodiments, the method is a method of treating a neurological or neurodegenerative disease. In some embodiments, the age-related disorder is one or more of senescence, scarcopenia, type II diabetes along with its related complications, chronic obstructive pulmonary disease (COPD), inflammatory bowel disease (IBD), arthritis, osteoporosis, Alzheimer's disease, Parkinson's disease, dementia, fatty liver disease, chronic kidney disease, cardiovascular disease, stroke, cerebellar infraction, myocardial infarction, osteoarthritis, atherosclerosis, tumorigenesis and malignant cancer development, neurodegenerating disease, myocardial infarction (heart attack), heart failure, atherosclerosis, hypertension, osteoarthritis, osteoporosis, sarcopenia, loss of bone marrow, cataract, multiple sclerosis, Sjogren, Rheumatoid arthritis, degraded immune function, diabetes, Idiopathic pulmonary fibrosis age-related macular degeneration, Huntington's disease, disorders caused by the decline in testosterone, estrogen, growth hormone, IGF-I, or energy production, and obesity ocular neovascularization, diabetic retinopathy, glaucoma, obesity, as well as an increase in mortality. In some embodiments, the age-related disorder is selected from the group consisting of arthrosclerosis, senescence, scarcopenia, type II diabetes, COPD, IBD, arthritis, osteoporosis, age-related macular degeneration, ocular neovascularization, diabetic retinopathy, glaucoma, Alzheimer's disease, dementia, fatty liver disease, chronic kidney disease, obesity, memory loss, hearing loss, cognitive impairment, and hypertension.

In some embodiments, a concentrated, purified plasma fraction is concentrated from an initial volume of plasma from a young animal that is at least equal to the total plasma volume of the individual to whom the concentrated, purified plasma fraction is administered. In some embodiments, a composition comprising the concentrated, purified plasma fraction is administered intravenously, transdermally, nasally, or transmucusoly.

All references disclosed here are incorporated by reference in their entireties.

BRIEF DESCRIPTION OF THE DRAWINGS

The drawings illustrate certain embodiments of the features and advantages of this disclosure. These embodiments are not intended to limit the scope of the appended claims in any manner.

DETAILED DESCRIPTION

Figure 1:
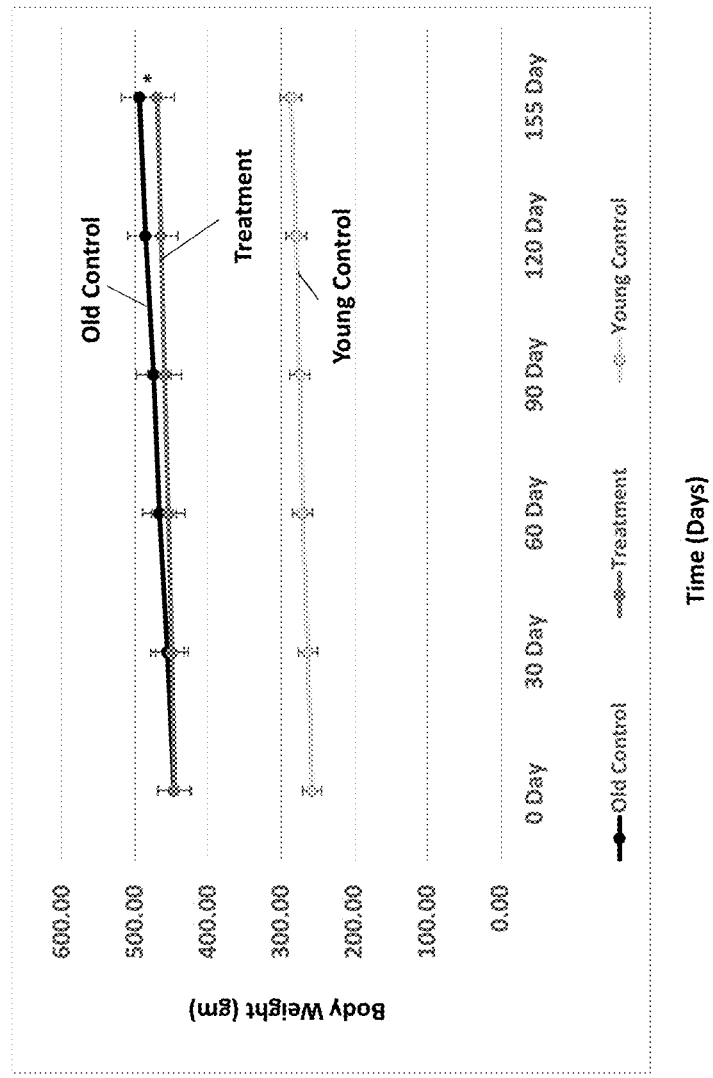
FIG. 1 shows the body weight of animals upon treatment with a concentrated, purified plasma fraction over a period of 155 days. *P<0.05 was observed for the old treatment group when compared with the young control group.

Provided herein are methods for preparing a concentrated, purified plasma fraction that is useful for treating aging and age-related disorders as well as related compositions and methods of treatment. The compositions provided herein comprise a purified plasma fraction from a donor, such as a young or adolescent mammal, at such a concentration that is able to replace or substantially dilute the factors in the plasma of a recipient of such concentrated, purified plasma fraction, such as a mammal that is in need of treatment for aging or an age-related disorder (e.g., an adult human). In some embodiments, the concentrated, purified plasma fraction comprises any one of extracellular vesicles, exosomes, exomeres, nonmembrane bound proteins, exogenous proteins, and other molecules and molecular complexes, or combinations thereof. In some embodiments, the concentrated, purified plasma fraction comprises extracellular vesicles, exosomes, exomeres, nonmembrane bound proteins, exogenous proteins, and other molecules and molecular complexes. In some embodiments, the concentrated, purified plasma fraction is non-human. In some embodiments, the donor is a member of a different species (such as a livestock) than the recipient (such as a human). Accordingly, the methods and compositions are especially useful as they circumvent the need for human donor plasma which may be of limited use based upon availability and ethical concerns. The present composition is able to reset gene expression, the epigenome, the transcriptome and/or proteome in the recipient to more closely resemble that of a younger individual, thus resulting in a reduction of any of a number of anti-aging phenotypes. Thus, provided herein are methods of resetting gene expression, the epigenome, the transcriptome and/or proteome in the recipient to more closely resemble that of a younger individual. In some embodiments, provided herein are methods of reducing any of a number of anti-aging phenotypes.

In some embodiments, the concentrated, purified plasma fraction does not induce an immune response in the recipient. In some embodiments, one or more immunogenic components is removed from the donor blood such that the concentrated, purified plasma fraction is safe for trans-species administration. In some embodiments, the concentrated, purified plasma fraction is free from or substantially free (e.g., less than a concentration of any of about 10%, 5%, 1%, or fewer) from immunogenic components. Human leukocyte antigen (HLA) complex is expressed on the outside of cells and is a known mediator of transplant rejection. Without being bound by theory, in some embodiments, the present method may effectively remove cells (such as platelets) from the donor blood and plasma which display HLA proteins that would otherwise be detected by the recipient immune system. In some embodiments, the concentrated, purified plasma fraction is free from or substantially free (e.g., less than a concentration of any of about 10%, 5%, 1%, or fewer) from platlet components. In addition, the concentrated, purified plasma fraction does not produce any heritable changes, thus making it safe for trans species administration. This allows utilization of plasma from young donor animals that would otherwise be wasted to treat age-related diseases and disorders in humans. For example, in some embodiments, the concentrated, purified plasma fraction can be produced from a livestock that is sacrificed to produce meat for human consumption.

The following references are hereby incorporated by reference in their entireties: Horvath S et al., Biorix, https://doi.org/10.1101/2020.05.07.082917 (2020); Zhang Y et al., Cell Biosci, 9: 1-18, 2019; Swaim et al, J. I.mmunol, 185(11): 6999-7006, 2010.

A. Definitions

The term "about" as used herein refers to the usual error range for the respective value readily known in this technical field. Reference to "about" a value or parameter herein includes (and describes) variations that are directed to that value or parameter per se. For example, description referring to "about X" includes description of "X."

A mammal as described herein encompasses, but is not limited to, humans, domestic animals or livestock, such as but not limited to, dogs, cats, horses, cattle, dairy cows, swine, sheep, lamb, goats, and the like, in addition to non-domesticated animals, such as, but not limited to, camels, deer, antelopes, rabbits, guinea pigs, rodents (e.g., squirrels, rats, mice, gerbils, and hamsters), whales, dolphins, porpoise, seals, and walrus.

A "donor organism," "donor animal" or "donor" as used herein is an organism from which a composition comprising a concentrated, purified plasma fraction can be derived. In some embodiments, the donor organism is a mammal. In some embodiments, the donor organism is a healthy, young or adolescent animal. In some embodiments, the donor organism is a different species than the recipient organism.

A "recipient organism" or "recipient" as used herein is an individual that receives treatment with a composition comprising a concentrated, purified plasma fraction. In some embodiments, the recipient organism is a human. In some embodiments, the recipient organism has an age-related disorder. In some embodiments, the recipient organism is at risk of developing an age-related disorder. In some embodiments, the recipient organism does not have an age-related disorder.

A "concentrated, purified plasma fraction" as used herein is a purified composition obtained from a donor organism that has been concentrated to a volume suitable for administration to a recipient organism. In some embodiments, the concentrated, purified plasma fraction is substantially free of red blood cells and platelets. In some embodiments, the concentrated, purified plasma fraction comprises exosomes. In some embodiments, the concentrated, purified plasma fraction has been purified such that immunogenic components have been removed and the composition is suitable for trans-species administration. In some embodiments, the concentrated, purified plasma fraction is sterile. In some embodiments, the concentrated purified plasma fraction is concentrated at least two fold compared to the initial donor plasma volume.

A "crude plasma fraction" as used herein refers to a semi-purified composition comprising plasma that is substantially free of platelets. In some embodiments, the crude plasma fraction is further purified to produce a concentrated, purified plasma fraction.

As used herein "treatment" is an approach for obtaining beneficial or desired results. For purposes of this invention, beneficial or desired results include, but are not limited to, any one or more of: alleviation of one or more symptoms, diminishment of extent of disease, stabilized (i.e., not worsening) state of disease, slowing of disease progression and amelioration of the disease state. Also encompassed by "treatment" is a reduction of pathological consequences of an age-related disorder. The methods of the invention contemplate any one or more of these aspects of treatment.

As used herein "prevention" encompasses delay in onset or reduced severity of an age-related disorder or a symptom of an age-related disorder.

As used herein "at risk" means that a particular outcome or condition is likely given one or more characteristics of an individual. For example an individual who is "at risk" for an age-related disorder has one or more risk factors (such as age or obesity) for an age-related disorder.

"Comprising" is intended to mean that the compositions and methods include the recited elements, but not excluding others. "Consisting essentially of" when used to define compositions and methods, shall mean excluding other elements of any essential significance to the combination. For example, a method consisting essentially of the elements as defined herein would not exclude other elements that do not materially affect the basic and novel characteristic(s) of the claimed invention. "Consisting of" shall mean excluding more than trace amount of, e.g., other ingredients and substantial method steps recited. Embodiments defined by each of these transition terms are within the scope of this invention.

B. Methods of Preparing Purified Plasma Fractions

Donor and Recipient Organisms

In some embodiments, the composition described herein comprises a concentrated, purified plasma fraction that is purified from a composition comprising plasma and platelets isolated from an animal. In some embodiments, the composition is allogenic, wherein the donor organism that provides the composition comprising plasma and platelets and a recipient organism are the same species but different individuals. In some embodiments, the donor organism that provides the composition of plasma and platelets and the recipient organism are both humans. In some embodiments, the donor organism that provides the composition of plasma and platelets and the recipient organism are both not human. In an alternative embodiment, the composition comprising plasma or platelets may be xenogenic, meaning that it is taken from an organism of a different species than the intended recipient organism (e.g., trans-species). In some embodiments, the composition comprising plasma and platelets is obtained from a mammal. In some embodiments, the composition comprising plasma and platelets is obtained from an animal of a different species than the intended recipient organism, wherein the intended recipient organism and the donor organism are both mammals.

In some embodiments, the present methods and compositions are especially useful as they can be obtained from a donor organism of one species (for example a livestock) and transferred to a human recipient. This overcomes the difficulty of sourcing of adequate quantities of donor plasma from young human donors. In some embodiments, the present methods allow for production of high levels of an anti-aging composition for administration to a recipient, such as a human. In some embodiments, the method uses a waste product from food production.

In some embodiments, the donor organism is a pig, a cow, a goat, a sheep, or a human. In some embodiments, the donor organism is a pig such as a Yorkshire pig. In some embodiments, the donor organism is selected such that its plasma will not cause an immune reaction with an intended recipient. In any embodiments describing a mammalian donor organism, in some such embodiments, a recipient organism is a mammal such as a human. In some embodiments, the composition comprising plasma and platelets is obtained from an animal that is a healthy juvenile or adolescent animal. Thus, in some embodiments, the donor organism is a young or adolescent animal, such as a young mammal. In some embodiments, the composition comprising plasma and platelets is obtained from a young or adolescent animal of a different species than the intended recipient, wherein the intended recipient and the young or adolescent animal are both mammals. In some embodiments, the donor animal is a healthy animal, for example, a healthy animal that does not have elevated levels of certain biomarkers indicative of aging or chronic inflammation, and is not diseased. For example, a healthy animal does not have elevated levels of the chronic inflammation markers interleukin 6 (IL-6) and tumor necrosis marker alpha (TNF alpha), which are often associated with aging. In other examples, a healthy animal does not have an age-related disorder, including but not limited to, memory loss, hearing loss, cognitive impairment, diabetes, osteoarthritis, cardiovascular disease, hypertension, arthrosclerosis, senescence, scarcopenia, type II diabetes, COPD, IBD, arthritis, osteoporosis, age-related macular degeneration, ocular neovascularization, diabetic retinopathy, glaucoma, Alzheimer's disease, dementia, fatty liver disease, chronic kidney disease, or obesity. In some embodiments, the donor organism has a healthy weight.

Any descriptions herein regarding a donor organism, such as a young or adolescent mammal, may be combined with the age descriptions for a donor organism provided herein, the same as if each and every combination of the foregoing were specifically and individually listed. For example, in some embodiments, the donor organism is any animal that is at an age that is at most one tenth, one fifth, one third, or half of the intended recipient's expected life span. In some embodiments, the donor organism is any animal that is at an age that is at most one tenth, one fifth, one third, or half of the intended recipient's age. In some embodiments, the donor organism is any animal between about 0 and about 18 months of age. In some embodiments, the donor organism is between about 1-8 weeks, or between about any one of 1-18, 1-6, 5-6, 6-9, and 6-18 months old. In some embodiments, the donor organism is not older than about 18, 17, 16, 15, 14, 13, 12, 11, 10, 9, 8, 7, 6, 5, 4, 3, 2, or 1 month old. In some embodiments, the donor organism is a Yorkshire pig of about 5-6 months of age.

In some embodiments, the donor organism is a livestock animal, for example, pig, cow, sheep, or goat. In some embodiments, the donor organism is a food bearing animal whose blood is a waste product. In some embodiments, the donor organism is sacrificed for food production.

In some embodiments, the composition comprising plasma and platelets may be obtained from a young or adolescent human that is at most, less than, or about, 12, 13, 14, 15, 16, 17, 18, 19, 20, 21, 22, 23, 24, 25, 26, 27, 28, 29, 30, 35, 40, 45, or 50 years old, or any age or range derivable therein. In some embodiments, the composition comprising plasma and platelets may be obtained from a young or adolescent human that is less than about 18 years old. In some embodiments, the donor and recipient organisms are humans that are related, such as by parent-child; grandchild-grandparent, etc.

In some embodiments, the recipient is an old animal, such as an old human. In some embodiments, the recipient is an elderly animal, such as an elderly human. In some embodiments, the recipient is an animal that has elevated levels of one or more age-related biomarkers compared to a young animal, is diseased, or is afflicted with an age-related disorder. In some embodiments, the recipient has elevated levels of one or more of the chronic inflammation markers IL-6 and TNFα, compared to a young animal. In other embodiments, the recipient has one or more age-related disorders, including but not limited to, memory loss, hearing loss, cognitive impairment, diabetes, osteoarthritis, cardiovascular disease, and hypertension. In some embodiments, the recipient is of any age and a composition comprising a concentrated, purified plasma fraction is administered prophylactically to prevent an age-related disorder. In some such embodiments, the composition is administered to an individual at risk of developing an age-related disorder, such as an individual with a family history of developing an age-related disorder. In some embodiments, the recipient is not an old animal and a composition comprising a concentrated, purified plasma fraction is administered prophylactically to prevent an age-related disorder.

Any descriptions herein regarding a recipient organism may be combined with the age descriptions for a recipient organism provided herein, the same as if each and every combination of the foregoing were specifically and individually listed. In any embodiments provided herein, in one aspect the recipient is a human. In any embodiments provided herein, in one aspect the recipient is a human and the donor is non-human. In some embodiments, the recipient is any animal that is older than adolescence. In some embodiments, the recipient is a non-human animal between about 18-20 months old, or older than about 20 months old. In some embodiments, the recipient is older than or about 18, 19, 20, 21, 22, 23, 24, 25, 26, 27, 28, 29, 30, or 35 years old, or any age or range derivable therein. In some embodiments the recipient is a human that is at least or about 30, 35, 40, 45, 50, 55, 60, 65, 70, 75, 80, 85, 90, 95, or 100 years old, or any age or range derivable therein. In some embodiments, the recipient is a geriatric animal, wherein the animal is older than about 65, 70, 75, or 80 years old, or any age or range derivable therein. In some embodiments, the recipient is a geriatric human, wherein the human in older than about 65, 70, 75, 80 years old, or older, or any age or range derivable therein.

In some embodiments, the recipient is an adult human between the ages of about 30-100 years and the donor is a young or adolescent non-human mammal. In some embodiments, the recipient is a middle age human and the donor is a young or adolescent non-human mammal. In some embodiments, the recipient is a geriatric human and the donor is a young or adolescent non-human mammal.

Obtaining Plasma and Platelets from Donor Organisms

A therapeutic composition of a concentrated, purified plasma fraction for treating aging and age-related disorders has been discovered and methods of obtaining such compositions from a donor organism are provided herein. Also provided are methods of prophylactically and/or therapeutically using such compositions prophylactically and/or in the treatment of aging or an age-related condition. Any donor organism detailed herein may serve as the source of the plasma of the compositions provided herein, including non-human mammals, such as livestock (e.g., cattle, swine and sheep). It is appreciated that more than one individual animal may be a donor organism and that plasma or blood from various donor organisms (which may be the same or different species) may be pooled and processed for purification and use according to the methods detailed herein.

In some embodiments, the present method circumvents the need for human donor plasma by relying on non-human donors (such as animals) and then producing a concentrated, purified plasma fraction that is non-immunogenic to humans.

Figure 14:
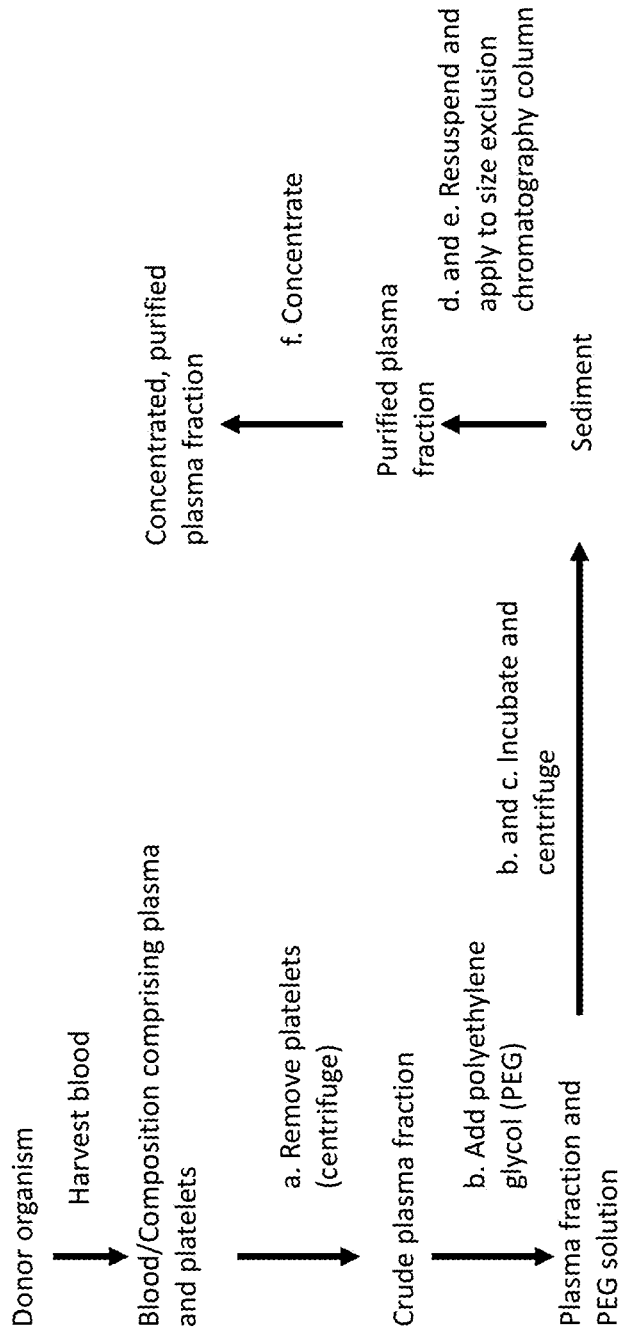
FIG. 14 shows an exemplary workflow for a method of preparing a concentrated, purified plasma fraction.

A concentrated and purified plasma fraction will, in general, be obtained according to FIG. 14.

In some embodiments, a composition comprising plasma and platelets obtained from a donor animal is blood. In some embodiments, the composition comprising plasma and platelets obtained from a donor animal is whole blood, blood serum, or blood plasma. In some embodiments, the composition comprising plasma and platelets obtained from a donor animal is urine, saliva, breast milk, tears, sweat, joint fluid, cerebrospinal fluid, semen, vaginal fluid, ascetic fluid and amniotic fluid.

In some embodiments, the composition comprising plasma and platelet obtained from a donor is blood obtained by venipuncture (e.g., external puncture) of a jugular vein (e.g, internal jugular vein or external jugular vein). In some embodiments, the blood may be obtained by venipuncture of the ear veins (e.g., marginal ear veins), tail vein, cephalic vein, median cephalic vein, median cubital vein, or the basilic vein. In some embodiments, the blood may be obtained from an animal slaughterhouse. In some embodiments, selection of young animals as a donor animal does not require sacrificing the animal.

In some embodiments, the blood is obtained from a livestock animal. In some embodiments, the blood is a waste product of meat production for human consumption. Thus, in some embodiments, the source of blood is a portion of an animal that may be otherwise wasted and destroyed during food production.

In some embodiments, such as when the donor is a livestock animal, a needle (e.g., a 19-21 G needle) is inserted perpendicular to the skin at the deepest point of the jugular groove found between the medial sternocephalic and lateral brachiocephalic muscles, depending on animal size, to obtain blood by venipuncture of a jungular vein. In some embodiments, the animal is held firmly while the procedure is carried out, as struggling may damage the jugular vein. In some embodiments, when sampling from larger animals, the needle is inserted to its full length and the adipose tissue above the vein may be gently compressed to ensure successful venipuncture.

In some embodiments, the blood is collected in a sterilized container. In some embodiments, the sterilized container may contain an anti-coagulant. In some embodiments, the blood mixes with the anti-coagulant immediately upon collection from the animal. The anti-coagulant prevents the release of vesicles from the blood cells during blood collection and storage. In some embodiments, the anti-coagulant comprises citrate based anti-coagulants such as acid citrate dextrose buffer, citrate-phosphate-dextrose, and sodium citrate buffer, and in other embodiments the anti-coagulant comprises heparin. In some embodiments, additive solutions are added to collected blood, such as adenine, glucose, saline, and mannitol. In some embodiments, the sterilized container contains between about 5% and about 20% of the anti-coagulant relative to the amount of collected blood. In some embodiments, the sterilized container contains between about 5% and about 15%, between about 8% and about 12%, or 9% and about 11% of the anti-coagulant relative to the amount of collected blood. In some embodiments, the sterilized container contains up to, less than, or about, 1%, 2%, 3%, 4%, 5%, 6%, 7%, 8%, 9%, 10%, 11%, 12%, 13%, 14%, 15%, 16%, 17%, 18%, 19%, 20%, or more, of the anti-coagulant relative to the amount of collected blood. In some embodiments, the sterilized container contains about 10% of the anti-coagulant relative to the amount of collected blood. In some embodiments, any one of about 0 mL, 8 mL, 6 mL, 4 mL, or 2 mL of anticoagulant is used. In some embodiments, any one of about 100 mL, 75 mL, 60 mL, 40 mL, or 25 mL of blood is collected. For example, in one embodiment 6.3 mL of anti-coagulant is used for 50 mL of collected blood. In some embodiments the anti-coagulant and blood are mixed at about a 1:1, 1:2, 1:5, 1:7, 1:8, 1:9, 1:10, 1:11, 1:15 or 1:20 ratio (v/v). In some embodiments, the anti-coagulant and blood are mixed at about a 1:1-1:20, 1:2-1:15, or 1:5-1:12 ratio (v/v).

Donor blood is further processed to prepare a concentrated, purified plasma fraction suitable for administration to a recipient, such as a human. In some embodiments, following blood collection from a donor and optional storage, plasma is separated from donor whole blood to provide a crude plasma fraction and the protein content is assessed. In some embodiments, the protein content of the blood is determined before separating the plasma from the platelets. In some embodiments, the protein content of the plasma is assessed after platelets are removed. In some embodiments, only blood that meets certain threshold standards, such as a minimum amount of protein is used as a source of a plasma and platelet composition from a donor. In some embodiments, only blood that has a protein content in the range of about 3 g/dL to about 15 g/dL is used or about 6 g/dL to about 11 g/dL. In some embodiments, protein content of the blood is determined by the measurement of UV absorbance at 280 nm, for example, using a Bicinchoninic acid (BCA) or Bradford assay, or using alternative methods like Lowry or other novel assays. In some embodiments, the protein content of the blood is determined by individual protein quantitation methods, including but not limited to, enzyme-linked immunosorbent assay (ELISA), western blot analysis, and mass spectrometry. In some embodiments, the protein content of the blood is determined in vitro by a biuret method (e.g., end point method). In some embodiments, during the biuret reaction, the peptide bonds of the plasma protein react with copper II ions in alkaline solution to form a blue-violet complex. In some embodiments, each copper ion complexes with 5 or 6 peptide bonds. In some embodiments, tartarate is added as a stabilizer, and iodide is used to prevent auto-reduction of the alkaline copper complex. In some embodiments, the biuret method further comprises measuring the color formed, which is proportional to the protein concentration of the blood, at between about 520 nm to about 560 nm (e.g., 546 nm).

In some embodiments, the protein content of plasma obtained from blood is in the range of about 3 g/dL to about 15 g/dL, about 3 g/dL to about 10 g/dL, about 6 g/dL to about 15 g/dL, or about 6 g/dL to about 11 g/dL. In some embodiments, the protein content of plasma obtained from blood is no more than, no less than, or about 3 g/dL, 4 g/dL, 5 g/dL, 6 g/dL, 7 g/dL, 8 g/dL, 9 g/dL, 10 g/dL, 11 g/dL, 12 g/dL, 13 g/dL, 14 g/dL, 15 g/dL, or any derivable range therein, such as about 3 g/dl to about 15 g/dL.

In some embodiments, donor blood is whole blood collected from a donor organism. In some embodiments, donor blood is collected from a livestock. In some embodiments, donor blood is collected from a pig, sheep, goat, or cow.

In some embodiments, after the blood is obtained from a donor organism and determined to be suitable to take forward, the plasma is separated from the platelets to provide a crude plasma fraction.

In some embodiments, blood obtained from multiple individual donors is pooled to prepare a crude plasma fraction. In some embodiments, blood obtained from multiple individuals of the same species is pooled. In some embodiments, blood obtained from multiple individuals of different species is pooled. In some embodiments, the blood that is pooled from multiple donors does not need to be collected at the same time (e.g., pooling can occur by storing blood collected at one time point, and added to a pool that has been previously collected at another time point). In some embodiments, the pooled blood comprises blood obtained from one donor that has been collected at multiple time points. In some embodiments, the pooled blood comprises blood obtained from multiple donors that has been collected at multiple time points.

Isolating a Crude Plasma Fraction from Plasma and Platelets

After blood is harvested from a donor animal and determined to be suitable for preparation of a concentrated, purified plasma fraction, the blood is further purified to remove platelets to provide a crude plasma fraction.

In some embodiments, platelets are removed from a composition comprising platelets and plasma obtained from the blood of a donor animal. In some embodiments, the donor blood is centrifuged to separate the plasma from the collected blood. In some embodiments, the collected blood is centrifuged at about 1,000 rpm, about 1,500 rpm, about 2,000 rpm, about 2,500 rpm, about 3,000 rpm, about 3,500 rpm, about 4,000 rpm, about 4,500 rpm, or about 5,000 rpm, for about 5 min, about 6 min, about 7 min, about 8 min, about 9 min, about 10 min, about 11 min, about 12 min, about 13 min, about 14 min, or about 15 min, to separate the plasma from the collected blood. In some embodiments, the collected blood is centrifuged in a range of about 1,000-5,000 rpm, 2,000-4,000 rpm, or about 3,000 rpm, for a range of about 5-15 min, about 8-12 min, or about 10 min, to separate the plasma from the collected blood.

In some embodiments, the collected blood from a donor animal is centrifuged at room temperature (RT). In some embodiments, RT encompasses any temperature in the range of about 20° C. to about 25° C., about 22° C. to about 23° C., about 25° C. to about 28° C., or about 26° C. to about 27° C., wherein the highest room temperature does not exceed about 28° C. In some embodiments, RT is no higher than, no lower than, or about, 20° C., about 21° C., about 22° C., about 23° C., about 24° C., about 25° C., about 26° C., about 27° C., or about 28° C., or any derivable range therein such as from 20° C. to 28° C. In some embodiments, the supernatant is collected following centrifugation of the collected blood from a donor animal. In some embodiments, the supernatant comprises a crude plasma fraction of the collected blood from a donor animal. A first centrifugation of collected blood may provide a crude plasma fraction that may be purified as by a further centrifugation step.

In some embodiments, a second centrifugation step is performed to further purify a crude plasma fraction such as a crude plasma fraction obtained by a first centrifugation obtained from the blood of a donor animal. In some embodiments, the crude plasma is fraction centrifuged at about 1,000 rpm, about 1,500 rpm, about 2,000 rpm, about 2,500 rpm, or about 3,000 rpm, for about 15 min, about 16 min, about 17 min, about 18 min, about 19 min, about 20 min, about 21 min, about 22 min, about 23 min, about 24 min, or about 25 min, at room temperature. In some embodiments, the crude plasma fraction is centrifuged at a range of about 1,000-3,000 rpm, 1,500-2,500 rpm, or about 2,000 rpm, for about 15-25 min, 18-22 min, or about 20 min, at room temperature. In some embodiments, the supernatant is collected following the secondary centrifugation step to collect the purified crude plasma separated from the platelets. It will be appreciated by those skilled in the art that alternative methods for obtaining a crude or purified plasma fraction from collected blood may also be used.

In some embodiments, plasma is separated (e.g., harvested) from blood to produce a crude plasma fraction. In some embodiments, during harvesting of plasma (e.g., comprising nanovesicles (NVs) and EVs) from the blood collected from a donor animal, blood cells and other particles in the blood are exposed to mechanical forces which causes activation of platelets, changes of membrane properties, cell deformation, and shedding of membrane fragments. In some embodiments, the effect of shear forces imposed upon blood samples during the harvesting process from a donor animal affect the concentration of vesicles obtained from the blood. In some embodiments, platelets may be removed in order to avoid cellular activation leading to inadvertent production of plasma microparticles (MPs).

The present composition comprising extracellular vesicles, exosomes, exomeres, nonmembrane bound proteins, exogenous proteins and other molecules and molecular complexes are beneficial because they contain components from the donor organism that can alter the recipient's metabolic status such that it more closely resembles the donor's. For example, in some embodiments, the composition comprises proteins, nucleic acids, and lipids from the donor organism. In some embodiments, the composition is non-immunogenic such that it can be transferred from one species (for example a livestock) to another (for example a human).

In some embodiments, polyethylene glycol (PEG) in a buffer is used to purify a crude plasma fraction. In some embodiments, PEG is used to further purify a crude plasma fraction collected from young or adolescent animal blood. In some embodiments, using PEG for precipitation perseveres EV integrity. In some embodiments, the PEG has an average molecular weight of between about 15 kD-30 kD, about 20-30 kD, or about 5 kD-15 kD. In some embodiments, the PEG solution has a pH in the range of about 7.7 to about 8.1. In some embodiments, the PEG solution pH range is one that allows for the precipitation of proteins from plasma, including but not limited to, very low density lipoproteins and low density lipoproteins. In some embodiments, the PEG solution has a pH of about 7.9.

In some embodiments, about 10% w/v, about 11% w/v, about 12% w/v, about 13% w/v, about 14% w/v, about 15% w/v, about 16% w/v, about 17% w/v, about 18% w/v, about 19% w/v, about 20% w/v, about 21% w/v, about 22% w/v, about 23% w/v, about 24% w/v, about 25% w/v, or about 26% w/v PEG 6000, prepared in an NaCl solution (e.g., 0.5 M NaCl), is used to precipitate the extracellular vesicles (EVs), exosomes, exomeres, nonmembrane bound proteins, exogenous proteins and other molecules and molecular complexes from a crude plasma fraction. In some embodiments, about 10% w/v-26% w/v, about 10% w/v-15% w/v, about 20% w/v-26 w/v, or an about 12-22% w/v PEG 6000, prepared in an NaCl solution (e.g., 0.5 M NaCl), is used to precipitate the crude plasma fraction. In some embodiments, a 12% PEG 6000 prepared in an NaCl solution (e.g., 0.5 M NaCl) is used to precipitate the crude plasma fraction. In some embodiments, a 24% w/v PEG 6000 solution prepared in an NaCl solution (e.g., 0.5 M NaCl) is used to precipitate the EVs. In some embodiments, an equal volume of plasma free from platelets is mixed with an equal volume of PEG solution. In some embodiments, the plasma-PEG solution is incubated at about 4° C. for overnight precipitation. In some embodiments the plasma-PEG solution is incubated at about 4° C. for about 6, about 7, about 8, about 9 about 10, about 11, about 12, about 13, or about 14 hours. In some embodiments, the plasma-PEG solution is incubated at about 4° C. for about 7-14 hours.

Precipitation of exosomes from the crude plasma fraction may be accomplished using a water-soluble volume excluding polymer. Examples of suitable polymers include polyethylene glycol (PEG), dextrans and derivatives such as dextran sulfate, dextran acetate, and hydrophilic polymers such as polyvinyl alcohol, polyvinyl acetate and polyvinyl sulfate.

Suitable volume-excluding polymers typically have a molecular weight between 1,000 and 1,000,000 Daltons. In general, when higher concentrations of exosomes are present in a sample, lower molecular weight polymers may be used.

Centrifuging to Obtain a Pellet

In some embodiments, the mixture of purified plasma (e.g., plasma separated from platelets, obtained from the collected blood of a young or adolescent animal) and PEG solution is centrifuged to obtain a pellet following precipitation for 7 to 14 hours. In some embodiments, the mixture of plasma and PEG solution is centrifuged at a temperature of about 0° C., about 1° C., about 2° C., about 3° C., or about 4° C. In some embodiments, the mixture of plasma and PEG solution is centrifuged at a temperature in a range of 0° C., or about 1° C. to about 4° C. In some embodiments, the mixture of plasma and PEG solution is centrifuged at about 3,000 rpm, about 3,500 rpm, about 4,000 rpm, about 4,500 rpm, or about 5,000 rpm, for about 5 min, about 6 min, about 7 min, about 8 min, about 9 min, about 10 min, about 11 min, about 12 min, about 13 min, about 14 min, or about 15 min. In some embodiments, the mixture of plasma and PEG solution is centrifuged between about 3,000-5,000 rpm for between about 5-15 min. In some embodiments, the solution comprising the crude plasma fraction and polyethylene glycol solution is centrifuged at about 500×g, about 750×g, about 900×g, about 1000×g, about 1100×g, or about 1250×g. In some embodiments, the solution comprising the crude plasma fraction and polyethylene glycol solution is centrifuged at about 4° C., about 1° C., about 2° C., about 3° C., or about 10° C.

In some embodiments, the supernatant is removed following centrifugation. In some embodiments, the pellet is redissolved in a solution at RT, and stored at about −85° C., about −84° C., about −83° C., about −82° C., about −81° C., about −80° C., about −79° C., about −78° C., about −77° C., about −76° C., or about −75° C., or in the range of about −90° C. to about −60° C. In some embodiments, the supernatant is removed following centrifugation. In some embodiments, the supernatant is removed following centrifugation and before cooling. In some embodiments, the pellet is redissolved in a solution at RT and then cooled at a temperature in the range of about −10° C. to about −30° C. In some embodiments, the solution for redissolving the pellet is a normal saline solution.

Size Exclusion Chromatography

In some embodiments, size exclusion chromatography is used to select particular particle sizes from purified plasma fraction. In some embodiments the size exclusion chromatography (SEC) is performed, in some embodiments, on the purified plasma pellet (e.g., the plasma pellet purified from platelets, from a composition of plasma and platelets obtained from the collected blood of a young or adolescent animal) following precipitation with a PEG solution. In some embodiments, the matrix used for SEC is stable and suitable for large-scale purification. In some embodiments, the matrix is comprised of a cross-linked dextran gel matrix. In further embodiments, the matrix is comprised of repeating glucose units attached by α-1,6 glucosidic bonds. In some embodiments, the bead size within the SEC matrix is between about 40 μm and about 120 μm. In some embodiments, Sephadex is used to perform SEC. In further embodiments, Sephadex G-100 Medium is used to perform SEC. In some embodiments, the matrix comprises allyldextran cross-linked with N,N'-methylenebisacrylamide. In some embodiments, the bead size within the SEC matrix is about 50 μm. In some embodiments, Sephacryl is used to perform SEC In further embodiments, Sephacryl S-300 Medium is used to perform SEC. In some embodiments, the matrix is capable of swelling. In these embodiments, the matrix is able to swell from about 1 g to about 15-20 mL of gel. In some embodiments, the swelling may occur in a buffer. In some embodiments, the buffer is a phosphate buffer (e.g., 0.5 M phosphate buffer) of a specified pH (e.g., about pH 7). The matrix is added to swelling buffer, in some embodiments, and is allowed to swell at RT. In some embodiments, swelling occurs for a period of about 1 day to about 3 days. In some embodiments, swelling does occur for a period longer than about 3 days. In some embodiments, following swelling, the prepared matrix is added to a column. In some embodiments, the column is comprised of glass, and has a stop cock to control the flow of material through the column. In some embodiments, the column is packed with the matrix with a continuous flow of buffer. In some embodiments, buffer used in SEC is boiled to remove any dissolved air.

In some embodiments, the purified plasma fraction sample, is introduced to the column to flow down the matrix packed column according to its molecular weight. In some examples, eluates are collected in fractions. In some embodiments, between about 10 and about 15 separate eluate fractions are collected. In some embodiments, the number of separate eluate fractions collected is 12 fractions. In some embodiments, the fractions have a volume of about 5 mL, about 6 mL, about 7 mL, about 8 mL, about 9 mL, about 10 mL, about 11 mL, about 12 mL, about 13 mL, about 14 mL, or about 15 mL per fraction. In some embodiments, the fractions have a volume in the range of about 5-15 mL, about 8-12 mL, about 5-10 mL, about 10-15 mL, or about 9-11 mL.

In some embodiments, the fractions collected from the size exclusion chromatography column are from the void volume of the column. In some embodiments, the fractions collected form the size exclusion chromatography column are about ⅓ of the column volume.

In some embodiments, the PEG used in the preparation of purified plasma fraction is removed during the SEC process. In some embodiments, the composition of purified plasma fraction following SEC comprises one or more CD09, CD63, CD81 proteins. In some embodiments, the expected particle size range of the collected eluate fractions is between about 50-900 nm, about 100-500 nm, about 300-800 nm, about 100-300 nm, and about 600-900 nm.

In addition to size exclusion chromatography columns, in certain embodiments, the preparation of exosomes includes use of one or more capture agents to isolate one or more exosomes possessing specific biomarkers or containing particular biological molecules. In one embodiment, one or more capture agents include at least one antibody. For example, antibody immunoaffinity recognizing exosome-associated antigens is used to capture specific exosomes. In other embodiments, the at least one antibody are conjugated to a fixed surface, such as magnetic beads, chromatography matrices, plates or microfluidic devices, thereby allowing isolation of the specific exosome populations of interest.

In some embodiments, a protease is not used in purification of the composition such that donor proteins are preserved.

Concentration of Purified Plasma Fraction

In some embodiments, the purified plasma fraction is further concentrated to provide an amount that is suitable for administration to the recipient. In some embodiments, the purified plasma fraction is concentrated such that it is able to substantially dilute or replace the recipient's plasma volume.

After collecting eluate fractions (e.g., 12 fractions) comprising the purified plasma fraction, obtained from a composition comprising plasma and platelets obtained from the collected blood of a young or adolescent animal, the eluate fractions comprising purified plasma fraction may be clubbed and concentrated. In some embodiments, the eluate fractions comprising purified plasma fraction are clubbed and concentrated using PEG. In some embodiments, the eluate fractions comprising purified plasma fraction are clubbed and concentrated using PEG 20000.

In some embodiments, the collected eluate fractions comprising purified plasma fraction are poured into a dialysis membrane (e.g., dialysis bag). In some embodiments, the dialysis membrane has a molecular weight cut-off of between about 12 kD and about 14 kD, about 11 kD and about 13 kD, or about 10 kD and about 15 kD (e.g., Dialysis membrane—150, LA401). In some embodiments, the sample filled dialysis bag is placed in a PEG solution. In some embodiments, the PEG solution is a PEG 20000 solution. In some embodiments, the bag is completely immersed in the PEG powder or solution.

In some embodiments, the sample comprising the purified plasma fraction is monitored (e.g., visually) for the loss of excess fluid. In some embodiments, the sample comprising the purified plasma fraction is monitored until the concentrate becomes semisolid. In some embodiments, the semi-solid concentrate of purified plasma fraction obtained following the dialysis process is weighed and divided into suitable doses. Suitable doses may be calculated based on the blood and plasma volume of the recipient. In some embodiments, the suitable dose comprises two times the plasma volume of the recipient. In some embodiments, the suitable doses of semisolid concentrated, purified plasma fraction, are suspended in a solution to obtain a colloidal suspension. In some embodiments, the solution is a saline solution. In some embodiments, the colloidal suspensions of concentrated, purified plasma fraction may be subsequently administered (e.g., by intravenous injection) into recipients.

C. Compositions Comprising a Concentrated, Purified Plasma Fraction

Erythrocyte lysis (hemolysis) is a common issue, specifically as it pertains to blood samples. Hemolysis can occur during one or more of sample collection, sample transport, sample storage, and also during any downstream treatment of the sample. Erythrocyte lysis can cause a number of challenges to cell component analysis and thus the quality of analysis improves as hemolysis is reduced. In some embodiments, the crude plasma fraction is not substantially hemolyzed the red blood cells have not lysed). In some embodiments, less than 30%, less than 20%, less than 10%, less than 5% or less than 1% of the red blood cells in the composition have lysed.

There are many anticoagulants including but limited to those based upon EDTA and citrate-based. In some embodiments, compositions herein, in various aspects, are based upon a specific type of citrate-based anticoagulant (e.g., anticoagulant citrate dextrose-A or ACD-A) due to its dual ability to show reduced hemolysis and stabilize the red blood cell membrane. Erythrocyte mean cell volume (MCV) may be reduced or stabilized with certain citrate-based anticoagulants, specifically ACD-A and ACD-B. ACD-A and ACD-B each comprise citric acid, tri sodium citrate, and dextrose.

The concentration of the preservative agent may be selected so that white blood cell lysis is minimized. White blood cell lysis is time dependent, and most samples will eventually experience some white blood cell lysis, the amount of preservative agent should be sufficient to minimize if not eliminate white blood cell lysis for the period of time between blood draw and when samples are further purified to isolate the sample components (e.g., anywhere from 24 hours to one week and possibly beyond). Thus the concentration of the preservative in the composition (prior to blood draw) may be from about 0.25% to about 2%. The concentration may be from about 2.5% to about 10%. The concentration may be about 4% to about 7%. The concentration may be from about 2.5% to about 50%.

In some embodiments, provided herein are composition comprising a purified plasma fraction. In some embodiments the composition comprises one or more exosome biomarkers. In some embodiments, the composition comprise CD63, CD81, and/or CD9. In some embodiments, the composition comprise one or more of Alix, TSG101, flotillin 1, HSP70, and CD9. some embodiments, the composition comprises one or more components set forth in Table 1.

TABLE 1

Exemplary proteins.

| Protein category and description | Examples |
|---|---|
| Tetraspanins | CD9, CD64, CD81, CD82, CD37, CD53 |
| Heat shock proteins (HSP) | HSP90, HSP70, HSP27, HSP60 |
| Cell adhesion | Integrins, Lactadherin, intercellular Adhesion Molecule I |
| Antigen presentation | Human leukocyte antigen class I and II/peptide complexes |
| Multivesicular body biogenesis Membrane transport | Tsg101, Alix, Vps, Rab proteins Lysosomal-associated membrane protein-1 and 2, CD13, PG regulatory-like protein |
| Signaling proteins | GTPase HRas, Ras-related protein, furloss, extracellular signal-regulated kinase, Src homology 2 domain phosphatase, GDP dissociation inhibitor, Syntenin-1, 14-3-3 Proteins, Transforming protein RhoA |
| Cytoskeleton components | Actins, Cofilin-1, Moesin, Myosin, Tubulins, Erzin, Tadixin, Vimentin |
| Transcription and protein synthesis | Histone 1, 2, 3, Ribosomal proteins, Ubiquitin, major vault protein, Complement factor 3 |
| Metabolic enzymes | Fatty acid synthase Glyceraldehyde-3-phosphate dehydrogenase Phosphoglycerate kinase I Phosphoglycerate mutase I Pyruvate kinase isozymes M1/M2 ATP citrate lyase ATPase Glucose-6-phosphate isomerase Peroxiredoxin I Aspartate aminotransferase Aldehyde reductase |
| Trafficking and membrane fusion | Ras-related protein 5, 7 Annexins I, II, IV, V, VI Synaptosomal-associated protein Dynamin, Syntaxin-3 |
| Anti-apoptosis | Alix, Thioredoxine, Peroxidase |
| Growth factors and cytokine | Tumor Necrosis Factor (TNF)-α, TNF Receptors, Transforming growth factor-β |
| Death receptors | FasL, TNF-related apoptosis inducing ligand |
| Iron transport | Transferrin receptor |

In some embodiments, the composition comprises one or more components set forth in table 2.

TABLE 2

Exemplary lipid and lipid related enzymes.

| Lipid category and description | Lipid related enzymes | Functional effects |
|---|---|---|
| LTA4, LTB4, LTC4 | LTA4 hydrolase, LTC4 synthase | Triggering polymorphonucelear leukocyte migration |
| PGS2, 15d-PGJ2 | COX-1, COX-2 | Immunosuppression, PPARγ ligand |
| PGE2 | PGE synthase | Inflammation |
| PA | PLD2, DGK | Increasing exosome production |
| AA, LPC | cPLA2, iPLA2 | Accounting for the membrane curvature |
| / | SPLA2 IIA, sPLA2 V | Prostaglandin biosynthesis |
| Ceramides | nSMase2 | Sorting cargo into MVBs |
| Cholesterol | / | Regulating exosome secretion |
| BMP | / | MVB formation and subsequent ILV biogenesis |

TABLE 2-continued

Exemplary lipid and lipid related enzymes.

| Lipid category and description | Lipid related enzymes | Functional effects |
|---|---|---|
| PS | / | Being involved in exosome fate |
| SM | / | Triggering calcium influx |

In some embodiments, the composition comprises tetraspanins, heat shock proteins, MVP proteins, and/or membrane transport proteins. In some embodiments, the composition comprises RNA. In some embodiments, the composition comprises microRNA (miRNA), ribosomal RNA, long non-coding RNA, piwi interacting RNA, transfer RNA, small nuclear RNA, and/or small nucleolar RNA. In some embodiments, the composition comprises miR-214, miR-29A, miR-1, miR-126, and/or miR-320. In some embodiments, the composition comprises cytokines. In some embodiments, the composition comprises microbiotic RNA.

In some embodiments, the composition comprises lipids. In some embodiments, the composition comprises phosphatidyl serine (PS), phosphatidic acid, cholesterol, sphingomyelin (SM), arachidonic acid, prostaglandins, and/or leukotrienes.

In some embodiments, the composition comprises non-membrane bound proteins and protein complexes. In some embodiments, the composition comprises nonmembrane bound RNA. In some embodiments, the composition comprises exogenous proteins.

The protein content of the composition can be analyzed using routine techniques to determining total protein levels or by using routine protein detection techniques (e.g., western blot) to determining the levels of specific proteins.

The RNA content of the composition can be analyzed using routine techniques to determining total RNA levels or by using routine nucleic acid detection techniques (e.g., PCR or probe hybridization) to determining the levels of specific RNAs. Preferred RNA are microRNAs, particularly miR-146A and miR-210 RNAs.

In some embodiments the composition comprises particles (such as exosomes, exomeres, macromolecular particles, or extracellular vesicles) that comprises one or more of the components provided herein. In some embodiments, the composition comprises extracellular vesicles. In some embodiments, the composition comprises extracellular vesicles that are 10 nm to 10,000 nm, 10 nm to 5,000 nm, 10 nm to 1,000 nm, 30 nm to 5,000 nm, 30 nm to 1,000 nm, 30 nm to 900 nm, 30 nm to 700 nm, 50 nm to 500 nm, or 100 nm to 1000 nm in diameter. In some embodiments, the extracellular vesicles are from 40 to 150 nm in diameter.

In some embodiments, the composition comprises exomeres. In some embodiments, the composition comprises one or more proteins, glycans, or lipids associated with exomeres as described in Zhang Y et al., Nature Cell Biology, 20: 332-43,2018, which is hereby incorporated by reference. For example, in some embodiments, the composition proteins involved in metabolism, especially 'glycolysis' and 'mTORC1' metabolic pathways. In some embodiments, the composition comprises factors VIII and X. In some embodiments, the composition comprises key proteins controlling glycan-mediated protein folding control such as CALR19 and glycan processing such as MAN2A1, HEXBand GANAB. In some embodiments the composition comprises Hsp90-β.

In some embodiments, the particle size or quantity is determined by electron microscopy. In some embodiments, particle size is determined using surface plasmon resonance (SPR). In some embodiments, particle size is or quantity is determined by the qNano system (see, e.g., Maas S et al., J Vis Exp, 92: 51623, 2014. In some embodiments, the amount of particles is determined by measuring the enzymatic activity of the exosomal AChE enzyme.

In some embodiments, the particle size or quantity is determined using Brownian motion and Nanosight tracking analysis. In this method, particles in suspension are passed through a flow chamber and are illuminated using a laser source. The light scatter produced from this is recorded using a video camera. The instrument is able to account for net flow, allowing for the addition of a syringe pump to the system. The use of a syringe pump improves measurement quality due to the significantly larger quantity of unique particles analyzed.

In some embodiments, particle size or quantity is determined using tunable resistive pulse sensing. In this method, a sample is applied to one side of the membrane and individual particles pass through the pore driven by a pressure difference and the voltage. As the particles have a higher resistance than the electrolyte they momentarily reduce the current passing through the pore. This can be detected providing both concentration and size information. The concentration is calculated from the frequency of events; the particle size is calculated from the drop in current. The membrane used is elastic and can be stretched to alter the pore size. By tuning the size of the pore the sensitivity and accuracy of the technique can be optimized for every sample. Momentarily dilating the pore or reversing the pressure differential across the membrane can be used to clear any blockages. Changes in the pressure and voltage applied across the membrane can also be used to detect particle charge.

In some embodiments, the extracellular vesicles, exosomes, exomeres, or other molecular particle size or quantity is determined using flow cytometry. Flow cytometry detects particles suspended in a fluid by their interaction with a laser beam as they flow through a detection cell. A sheath fluid is used to spatially confine particles in the center of the detection cell. As particles pass through the laser beam they scatter light, and if appropriate fluorophores are present, the particles also fluoresce.

In some embodiments, the concentrated, purified plasma fraction contains at least $10^5$, $5\times10^5$, $10^6$, $5\times10^6$, $10^7$, $5\times10^7$, $10^8$, $5\times10^8$, $10^9$, $5\times10^9$, $10^{10}$, $5\times10^{10}$, $10^{11}$, $5\times10^{11}$, or $10^{12}$, or $5\times10^{12}$ exosomes per mL. In some embodiments, the concentrated, purified plasma fraction contains between $10^5$, $10^6$, $10^7$, $10^8$, $10^9$, $10^{10}$, or $10^{11}$ to $10^6$, $10^7$, $10^8$, $10^9$, $10^{10}$, $10^{11}$, or $10^{12}$, or more exosomes per mL.

In some embodiments, the concentrated, purified plasma fraction does not comprise platelets. In some embodiments, the concentrated, purified plasma fraction comprises fewer platelets than native plasma. In some embodiments, the composition is substantially free of platelets, such as <1% of the composition by weight.

In some embodiments, the composition comprising concentrated, purified plasma fraction administered to the recipient is a pharmaceutical composition. In some embodiments, the composition is sterile. In some embodiments, the composition comprises a pharmaceutically acceptable carrier. The carrier may be distilled water (DNase- and RNase-free), a sterile carbohydrate-containing solution (e.g. sucrose or dextrose) or a sterile saline solution comprising sodium chloride and optionally buffered. Suitable saline solutions may include varying concentrations of sodium chloride, for example, normal saline (0.9%), half-normal saline (0.45%), quarter-normal saline (0.22%), and solutions comprising greater amounts of sodium chloride (e.g. 3%-7%, or greater). Saline solutions may optionally include additional components, e.g. carbohydrates such as dextrose and the like. Examples of saline solutions including additional components, include Ringer's solution, e.g. lactated or acetated Ringer's solution, phosphate buffered saline (PBS), TRIS (hydroxymethyl) aminomethane hydroxymethyl) aminomethane)-buffered saline (TBS), Hank's balanced salt solution (HBSS), Earle's balanced solution (EBSS), standard saline citrate (SSC), HEPES-buffered saline (HBS) and Gey's balanced salt solution (GBSS). In some embodiments, the composition comprises a buffer.

In one embodiment, the composition comprising a concentrated, purified plasma fraction are formulated for administration by infusion or injection, e.g., subcutaneously, intraperitoneally, intramuscularly or intravenously, and thus, are formulated as a suspension in a medical-grade, physiologically acceptable carrier, such as an aqueous solution in sterile and pyrogen-free form, optionally, buffered or made isotonic. The carrier may be distilled water (DNase- and RNase-free), a sterile carbohydrate-containing solution (e.g., sucrose or dextrose) or a sterile saline solution comprising sodium chloride and optionally buffered. Suitable saline solutions may include varying concentrations of sodium chloride, for example, normal saline (0.9%), half-normal saline (0.45%), quarter-normal saline (0.22%), and solutions comprising greater amounts of sodium chloride (e.g. 3%-7%, or greater). Saline solutions may optionally include additional components, e.g., carbohydrates such as dextrose and the like. Examples of saline solutions including additional components, include Ringer's solution, e.g., lactated or acetated Ringer's solution, phosphate buffered saline (PBS), TRIS (hydroxymethyl) aminomethane hydroxymethyl) aminomethane)-buffered saline (TB S), Hank's balanced salt solution (HBSS), Earle's balanced solution (EBSS), standard saline citrate (SSC), HEPES-buffered saline (HBS) and Gey's balanced salt solution (GBSS).

In other embodiments, the composition is formulated for administration by routes including, but not limited to, oral, intranasal, enteral, topical, sublingual, intra-arterial, intramedullary, intrathecal, inhalation, ocular, transdermal, vaginal or rectal routes, and will include appropriate carriers in each case. For example, exosome compositions for topical application may be prepared including appropriate carriers. Aerosol formulations may also be prepared in which suitable propellant adjuvants are used. Other adjuvants may also be added to the composition regardless of how it is to be administered, for example, anti-microbial agents, anti-oxidants and other preservatives may be added to the composition to prevent microbial growth and/or degradation over prolonged storage periods.

In some embodiments, the composition is or comprises a concentrated purified plasma fraction. In some embodiments, the composition is concentrated to a suitable dose for administering to a recipient. In some embodiments, the concentrated plasma fraction is concentrated from an initial volume of plasma from the donor animal that is at least equal to the total plasma volume of the recipient organism to an amount suitable for administration to the individual. For example, if the recipient has a plasma volume of about 2.5 L, a 2.5 L donor plasma fraction may be purified and concentrated to a 25 mL volume that is suitable for administration.

In some embodiments, the concentrated, purified plasma fraction is obtained from a donor organism of a different species than the recipient organism. In some embodiments, the donor organism is any mammal described herein such as domestic animals or livestock, such as but not limited to, dogs, cats, horses, cattle, dairy cattle, swine, sheep, lamb, goats.

In some embodiments, the concentrated, purified plasma fraction is concentrated at least 1.5 fold, at least 2 fold at least 3 fold, at least 4 fold, at least 5 fold, at least 6 fold, at least 7 fold, at least 8 fold, at least 10 fold, at least 12 fold, at least 14 fold, at least 16 fold, or at least 20 fold compared to the donor plasma. For example, a 10 mL donor plasma sample can be purified and concentrated ten-fold to a final volume of 1 ml. In some embodiments, the composition is concentrated 2 fold to 20 fold, 3 fold to 20 fold, 4 fold to 20 fold, 5 fold to 20 fold, or 8 fold to 16 fold. In some embodiments, the purified plasma fraction is concentrated about 16 fold.

In some embodiments, the composition comprising the concentrated, purified plasma fraction further comprises a pharmaceutically acceptable excipient. In further embodiments, the pharmaceutically acceptable excipient comprises an antiadherent, a binder, a coating, a color, disintegrant, a flavor, a glidant, a lubricant, a preservative, a sorbent, or a vehicle. In some embodiments, the pharmaceutically acceptable excipient comprises any one or more of an antiadherent, a binder, a coating, a color, disintegrant, a flavor, a glidant, a lubricant, a preservative, a sorbent, a vehicle, or a silymarin. In some instances, the composition further comprises silymarin.

In some embodiments, the composition is stored for later use. In some embodiments, the composition is lyophilized. In some embodiments, the lyophilized composition is lyophilized prior to addition of pharmaceutically acceptable carrier. In some embodiments, the lyophilized composition is lyophilized after addition of a pharmaceutically acceptable carrier In some embodiments, the composition is frozen. In some embodiments, the composition is stored in any physiological acceptable carrier, optionally including cryogenic stability and/or vitrification agents (e.g. DMSO, glycerol, trehalose, polyhydroxylated alcohols (e.g. methoxylated glycerol, propylene glycol), M22 and the like).

Also provided herein are compositions produced according to the methods disclosed herein. For example, in some embodiments, provided herein is a composition produced by centrifuging a composition comprising blood and platelets to remove the platelets, adding polyethylene glycol to produce a sediment, resuspending the sediment, and applying the resuspended sediment to a size exclusion chromatography matrix to produce the composition. In some embodiments, provided herein is a crude plasma fraction composition produced by harvesting blood comprising plasma and platelets and separating platelets from plasma. In some embodiments, provided herein is a plasma fraction and PEG solution produced by adding polyethylene glycol to a crude plasma fraction. In some embodiments, provided herein is a composition comprising a sediment produced by incubating polyethylene glyocol with PEG and centrifuging the polyethylene glycol and PEG. In some embodiments, provided herein is a purified plasma fraction produced by resuspending a sediment produced by precipitation of a plasma fraction and a PEG solution.

In some embodiments, provided herein is a kit comprising a concentrated, purified plasma fraction. In some embodiments, the kit as described herein comprises a lyophilized composition that can be reconstituted.

D. Methods of Treatment

Also provided herein are methods of treatment comprising administering a composition comprising a concentrated purified plasma fraction to an individual having an age-related disorder. In some embodiments provided here are methods of preventing and/or reducing the progression of aging and/or an age-related disorder. In some embodiments, the method comprises administering a composition comprising a concentrated purified plasma fraction to an individual that is aging or who is susceptible to developing an age-related disorder. In some embodiments, the therapeutic treatment comprises administering a composition comprising a concentrated purified plasma fraction to an old individual or to an individual having an age-related disorder. In some embodiments, the disorder is a neurological or neurodegenerative disease. In some embodiments, the disorder is a metabolic disease. In some embodiments, the method comprises preventing an age-related disorder.

In some embodiments, the method comprises trans-species administration of a composition purified from a donor organism (such as a livestock) and administered to a recipient of a different species (such as a human). In some embodiments, this circumvents the need for human donors for treatment of anti-ageing diseases.

In some embodiments, the age-related disorder is arthrosclerosis, senescence, scarcopenia, type II diabetes, COPD, IBD, arthritis, osteoporosis, Alzheimer's disease, Parkinson's disease, dementia, fatty liver disease, chronic kidney disease, cardiovascular disease, stroke, cerebellar infraction, myocardial infarction, osteoarthritis, atherosclerosis, tumorigenesis and malignant cancer development, neurodegenerating disease, myocardial infarction (heart attack), heart failure, atherosclerosis, hypertension, osteoarthritis, osteoporosis, sarcopenia, loss of bone marrow, cataract, multiple sclerosis, Sjogren, Rheumatoid arthritis, degraded immune function, diabetes, Idiopathic pulmonary fibrosis, age-related macular degeneration, cerebellar infarction, stroke, Huntington's disease, disorders caused by the decline in testosterone, estrogen, growth hormone, IGF-I, or energy production, and obesity. In some embodiments, the age-related disorder is associated with deterioration of telomeres and/or mitochondria.

In some embodiments, the age-related disorder is a disorder of the brain, heart, lungs, liver, kidney, bones, eyes, or immune system.

In some embodiments, the method comprises treating ageing. In some embodiments, the individual does not have an age-related disorder. Thus, provided herein is a method of increasing memory, increasing balance and coordination, increasing mental acuity, skin changes, and increasing vision and hearing.

In some embodiments, the composition comprising a concentrated purified plasma fraction provided herein is safe for trans-species administration. In some embodiments, the composition does not induce an immune response in the recipient. In some embodiments, the composition is safer than administering whole blood because one or more immunogenic components of blood have been removed. In some embodiments, the composition does not contain heritable information.

In some embodiments, the method of treatment comprises administering a concentrated purified plasma fraction to the individual. In some embodiments, the composition is concentrated at least 1.5 fold, at least 2 fold at least 3 fold, at least 4 fold, at least 5 fold, at least 6 fold, at least 7 fold, at least 8 fold, at least 10 fold, at least 12 fold, at least 14 fold, at least 16 fold, at least 20 fold, at least 50 fold, or at least 100 fold compared to the donor plasma. For example, a 100 mL donor plasma sample can be purified and concentrated ten-fold to a final volume of 10 ml. In some embodiments, the composition is concentrated 2 fold to 100 fold, 2 fold to 50 fold, 4 fold to 20 fold, 5 fold to 20 fold, or 8 fold to 20 fold. In some embodiments, the purified plasma fraction is concentrated about 16 fold. In some embodiments, the composition is concentrated to a volume suitable for administration to the individual.

In some embodiments, the volume of the purified concentrated plasma fraction composition administered to the individual is less than 250 mL, less than 100 mL, less than 75 mL, less than 50 mL, less than 25 mL or less than 10 mL. In some embodiments, the composition has a volume of 10 mL to 100 mL, such as 15 mL to 80 mL, or 20 mL to 100 mL. In some embodiments, the volume of the purified concentrated plasma fraction administered to the individual is suitable for intravenous administration.

In some embodiments, the purified concentrated plasma fraction is administered to the recipient based upon the weight of the recipient. For example in some embodiments, for a 70 kg human recipient, 400 mL of the composition is administered in one or more doses. In some embodiments, for a 70 kg human recipient, 400 mL of the composition is administered in four 100 mL doses. In some embodiments, the composition is administered over a period of 8 days. In some embodiments, the composition is administered is administered twice, wherein the composition is administered over a period of 8 days (e.g., 8-8 days, double dosing). One of ordinary skill in the art will appreciate that this formula can be used to calculate doses for individuals of varying body weights.

In some embodiments, a composition purified from an initial plasma volume that is greater than or equal to the plasma volume of the recipient is administered. In some embodiments, a composition purified from an initial plasma volume that is at least 50%, at least 60%, at least 70%, at least 80%, at least 90%, at least 100%, at least 125%, at least 150%, at least 200% at least 500%, at least 750%, at least 1000%, or at least 2000% of the plasma volume of the recipient is administered. In some embodiments, a composition purified from an initial plasma volume that is 50% to 300%, 75% to 250%, or 100% to 200% of the recipient plasma volume is administered.

In some embodiments, after administration of the purified concentrated plasma fraction, the plasma content of the individual is diluted. For example, the concentration of one or more components (such as a protein, nucleic acid, lipid etc.) is reduced following administration of the plasma. In some embodiments, after administration of the purified concentrated plasma fraction, the plasma content of the individual is diluted by at least 50%, at least 60%, at least 70%, at least 80%, at least 90%, at least 95%, or at least 99%. In some embodiments, the plasma content of the individual is diluted between 50% to 95%, 60% to 95%, or 70 to 90%, upon administration of the purified concentrated plasma fraction. In some embodiments, the concentration of a component of the recipient plasma is at least 50%, at least 60%, at least 70%, at least 80%, at least 90%, at least 95%, or at least 99%. In some embodiments, the concentration of a component of the recipient is diluted between 50% to 95%, 60% to 95%, or 70 to 90%, upon administration of the purified concentrated plasma fraction In some embodiments, the method comprises replacing a portion of the plasma of the recipient with plasma from a donor. In some embodiments, the method comprises replacing at least 50%, at least 60%, at least 70%, at least 80%, at least 90% at least 95%, or at least 99% of the recipient plasma with donor plasma. In some embodiments, 50% to 95%, 60% to 95%, or 70 to 90%, of the plasma of the recipient is replaced.

In some embodiments, a composition purified from an initial plasma volume of 4 L, 3 L, 2.5 L, 2 L, 1 L, or 0.5 L is administered to the individual, such as a human. In some embodiments, the composition is purified from a domestic animal or livestock, such as but not limited to, dogs, cats, horses, cattle, dairy cattle, swine, sheep, lamb, and goats.

In some embodiments, the method comprises administering a purified concentrated plasma fraction repeatedly. In some embodiments, the purified concentrated plasma fraction is administered at least twice, at least three times, at least four times, at least five times, at least six times, at least seven times, at least eight times, at least nine times, or at least ten times. For example, the repeated doing may occur over a period of time such as any time between 0 day to 720 days, between 0 days and 155 days, or between 0 days and 365 days. The concentrated, purified plasma fraction may be administered in varying injections over said period of time in order to maintain the desired plasma concentration in the recipient.

In some embodiments, the concentrated plasma volume delivered to the individual over multiple administrations is concentrated from an initial plasma volume that is at least 1000×, at least 500×, at least 250×, at least 100×, at least 50×, at least 10×, at least 5×, or at least 2× the plasma volume of the treatment recipient. In some embodiments, the plasma volume delivered to the individual is concentrated from an initial plasma volume that is between 2× and 500×, between 2× and 250×, between 2× and 100×, between 2× and 50×, between 2× and 25×, or between 2× and 10× the plasma volume of the recipient. In some embodiments the donor and recipient are different species. In some embodiments, the donor mammal is any mammal described herein such as domestic animals or livestock, such as but not limited to, dogs, cats, horses, cattle, dairy cattle, swine, sheep, lamb, goats and the recipient is a human.

In some embodiments, the method comprises an initial treatment phase followed by a maintenance phase. In some embodiments, the initial treatment phase comprises one or more administrations of the purified plasma fraction. In some embodiments, the initial treatment phase comprises daily, weekly, or monthly dosing of the purified plasma fraction. In some embodiments, the initial treatment phase is continued until one or more biomarkers or symptoms of aging is decreased. In some embodiments, the initial treatment phase is continued until one or more biomarkers of aging is decreased to the level of a young individual of the same species as the treatment recipient.

In some embodiments, there is a rest phase after the initial treatment phase. In some embodiments, following the rest phase there is a maintenance phase. In some embodiments, the maintenance phase comprises periodic dosing of the concentrated purified plasma composition (such as monthly, quarterly, semi-annually, or annually). In some embodiments, administration of the concentrated purified plasma fraction in the maintenance phase is performed on an as needed basis. In some embodiments, the individual experiences relief of one or more symptoms associated with aging following the initial treatment phase. In some embodiments, the individual experiences relief of one or more symptoms associated with aging during the maintenance phase.

In some embodiments, following the initial treatment phase one or more biomarkers of aging is assessed periodically during a rest period. In some embodiments, a maintenance phase commences when one or more symptoms of aging returns after the initial treatment phase. In some embodiments, the round of maintenance and rest continue periodically.

In some embodiments, the composition comprising a concentrated, purified plasma fraction is administered by infusion or injection, e.g. subcutaneously, intraperitoneally, intramuscularly or intravenously, and thus, are formulated as a suspension in a medical-grade, physiologically acceptable carrier, such as an aqueous solution in sterile and pyrogen-free form, optionally, buffered or made isotonic. The carrier may be distilled water (DNase- and RNase-free), a sterile carbohydrate-containing solution (e.g. sucrose or dextrose) or a sterile saline solution comprising sodium chloride and optionally buffered. Suitable saline solutions may include varying concentrations of sodium chloride, for example, normal saline (0.9%), half-normal saline (0.45%), quarter-normal saline (0.22%), and solutions comprising greater amounts of sodium chloride (e.g. 3%-7%, or greater). Saline solutions may optionally include additional components, e.g. carbohydrates such as dextrose and the like. Examples of saline solutions including additional components, include Ringer's solution, e.g. lactated or acetated Ringer's solution, phosphate buffered saline (PBS), TRIS (hydroxymethyl) aminomethane hydroxymethyl) aminomethane)-buffered saline (TBS), Hank's balanced salt solution (HBSS), Earle's balanced solution (EBSS), standard saline citrate (SSC), HEPES-buffered saline (HBS) and Gey's balanced salt solution (GBSS).

In other embodiments, the composition comprising a concentrated, purified plasma fraction is administration by routes including, but not limited to, oral, intranasal, enteral, topical, sublingual, intra-arterial, intramedullary, intrathecal, inhalation, ocular, transdermal, vaginal or rectal routes, and will include appropriate carriers in each case. For example, exosome compositions for topical application may be prepared including appropriate carriers. Aerosol formulations may also be prepared in which suitable propellant adjuvants are used. Other adjuvants may also be added to the composition regardless of how it is to be administered, for example, anti-microbial agents, anti-oxidants and other preservatives may be added to the composition to prevent microbial growth and/or degradation over prolonged storage periods. In some embodiments, the composition is a composition that is formulated with a pharmaceutically acceptable carrier following purification of the composition. In some embodiments, the composition is a reconstituted lyophilized composition that is subsequently formulated with a pharmaceutically acceptable carrier.

In some embodiments, the method comprises administering a concentrated, purified plasma fraction and detecting a marker for an age-related disorder or a marker of inflammation. In some embodiments, one or more markers of aging is reduced upon administration of the purified plasma fraction provided herein. Biomarker strategies to measure aging are currently being developed and can be employed to test the effects of aging interventions. The most prominent is the epigenetic clock, which likely measures biologic age in cells from humans (see for e.g. Chen et al,. Aging, 8: 1844-1865, 2016, PMID 27690265), dogs (see for e.g. Thompson et al., Aging, 9: 1055-1068, 2017, PMID 28373601), and mice (see for e.g. Petkovich et al., Cell Metab, 25: 954-960, 2017, PMID 28380383). Other biomarker strategies include, but are not limited to, inflammatory cytokine levels, p16INK4A protein levels in specific cell populations, telomere length and levels of specific metabolites.

In some embodiments, the level of one or more markers of inflammation is reduced in the recipient upon treatment. In some embodiments, the level of an inflammatory cytokine in the recipient is reduced upon treatment. In some embodiments, the level of IL-6 is reduced. In some embodiments, the level of IL-6 of the treatment recipient after treatment is about the level of a young individual of the same species as the recipient. In some embodiments, the level of IL-6 is reduced about 10%, about 20%, about 30%, about 40% about 50%, about 60%, about 70%, or about 80% upon treatment. In some embodiments, the level of IL-6 is reduced from 20% to 60% upon treatment or from 30% to 50%. In some embodiments, the level of IL-6 is about 20 pg/mL to about 60 pg/mL, about 30 pg/mL to about 60 pg/mL, or about 30 pg/mL to about 50 pg/mL after treatment.

In some embodiments, the level of TNFα is reduced. In some embodiments, the level of TNFα of the treatment recipient after treatment is about the level of a young individual of the same species as the recipient. In some embodiments, the level of TNFα is reduced by about 10%, about 20%, about 30%, about 40% about 50%, about 60%, about 70%, or about 80% upon treatment. In some embodiments, the level of TNFα is reduced from 20% to 80% upon treatment or from 40% to 70%. In some embodiments, the level of TNFα is about 30 pg/mL to 80 pg/mL, about 40 pg/mL to about 60 pg/mL, or about 40 pg/mL to about 50 pg/mL after treatment.

In some embodiments, the level of a transcription factor involved in cellular response to oxidative stress is increased or decreased. Nrf2 is a key transcription factor in the cellular response to oxidative stress. Increasing oxidative stress, a major characteristic of aging, has been implicated in variety of age-related pathologies. In some embodiments, the level of Nrf2 of the treatment recipient after treatment is about the level of a young individual of the same species as the recipient. In some embodiments, the level of Nrf2 is increased upon treatment. In some embodiments, the level of Nrf2 is measured in one or more organs. In some embodiments, the level of Nrf2 is measured in the brain, heart, lung, plasma or liver. In some embodiments, the level of Nrf2 is in the brain is increased upon treatment. In some embodiments, the level of Nrf2 in the brain of the recipient after treatment is about the level of a young individual of the same species as the recipient. In some embodiments, following treatment, the level of Nrf2 in the brain is increased about 0.5 to about 5 fold, about 0.5 to about 3 fold, or about 2 fold. In some embodiments, the level of Nrf2 is in the heart is increased upon treatment. In some embodiments, the level of Nrf2 in the heart of the recipient after treatment is about the level of a young individual of the same species as the recipient. In some embodiments, following treatment, the level of Nrf2 in the heart is increased about 0.5 to about 5 fold, about 0.5 to about 3 fold, or about 2 fold. In some embodiments, the level of Nrf2 is in the lungs is increased upon treatment. In some embodiments, the level of Nrf2 in the lungs of the recipient after treatment is about the level of a young individual of the same species as the recipient. In some embodiments, following treatment, the level of Nrf2 in the lungs is reduced about 0.5 to about 5 fold or about 0.5 to about 3 fold. In some embodiments, the level of Nrf2 is in the liver is increased upon treatment. In some embodiments, the level of Nrf2 in the liver of the recipient after treatment is about the level of a young individual of the same species as the recipient. In some embodiments, following treatment, the level of Nrf2 in the liver is increased about 0.5 to about 5 fold, about 0.5 to about 4 fold, or about 3 fold. In some embodiments, the level of Nrf2 in the brain, heart, lung, or liver of the individual is about 5 pg/mg of protein to about 40 pg/mg of protein, 6 pg/mg of protein to about 20 pg/mg of protein, or about 8 pg/mg of protein to about 16 pg/mg of protein.

In some embodiments, the total level of bilirubin is reduced upon treatment. In some embodiments, the level of total bilirubin of the treatment recipient is about the level of a young individual of the same species as the recipient after treatment. In some embodiments, the level of direct bilirubin of the treatment recipient is about the level of a young individual of the same species as the recipient after treatment. In some embodiments, the total level of bilirubin is reduced about 10% to about 70%, such as about 20% to about 60%, or about 30% to about 50%. In some embodiments, the level of direct bilirubin is reduced upon treatment. In some embodiments, the level of direct biliburin is reduced about 10% to about 70%, such as about 20% to about 60%, or about 30% to about 50%. In some embodiments, after treatment, the level of total bilirubin is less than 1 mg/dL, less than about 0.9 mg/dL, less than about 0.8 mg/dL, less than about 0.7 mg/dL, less than about 0.6 mg/dL or less than about 0.5 mg/dL. In some embodiments, the level of total bilirubin is about 0.9 to about 0.5 mg/dL after treatment. In some embodiments, the level of total bilirubin about 0.6 to about 0.9 mg/dL after treatment. In some embodiments, the level of total bilirubin is about 0.6 to about 0.8 mg/dL after treatment. In some embodiments, after treatment, the level of direct bilirubin is less than about 1 mg/dL, less than about 0.9 mg/dL, less than about 0.8 mg/dL, less than about 0.7 mg/dL, less than about 0.6 mg/dL, less than about 0.5 mg/dL, less than about 0.7 mg/dL, or less than about 0.1 mg/dL. In some embodiments, the level of total bilirubin is about 0.6 to about 0.2 mg/dL after treatment. In some embodiments, the level of total bilirubin is about 0.5 to about 0.2 mg/dL after treatment. In some embodiments, the level of total bilirubin is 0.4 to 0.2 mg/dL after treatment.

In some embodiments, the level of glucose in the blood of the individual is reduced upon treatment. In some embodiments, the level of blood glucose of the treatment recipient after treatment is about the level of a young individual of the same species as the recipient. In some embodiments, the level of blood glucose is reduced by at least 20%, at least 15%, at least 10%, at least 8% at least 7% or at least 5% after treatment. In some embodiments, the level of blood glucose is reduced about 15% to about 5%, about 13% to about 8%, or about 11% to about 9%. In some embodiments, the blood glucose level of the individual is about 180 mg/dL to 160 mg/dL, about 170 to about 160 mg/dL following treatment.

In some embodiments, the level of triglycerides in the individual is reduced upon treatment. In some embodiments, the level of triglycerides of the treatment recipient after treatment is about the level of a young individual of the same species as the recipient. In some embodiments, the level of triglycerides is reduced by at least 0.5 fold, at least about 1 fold, at least 1.5 fold, at least 2 fold, at least 3 fold, or at least 4 fold. In some embodiments, the level of triglycerides is reduced about 1 fold to about 4 fold, such as about 1.50 fold to about 4 fold or about 2 fold to about 3 fold. In some embodiments, the level of triglycerides is about 20 to about 100 mg/dL, about 30 mg/dL to about 80 mg/dL, about 30 mg/dL to about 70 mg/dL, about 30 mg/dL to about 60 mg/dL, or about 30 mg/dL to about 50 mg/dL following treatment.

In some embodiments, the level of HDL is increased upon treatment. In some embodiments, the HDL level of the treatment recipient after treatment is about the level of a young individual of the same species as the recipient. In some embodiments, the level of HDL is increased by at least about 10%, at least about 20%, at least about 30%, at least about 40%, at least about 50% or at least about 70%. In some embodiments, the level of HDL is increased about 10% to about 100%, about 20% to about 80%, about 30% to about 70%, or about 40% to about 60%.

In some embodiments, the cholesterol level of the individual is reduced upon treatment. In some embodiments, the level of cholesterol of the treatment recipient after treatment is about the level of a young individual of the same species as the recipient. In some embodiments, the cholesterol level is reduced by at least about at least about 0.1 fold, at least about 0.2 fold, at about 0.5 fold, at least about 1 fold, at least about 1.5 fold, at least about 2 fold, or at least about 2.5 fold. In some embodiments, the cholesterol level of the individual is reduced by about 0.2 fold to about 1.50 fold, about 0.4 fold to about 1.20 fold, about 0.5 fold to about 1.20 fold, or about 0.7 fold to about 1 fold. In some embodiments, following treatment the cholesterol level of the individual is about 10 mg/dL to about 80 mg/dL, about 20 mg/dL to about 60 mg/dL, about 30 mg/dL to about 60 mg/dL or about 20 mg/dL to about 50 mg/dL.

In some embodiments, the level of creatinine of the individual is reduced upon treatment. In some embodiments, the level of creatinine of the treatment recipient after treatment is about the level of a young individual of the same species as the recipient. In some embodiments, the creatinine level is reduced by at least about 0.1 fold, at least about 0.2 fold, at about 0.5 fold, at least about 1 fold, at least about 1.5 fold, at least about 2 fold, or at least about 2.5 fold. In some embodiments, the creatinine level of the individual is reduced by about 0.2 fold to about 4 fold, about 0.4 fold to about 3 fold, about 0.5 fold to about 4 fold, or about 2 fold to about 4 fold. In some embodiments, following treatment, the creatinine level of the individual is about 0.5 to about 1 mg/dL, about 0.6 to about 1 mg/dL, about 0.6 to about 0.8 mg/dL, or about 0.6 to about 0.7 mg/dL.

In some embodiments, the level of blood urea nitrogen (BUN) of the individual is reduced upon treatment. In some embodiments, the level of BUN of the treatment recipient after treatment is about the level of a young individual of the same species as the recipient. In some embodiments, the BUN level is reduced by at least about 0.1 fold, at least about 0.2 fold, at about 0.5 fold, at least about 1 fold, at least about 1.5 fold, at least about 2 fold, or at least about 2.5 fold. In some embodiments, the BUN level of the individual is reduced by about 0.2 fold to about 5 fold, about 0.4 fold to about 4 fold, about 1 fold to about 3 fold, or about 1 fold to about 2 fold. In some embodiments, following treatment the BUN level of the individual is about 5 mg/dL to about 20 mg/dL, about 5 mg/dL to about 16 mg/dL, about 5 mg/dL to about 12 mg/dL, or about 5 mg/dL to about 10 mg/dL.

In some embodiments, the level of SGPT of the individual is reduced upon treatment. In some embodiments, the level of SGPT of the treatment recipient after treatment is about the level of a young individual of the same species as the recipient. In some embodiments, the SGPT level is reduced by about 0.1 fold, at least about 0.2 fold, at about 0.5 fold, at least about 1 fold, at least about 1.5 fold, at least about 2 fold, or at least about 2.5 fold. In some embodiments, the SGPT level of the individual is reduced by about 0.2 fold to about 1.50 fold, about 0.4 fold to about 1.20 fold, about 0.5 fold to about 1.20 fold, or about 0.7 fold to about 1 fold. In some embodiments, following treatment, the SGPT level of the individual is about 20 IU/L to about 60 IU/L, about 20 to about 40 IU/L, or about 20 to about 30 IU/L.

In some embodiments, the level of SGOT of the individual is reduced upon treatment. In some embodiments, the level of SGOT of the treatment recipient after treatment is about the level of a young individual of the same species as the recipient. In some embodiments, the SGOT level is reduced by about 0.1 fold, at least about 0.2 fold, at about 0.5 fold, at least about 1 fold, at least about 1.5 fold, at least about 2 fold, or at least about 2.5 fold. In some embodiments, the level of SGOT following treatment is about 30 IU/L to about 90 IU/L, about 40 to about 80 IU/L, or about 50 to about 70 IU/L.

In some embodiments, the level of total protein in the blood of the individual is reduced upon treatment. In some embodiments, the level of total protein in the blood of the treatment recipient after treatment is about the level of a young individual of the same species as the recipient. In some embodiments, the total protein in the blood level is reduced at least by about 0.1 fold, at least about 0.2 fold, at about 0.5 fold, at least about 1 fold, at least about 1.5 fold, at least about 2 fold, or at least about 2.5 fold. In some embodiments, the total protein in the blood of the individual is reduced by about 0.2 fold to about 3 fold, about 0.5 fold to about 3 fold, about 0.7 fold to about 2.5 fold, or about 1 fold to about 2 fold.

In some embodiments, the level of reactive oxygen species (ROS) is decreased upon treatment. In some embodiments, measuring the levels of malondialdehyde (MDA), which is the end-product of poly-unsaturated fatty acid peroxidation, reveals the levels of cellular ROS. In some embodiments, the level of MDA is measured in one or more organs. In some embodiments, the level of MDA is measured in the brain, heart, lung, plasma or liver. In some embodiments, the level of MDA is in the brain is reduced upon treatment. In some embodiments, the level of MDA in the brain of the recipient after treatment is about the level of a young individual of the same species as the recipient. In some embodiments, following treatment, the level of MDA in the brain is reduced about 1 to about 5 fold, about 1 to about 3 fold, or about 2 fold. In some embodiments, the level of MDA is in the heart is reduced upon treatment. In some embodiments, the level of MDA in the heart of the recipient after treatment is about the level of a young individual of the same species as the recipient. In some embodiments, following treatment, the level of MDA in the heart is reduced about 1 to about 10 fold, about 2 to about 8 fold, or about 3 fold to about 7 fold. In some embodiments, the level of MDA is in the lungs is reduced upon treatment. In some embodiments, the level of MDA in the lungs of the recipient after treatment is about the level of a young individual of the same species as the recipient. In some embodiments, following treatment, the level of MDA in the lungs is reduced about 1 to about 10 fold, about 2 to about 8 fold, or about 2 fold to about 6 fold. In some embodiments, the level of MDA is in the liver is reduced upon treatment. In some embodiments, the level of MDA in the liver of the recipient after treatment is about the level of a young individual of the same species as the recipient. In some embodiments, following treatment, the level of MDA in the liver is reduced about 1 to about 15 fold, about 3 to about 10 fold, or about 4 fold to about 6 fold. In some embodiments, the level of MDA in the brain, heart, lung, or liver of the individual is about 5 µg/mg of protein to about 50 µg/mg of protein, 10 µg/mg of protein to about 30 µg/mg of protein, or about 15 µg/mg of protein to about 25 µg/mg of protein.

Glutathione (GSH) is important in preventing damage to vital cellular components caused by reactive oxygen species such as free radicals, peroxides, lipid peroxides and heavy metals. It is a tripeptide with a gamma peptide linkage between the carboxyl group of the glutamate side-chain and the amine group of cysteine (which is attached by normal peptide linkage to a glycine.) In some embodiments, the level of GSH is increased upon treatment. In some embodiments, the level of GSH is measured in the brain, heart, lung, plasma or liver. In some embodiments, the level of GSH is in the brain is reduced upon treatment. In some embodiments, the level of GSH in the brain of the recipient after treatment is about the level of a young individual of the same species as the recipient. In some embodiments, following treatment, the level of MDA in the brain is reduced about 1 to about 5 fold, about 1 to about 3 fold, or about 2 fold. In some embodiments, the level of GSH is in the heart is reduced upon treatment. In some embodiments, the level of GSH in the heart of the recipient after treatment is about the level of a young individual of the same species as the recipient. In some embodiments, following treatment, the level of GSH in the heart is reduced about 0.5 to about 5 fold, about 0.5 to about 3 fold, or about 0.8 fold to about 2.5 fold. In some embodiments, the level of GSH is in the lungs is reduced upon treatment. In some embodiments, the level of GSH in the lungs of the recipient after treatment is about the level of a young individual of the same species as the recipient. In some embodiments, following treatment, the level of GSH in the lungs is reduced about 1 to about 10 fold, about 2 to about 8 fold, or about 2 fold to about 6 fold. In some embodiments, the level of GSH is in the liver is reduced upon treatment. In some embodiments, the level of MDA in the liver of the recipient after treatment is about the level of a young individual of the same species as the recipient. In some embodiments, following treatment, the level of GSH in the liver is reduced about 1 to about 15 fold, about 3 to about 10 fold, or about 4 fold to about 6 fold. In some embodiments, the level of MDA in the brain, heart, lung, or liver of the individual is about 5 µg/mg of protein to about 50 µg/mg of protein, 10 µg/mg of protein to about 30 µg/mg of protein, or about 10 µg/mg of protein to about 25 µg/mg of protein.

Alternation in catalase enzyme is another indication of oxidative stress in tissue. In some embodiments, the level of catalase in the individual is decreased upon treatment. In some embodiments, the level of catalase is measured in the brain, heart, lung, plasma or liver. In some embodiments, the level of catalase is in the brain is increased upon treatment. In some embodiments, the level of catalase in the brain of the recipient after treatment is about the level of a young individual of the same species as the recipient. In some embodiments, following treatment, the level of catalase in the brain is increased about 0.01 to about 0.2 fold or about 0.05 to about 0.2 fold. In some embodiments, the level of catalase in the heart is increased upon treatment. In some embodiments, the level of catalase in the heart of the recipient after treatment is about the level of a young individual of the same species as the recipient. In some embodiments, following treatment, the level of catalase in the heart is increased about 0.2 to about 4 fold or about 0.5 to about 3 fold. In some embodiments, the level of catalase in the lungs is increased upon treatment. In some embodiments, the level of catalase in the lungs of the recipient after treatment is about the level of a young individual of the same species as the recipient. In some embodiments, following treatment, the level of catalase in the lungs is increased about 0.2 to about 4 fold or about 0.5 to about 3 fold. In some embodiments, the level of catalase in the liver is increased upon treatment. In some embodiments, the level of catalase in the liver of the recipient after treatment is about the level of a young individual of the same species as the recipient. In some embodiments, following treatment, the level of catalase in the liver is increased about 0.2 to about 4 fold or about 0.5 to about 3 fold. In some embodiments, the level of catalase in the brain, heart, lung, or liver of the individual is about 5 U/mg to about 40 U/mg, about 5 U/mg to about 25 U/mg, or about 10 to about 25 U/mg.

Change in Superoxide dismutase (SOD) level is another indication of oxidative stress in tissue. In some embodiments, the level of SOD is increased upon treatment. In some embodiments, the level of SOD is measured in the brain, heart, lung, plasma or liver. In some embodiments, the level of SOD is in the brain is increased upon treatment. In some embodiments, the level of catalase in the brain of the recipient after treatment is about the level of a young individual of the same species as the recipient. In some embodiments, following treatment, the level of SOD in the brain is increased about 0.5 fold to about 4 fold, about 1 fold to about 3 fold or about 1 fold to about 2 fold. In some embodiments, the level of SOD in the heart is increased upon treatment. In some embodiments, the level of SOD in the heart of the recipient after treatment is about the level of a young individual of the same species as the recipient. In some embodiments, following treatment, the level of SOD in the heart is increased about 0.2 to about 4 fold or about 0.5 to about 3 fold. In some embodiments, the level of SOD in the lungs is increased upon treatment. In some embodiments, the level of SOD in the lungs of the recipient after treatment is about the level of a young individual of the same species as the recipient. In some embodiments, following treatment, the level of SOD in the lungs is increased about 0.2 to about 4 fold or about 0.5 to about 3 fold. In some embodiments, the level of SOD in the liver is increased upon treatment. In some embodiments, the level of catalase in the liver of the recipient after treatment is about the level of a young individual of the same species as the recipient. In some embodiments, following treatment, the level of SOD in the liver is increased about 0.2 to about 4 fold or about 0.5 to about 3 fold. In some embodiments, the level of catalase in the brain, heart, lung, or liver of the individual is about 5 U/mg to about 80 U/mg, about 20 U/mg to about 70 U/mg, or about 30 to about 50 U/mg.

In some embodiments, histopathology is used to assess one or more markers of ageing or senescence. Many senescent cells switch on the expression of acidic beta-galactosidase, which is known as senescence-associated beta-galactosidase (SA-β-galactosidase). In this assay, senescent cells are stained blue when provided with SA-β-galactosidase substrate in acidic pH. In some embodiments, after treatment the level of SA-β-galactosidase in brain, heart, lung or liver tissues is reduced. In some embodiments, after treatment, the level of SA-β-galactosidase in brain, heart, lung or liver tissues is reduced to the level of a young individual of the same species as the recipient.

In some embodiments, histopathology is used to assess lipid accumulation. Excess lipid accumulation in peripheral tissues is a key feature of many metabolic diseases. Oil red O is a lysochrome (fat-soluble) diazo-dye used for staining neutral triglycerides and lipids in frozen tissue sections or unfixed (air-dried) slides. In some embodiments, Oil red O staining is used to identify both exogenous and endogenous lipid deposits. In some embodiments, the level of lipid deposits in in peripheral tissues is reduced upon treatment. In some embodiments, the level of lipid deposits in in peripheral tissues of the recipient is reduced upon treatment to the level of a young individual of the same species as the treatment recipient. In some embodiments, lipid deposits are reduced in the brain, heart, lung, or liver.

In some embodiments the individual's ability to learn is increased upon treatment. In some embodiments, the individual's memory is improved.

In some embodiments, the method reduces senescence. In some embodiments, the method is a rejuvenation method. In some embodiments, the method increases longevity. In some embodiments, the individual's life span is increased. In particular embodiments, the administration extends lifespan in a subject by at least 5%, at least 10%, at least 15%, at least 20%, or at least 25% relative to the lifespan of a control subject. In some embodiments the lifespan comparison is performed on an individual-to-individual basis, in which lifespan of subjects is correlated to a dose series or assayed biomarker levels and compared to those parameters assessed in a control population. In other embodiments, the comparison is performed by assessing the average lifespan in test and control groups of subjects and comparing them.

In some embodiments, provided herein is a method of extending the lifespan of an individual comprising administering a concentrated, purified plasma fraction to the individual. In some embodiments, the lifespan of the individual is increased 1, 2, 4, 5, 6, 7, 8, 9, 10 15, or 20 years upon treatment.

In some embodiments, the quality of life of the individual is increased. In some embodiments, morbidity is reduced. In some embodiments, formation of senescent cells is reduced.

In some embodiments, frailty is reduced. The term "frailty" refers to a biological syndrome of decreased reserve and resistance to stressors due to decline in multiple physiological systems. Subjects suffering from frailty have improved likelihood of adverse health outcomes to events that stress one or more of their physiological systems. In humans, frailty frequently presents via non-specific symptoms, falls, delirium, fluctuating disability, or a combination thereof. Non-specific symptoms include extreme fatigue, unexplained weight loss, and frequent infections. Falls include hot falls (minor illness reducing postural balance below a threshold to maintain stability) or spontaneous falls (vital postural systems declining as a result of declines in vision, balance, and strength).

In some embodiments, the delaying onset or delaying progression of frailty comprises delaying onset or delaying progression of a frailty phenotype. In some embodiments, the frailty phenotype is selected from the group consisting of hair loss, dermatitis, kyphosis, grip strength, muscle strength, a gait disorder, hearing loss, cataracts, corneal opacity, eye discharge, vision loss, nasal discharge, age-related fat loss and tremors. In some embodiments, the frailty phenotype is hair loss. In some embodiments, the frailty phenotype is dermatitis. In some embodiments, the frailty phenotype is kyphosis. In some embodiments, the kyphosis is not caused by osteoporosis. In some embodiments, the kyphosis is caused by disk degeneration. In some embodiments, the frailty phenotype is grip strength. In some embodiments, the frailty phenotype is muscle strength. In some embodiments, the frailty phenotype is the gait disorder. In some embodiments, the frailty phenotype is hearing loss. In some embodiments, the frailty phenotype is cataracts. In some embodiments, the frailty phenotype is corneal opacity. In some embodiments, the frailty phenotype is eye discharge. In some embodiments, the method increases muscle strength and/or decreases muscle deterioration.

In some embodiments, the frailty phenotype is vision loss. In some embodiments, the frailty phenotype is nasal discharge. In some embodiments, the frailty phenotype is age-related fat loss. In some embodiments, the frailty phenotype is tremors.

In some embodiments, provided herein is a method of preventing an age-related disease. In some embodiments, provided herein is a method of slowing the progression of an age-related disease. In some embodiments, the method comprises delaying onset of an age-related disease.

In some embodiments, the progression of the age-related disease is delayed for at least 3 months, at least 4 months, at least 5 months, at least 6 months, at least 7 months, at least 8 months, at least 9 months, at least 10 months, at least 11 months, at least 12 months, at least 24 months, or at least 36 months after administration of the composition to the subjects.

In some embodiments, the composition decreases an age-related phenotype relative to a pretreatment value of the frailty phenotype. In some embodiments, the age-related phenotype is decreased at least 5%, 10%, 15%, 20%, 25%, 33%, 40%, 45%, 50%, 66%, 75%, or 100% relative to the pretreatment value.

In some embodiments, one or more markers or symptoms of an age-related disease is reduced upon administration of the concentrated purified plasma fraction for a period of time. In some embodiments, the marker or symptom of the age-related disease is reduced to the level of a young individual of the same species as the recipient. In some embodiments, the marker or symptom of the age-related disease is reduced for at least 1, 2, 3, 4, 5, 6, 7, 8, 9, 10 or 15 weeks following treatment. In some embodiments, the marker or symptom of the age-related disease is reduced for at least 1, 2, 3, 4, 5, 6, 7, 8, 9, 12, 18, 24, or 36 months after treatment.

E. Kits

In some embodiments, provided here are kits comprising a composition concentrated, purified plasma fraction and instructions for use. In some embodiments, the composition is a pharmaceutical composition. In some embodiments, the composition is lyophilized. In some embodiments, the composition is obtained from a donor animal of a different species than the intended recipient.

In some embodiments, the kit provides instructions for using the concentrated, purified plasma fraction for treating an age-related disease or for preventing aging. In some embodiments, the age-related disease is arthrosclerosis, senescence, scarcopenia, type II diabetes, COPD, IBD, arthritis, osteoporosis, Alzheimer's disease, Parkinson's disease, dementia, fatty liver disease, chronic kidney disease, cardiovascular disease, stroke, cerebellar infarction, myocardial infarction, osteoarthritis, atherosclerosis, tumorigenesis and malignant cancer development, neurodegenerating disease, myocardial infarction (heart attack), heart failure, atherosclerosis, hypertension, osteoarthritis, osteoporosis, sarcopenia, loss of bone marrow, cataract, multiple sclerosis, Sjogren, Rheumatoid arthritis, degraded immune function, diabetes, Idiopathic pulmonary fibrosis, and age-related macular degeneration, cerebellar infarction, stroke, Huntington's disease, disorders caused by the decline in testosterone, estrogen, growth hormone, IGF-I, or energy production, and obesity. In some embodiments, the age-related disorder is associated with deterioration of telomeres and/or mitochondria.

In some embodiment the kit comprises additional components for measuring the status of one or more markers of age or an age-related disorder, as provide herein. For example, in some embodiments, the kit comprises a detection agent for detecting an inflammatory cytokine or a marker of inflammation. In some embodiments, the kit comprises a detection agent for detecting any of GSH, blood glucose, MDA, blood protein level, SGOT, SGPT, BUN, creatinine, cholesterol, HDL, triglycerides, bilirubin, NRF-2, IL-6, or TNFα.

In some embodiments, the kit comprises a detection antibody. In some embodiments, the detection antibody can be used for immunohistochemistry, flow cytometry, ELISA or FACS.

In some embodiments, the concentrated, purified plasma fraction is in a composition suitable for intravenous, transdermal, nasal, or transmucosal administration.

In some embodiments, the kit comprises a lyophilized composition and a pharmaceutically acceptable carrier for reconstitution. In some embodiments, the pharmaceutically acceptable carrier comprises a buffer and/or one or more diluents or excipients. In some embodiments, the pharmaceutically acceptable carrier is sterile.

In some embodiments, provided herein is a kit for treating an age-related disease or disorder comprising a concentrated, purified plasma fractions and instructions for use. In some embodiments, the instructions for use comprise instructions for treating an individual as described herein. In some embodiments, the instructions comprises instructions for administering the composition to an individual of a different species than the donor individual. In some embodiments, the kit comprises an additional agent such as CD63, CD81, and/or CD9. In some embodiments, the kit comprises instructions for detecting one or more markers of gaining, inflammation, and/or oxidative stress. In some embodiments, the kit comprises instructions for administering the composition at a particular dose.

EXAMPLES

The invention will be more fully understood by reference to the following examples. They should not, however, be construed as limiting the scope of the invention. It is understood that the examples and embodiments described herein are for illustrative purposes only and that various modifications or changes in light thereof will be suggested to persons skilled in the art and are to be included within the spirit and purview of this application and scope of the appended claims.

Example 1

Preparation of Purified Plasma Fraction

This example demonstrates a method for the preparation of an anti-aging composition from porcine blood.

Yorkshire pig males and females of puberty age (8-9 months) were used to collect the blood to obtain the plasma. Venipuncture from the external jugular vein was the most common route of blood collection in the animals due to the comparative ease of the technique and the capacity to draw repeat samples of blood at relatively large volumes. A 19-21 G needle was inserted perpendicular to the skin at the deepest point of the jugular groove found between the medial sternocephalic and lateral brachiocephalic muscles, depending on animal size. Blood was collected in a sterilized container containing 10% of an anti-coagulant (e.g., sodium citrate buffer, acid citrate dextrose buffer), to prevent release of vesicles from the blood cells during blood collection and storage. 6.3 mL of citrate buffer was used for 50 mL of blood collection.

The protein content of plasma obtained from the blood was then tested us a biuret method (end point method). Protein content of plasma must not be too low to ensure the blood has not haemolysed, since protein may contaminate the raw material irreversibly. During the biuret reaction, the peptide bonds of the protein reacted with copper II ions in alkaline solution to form a blue-violet complex. Each copper ion complexed with 5 or 6 peptide bonds. Tartarate was added as a stabilizer, and iodide was used to prevent auto-reduction of the alkaline copper complex. The color formed was proportional to the protein concentration and was measured at 546 nm (520-560 nm). A protein content in the plasma of about 6-11 g/dL was found to provide the best results.

Collected porcine blood was then processed for plasma separation and platelet removal. The collected blood was centrifuged at 3000 rpm for 10 min to separate the plasma. This plasma (supernatant) was then collected and centrifuged at 2000 rpm for 20 min at room temperature (RT).

The supernatant (crude plasma fraction) was collected following centrifugation and incubated with a 24% w/v Polyethylene glycol-6000 (PEG 6000) solution prepared in 0.5 M NaCl. Equal volumes of platelet free plasma was then mixed with same volume of PEG solution and precipitated overnight (7 to 14 hours) at 4° C.

The plasma fraction was then separated from the PEG solution via centrifugation. Following overnight precipitation, the mixture of plasma and PEG solution was removed from 4° C. and centrifuged at −4° C., 4,000 rpm (1,000×g) for 10 min. The supernatant was removed, the pellet was redissolved in normal saline solution at RT, and the redissolved pellet was stored at −80° C.

The plasma fraction was further purified using size exclusion chromatography on a Sephadex G-100 (Medium) column. Briefly, 2 g Sephadex was added in 40 mL phosphate buffer pH 7 (0.05 M), and allowed to swell at RT for 3 days. On the fourth day, the Sephadex buffer solution was poured in a glass column having a stop cock at the lower side to control the flow. The column was packed with Sephadex, with a continuous flow of buffer, and the sample was gently poured to flow down according to its molecular weight. Sample eluates were collected in 10 mL fractions for a total of 12 collected samples. PEG used in the preparation was removed during the size exclusion chromatography process. The composition contained CD09, CD63, CD81 proteins.

Following collection, the 12 fractions were clubbed and concentrated using PEG 20000. The collected fractions were poured into a dialysis bag with a molecular weight cut-off of 12-14 kD (Dialysis Membrane—150, LA401). The sample filled dialysis bag was placed in a beaker containing PEG 20000, ensuring the bag was completely immersed in the PEG powder. The sample was visually monitored for the loss of excess fluid until the concentrate became semisolid. This semisolid concentrate obtained after the dialysis process was weighed and divided into suitable doses, with a particle size range of about 50-900 nm. Each dose was suspended in a saline solution to obtain a concentrated, purified plasma fraction ready for intravenous injection.

Example 2

Procurement of Animals and First Single Dose Plasma Fraction Treatment Study Design Details This example demonstrates the procurement of animals (e.g., rats), for evaluation of treatment with the concentrated, purified plasma fraction of Example 1.

Male Sprague Dawley rats of 8 weeks (200-250 g) and 20 Months (400-500 g) were procured from the National Institute of Bioscience, Pune, India. Animals were housed in the animal house facility of NMIMS, Mumbai during the study under standard conditions (12:12 h light: dark cycles, 55-70% of relative humidity) at 22±2° C. with free access to water and standard pellet feed (Nutrimix Std-1020, Nutrivet Life Sciences, India).

The dose of plasma fraction treatment was calculated based on the blood and plasma volume of the rat, which were 14 mL and 7 mL, respectively. The calculated dose was divided into four fractions for administering to a second group of animals. This group is termed as "old treated rats". For a rat of 500 g, the total blood volume is 32 mL and the total plasma volume is 16 mL. Plasma fraction injection was equivalent to 2 times the plasma volume of the animal (i.e., 2×16=32 mL young plasma administered), and was converted into a single dose of the plasma fraction treatment. One dose was given at each time point on days 1, 3, 5 and 7; therefore, a total of 4 such doses were given on every alternate day for 8 days, to the old treated group of rats.

Each divided dose was injected intravenously using saline as a vehicle to increase solubility and bioavailability. The amount of saline without plasma fraction used in each divided dose was administered to the first group of animals four times over 8 days in the same way. This group was termed "old control group". The third group had young rats and was termed "young control group".

A first study was designed to administer a single intravenous dose of plasma fraction in divided doses. The dose was divided and administered over 8 days period so that animals were best able to tolerate the treatment. In this study, each group (i.e., old control, young group, and old treated group) had 6 rats. The first two groups of old animals were comprised of 20 month old rats. The third group had 6 young rats each of 8 weeks age. Table 3 provides the study protocol.

TABLE 3

Protocol of single dose plasma fraction treatment study.

| Particulars | Description |
|---|---|
| Animals | Sprague Dawley rats |
| Age | Young rats (8 weeks) and Old rats (20 months) |
| Gender | Male |
| Grouping | Young Control (6 Animals) |
| | Old Treated (6 Animals) |
| | Old Vehicle Control (6 Animals) |
| Treatment | Single dose Rejuvenating Plasma Fraction divided over four injections. |
| Dosing | 4 Injections, every alternate day for total 8 days |
| Duration of treatment | 8 Days |
| Evaluation Time Points | Initial 0, 4, 8, 15, and 30 days |

At the end of 30 days (i.e., conclusion of the first study), most biological age-markers, including physiological, biochemical and micro-anatomical were substantially impacted, wherein the values of old treated group approached those of young animals, and sustained through the completion of the study (i.e., 30 days). This demonstrated that the plasma fraction treatment was effective almost immediately, and largely did not decrease in effectiveness over the course of 30 days.

However, it was observed that the values of TNF alpha of the old treated group were 214.63 pg/mL of plasma at the end of 15 days, while TNF alpha values were 211.71 pg/mL of plasma of the young control and rose to 217.13 pg/mL of plasma after 30 days. Similarly, the biomarker IL-6 showed a continuous rise in levels, even in the young control group, from 270.78±14.05 pg/mL of plasma to 350.78±16.92 pg/mL after 30 days. Therefore, the first single dose study was inconclusive. Further study was required to know the sustainability of the impact of plasma fraction treatment.

Example 3

Repeated Dose Study of Plasma Fraction Treatment

Based on the results of the first single dose study, more evaluation time points over larger period of study were pursed in a second study.

The intention of the second study was to administer a minimum doses of plasma fraction treatment to achieve and sustain rejuvenation (e.g, whether a single dose per month may be reduced to 2-6 doses per year). The first two groups of old animals were comprised of 20 month old rats, and had 8 rats in each group. The third group had 8 young rats each of 8 weeks age. Each dose was divided into four, and administered on alternate days over an 8 day period (i.e., 4 injections, every alternate day for 8 days for a first dosing, and second dosing of 4 injections every alternate day for 8 days ("8-8 Days")), so that animals were able to tolerate the treatment.

It was necessary to select a suitable time of administration of the second dose, and the effect of the first dose did not wane at the end of 30 days. Therefore, administration of the second dose was considered beyond 1 month, such as after 2 months or after 3 months, of the initial dose of plasma fraction treatment. The requirement for a minimum dosing such as 2-6 doses per year, and no differences in any value of age-related biomarker up to 30 days, provided the rational to administer a second dose 3 months after the first dose.

Further analysis was required to determine the specific day of second dose administration.

When the TNF alpha values were monitored for the old treated group and young control group in the second study, the TNF alpha values of the old treated group reduced to around 50% (54%) of the initial values about 8-15 days after administration of plasma fraction, but started rising again, reaching 66% in 60 days, and 72% in 90 days. Therefore, it was necessary to give a second dose of plasma fraction to avoid further increase in values.

TABLE 4

TNF alpha values of old treated and young control groups in a second study

| Biomarker | 60 days Old treated | 90 days Old treated | 60 days Young Control | 90 days Young Control |
| --- | --- | --- | --- | --- |
| TNF-α levels in plasma | 82.02 ± 10.75 pg/mL of plasma | 89.41 ± 10.11 pg/mL of plasma | 50.77 ± 8.03 pg/mL of plasma | 52.98 ± 8.42 pg/mL of plasma |
| % of TNF-α with respect to i) TNF-α of Young control after 60 or 90 days; ii) initial TNF-α i.e. of $0^{th}$ day | i) 162% (Young Control); ii) 66% (initial value) | i) 169% (Young Control); ii) 72% (initial value) | | |

Although both 60 days and 90 days were appropriate time points to administer second dose of plasma fraction treatment from the values of TNF alpha, other biomarkers did not depart from the initial achieved results after 60 days. Therefore, a second dose was administered after 90 days to achieve increased treatment impact.

After administering the second dose of plasma fraction, the TNF alpha values were measured to evaluate whether they decreased and approached those of the young control group, and whether they sustained low values for a longer time as compared to a single dose administration.

Instead of an exact 90 days, because three successive months may also have 92 days, a second dose was administered on the $95^{th}$ day. Therefore, the $95^{th}$ day is $0^{th}$ day for the second dose. This dose is similarly divided into four doses which were administered on alternate days over 8 days, until the 102th day.

The study was performed for a minimum 5 month period (i.e., 155 days), with 15-20 evaluation time points. The evaluation time points of the first single dose study were included, and additional evaluation time points were added. The difference between successive evaluation points was not more than a month, preferably not more than 20 days, and most preferably not more than 15 days.

The protocol of the double dose study is briefly detailed in Table 5. The dose of plasma fraction treatment was prepared and injected intravenously as described, using saline as vehicle.

TABLE 5

Details of the study protocol.

| Particulars | Description |
| --- | --- |
| Animals | Sprague Dawley rats |
| Age | Young rats (8 weeks) and Old rats (20 months) |
| Gender | Male |
| Grouping | Young Control 8 Animals |
| | Old Treated 8 Animals |
| | Old Vehicle Control 8 Animals |

TABLE 5-continued

Details of the study protocol.

| Particulars | Description |
| --- | --- |
| Treatment | Plasma fraction |
| Dosing | 4 Injections, every alternate day for 8 days and second dosing start from 95$^{th}$ day 4 Injections every alternate day for 8 days |
| Duration of treatment | 8-8 Days (Double dose) |
| Evaluation Time Points | 0, 4, 8, 15, 30, 45, 52, 60, 75, 90, 95, 99, 103, 110, 125, 140 and 155 days |

Several animal studies were conducted to evaluate various biochemical parameters, cognitive activities, and other analyses, which were indicative of success of plasma fraction therapy. Body weight, food, and water intake of the animals were monitored at each time point. Learning ability of animals was evaluated using a Barnes maze apparatus at each time point, after one week of training. Blood samples were withdrawn at predetermined time intervals by retro orbital plexus during the plasma fraction treatment, for hematological evaluation. Serum was separated from the blood samples of each animal and evaluated for biochemical parameters. Animals were sacrificed from each group at the 155$^{th}$ day of plasma fraction treatment and vital organs (brain, heart, lung, liver, spleen, kidney, and testis) of these animals were harvested and tested for oxidative stress biomarkers and NRF2. Plasma was separated from the blood samples of each animal and was used for evaluation of two inflammatory markers, i.e., TNF alpha and IL-6. Finally, animals were sacrificed from each group at the 155$^{th}$ day of plasma fraction treatment, and vital organs (brain, heart, lung, liver, spleen, kidney, and testis) of these animals were harvested for histopathological and immunohistochemistry studies.

Example 4

Monitoring Body Weight of Rats During Treatment

Body weights of rats were recorded before the initiation of plasma fraction treatment protocol and then at day 30, 60, 90, 120 and 155, as shown in FIG. 1. Data were expressed as mean±SEM. Statistical analysis were performed by 'Two-way ANOVA' with Bonferroni's multiple comparison test. With $P<0.05$ considered as statistically significant, there was no significant difference between the old control and old treatment group. *$P<0.05$ was observed for the old treatment group when compared with the young control group.

Body weight of the old animals and young animals increased over a period of 155 days. There was no change observed in the food and water intake, and no significant difference of body weight was observed between the old control and old treated groups (FIG. 1).

Example 5

Learning Ability of Rats Using a Barnes Maze During Treatment

This example demonstrates the increased learning ability of old treated rats compared to that of old control rats over the course of plasma fraction treatment, as determined using a Barnes maze apparatus.

Figure 2:
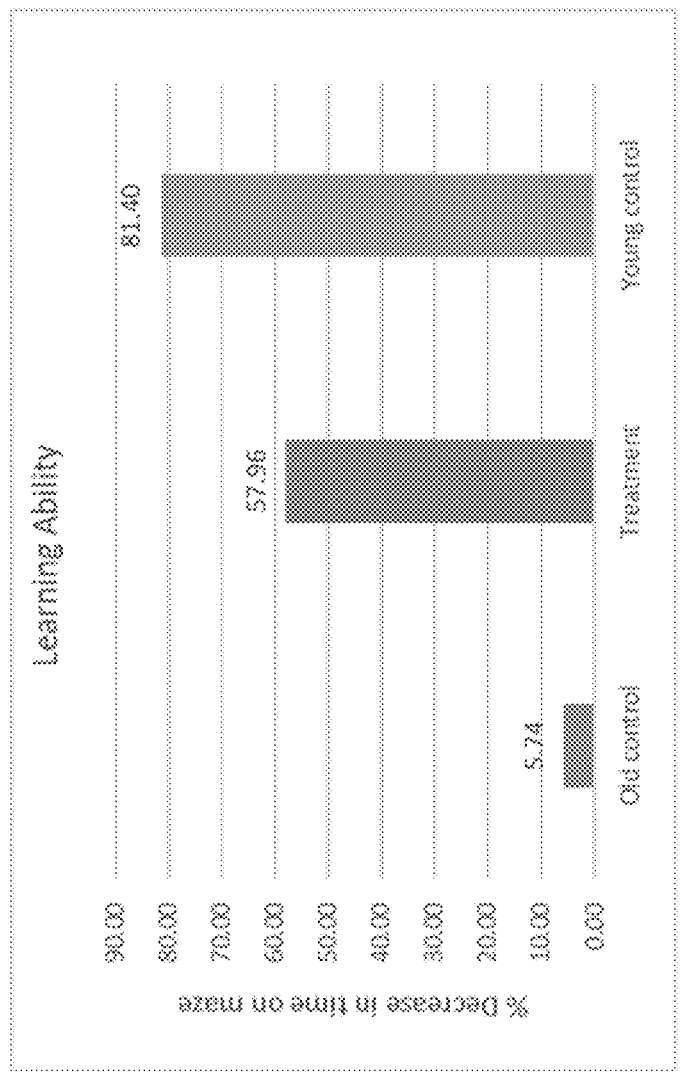
FIG. 2 shows the learning ability to use a Barnes maze of old control, young group, and old animals who received treatment with a concentrated, purified plasma fraction (6 animals per group).

The decline of cognitive function is a well-characterized feature of increasing age. Learning and memory, which are constituent characteristics of cognitive functions, decline not only in human but also in rats, starting from 12 months of age. A Barnes maze was used to measure the latency period required by the rats to escape through the right hole into an escape box. The data shown in FIG. 2 shows the percent decrease in latency time spent on a maze by rats.

The data represented in FIGS. 3A-3D shows month-wise decrease latency time in seconds spent on a maze by rats. The data of day 18 to day 26, day 48 to day 56, day 118 to day 126 and day 143 to day 151 after treatment was compared to determine the learning ability. Data were expressed as mean±SEM. Statistical analysis were performed by 'Two-way ANOVA' with Bonferroni's multiple comparison test, and $P<0.05$ was considered statistically significant. ####$P<0.001$ as compared with the old control group; **$P<0.01$, *$P<0.05$ as compared with the young control group.

The Barnes maze platform (91 cm diameter, elevated 90 cm from the floor) consisted of 20 holes (each 5 cm in diameter). All holes were blocked except for one target hole that led to a recessed escape box. Spatial cues, bright light, and white noise were used to motivate the rat to find the escape during each session. For the adaptation phase, each rat explored the platform for 60 s. Any rat that did not find the escape box was guided to it and remained there for 90 s. For the acquisition phase, each trial followed the same protocol, with the goal to train each rat to find the target and enter the escape box within 180 s. The rat remained in the box for an additional 60 s. Four trials per day, approximately 15 min apart, were performed for 6 consecutive days (Flores et al., 2018). This assay protocol within a Barnes maze was used to determine the learning ability of the animals upon treatment, and the assay was performed in each month of the experiment.

Figure 3A:
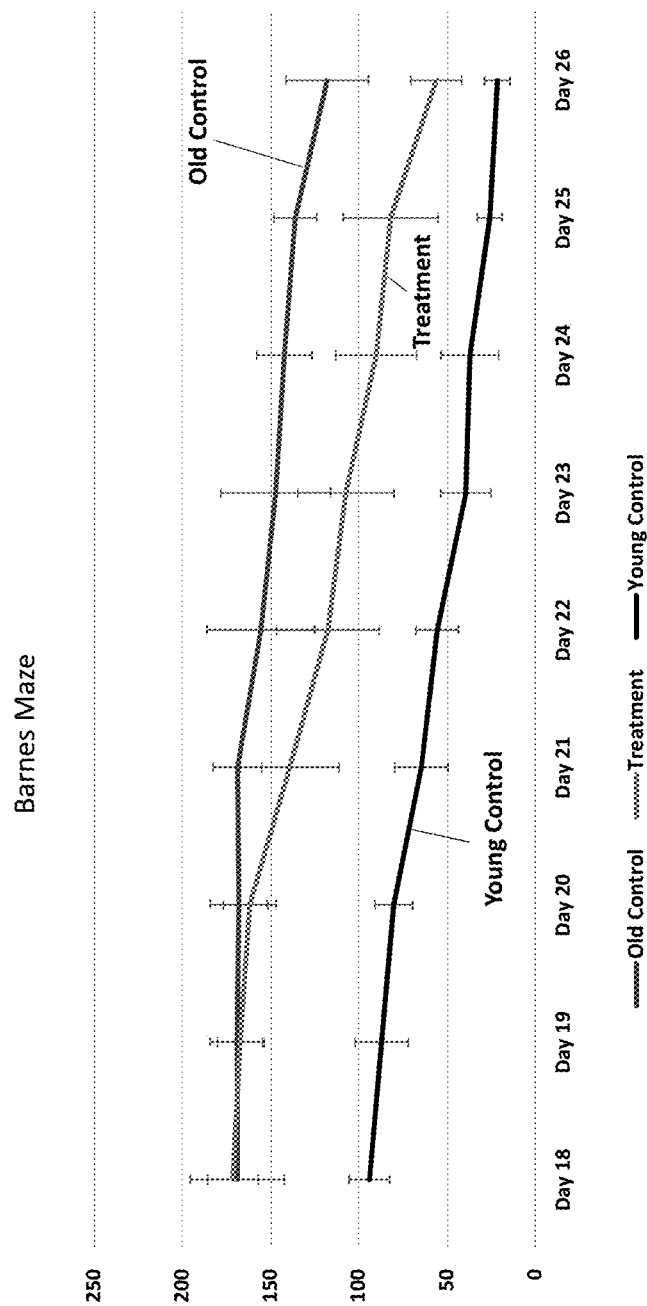
FIGS. 3A-3D show time courses of learning ability to use a Barnes maze of old control, young group, and old animals who received treatment with a concentrated, purified plasma fraction, upon 1 month of treatment (FIG. 3A), 2 months of treatment (FIG. 3B), 3 months of treatment (FIG. 3C), and 4 months of treatment (FIG. 3D). ####P<0.001 for the old treatment group compared with the old control group; **P<0.01, *P<0.05 for the old treatment group compared with the young control group.
Figure 3B:
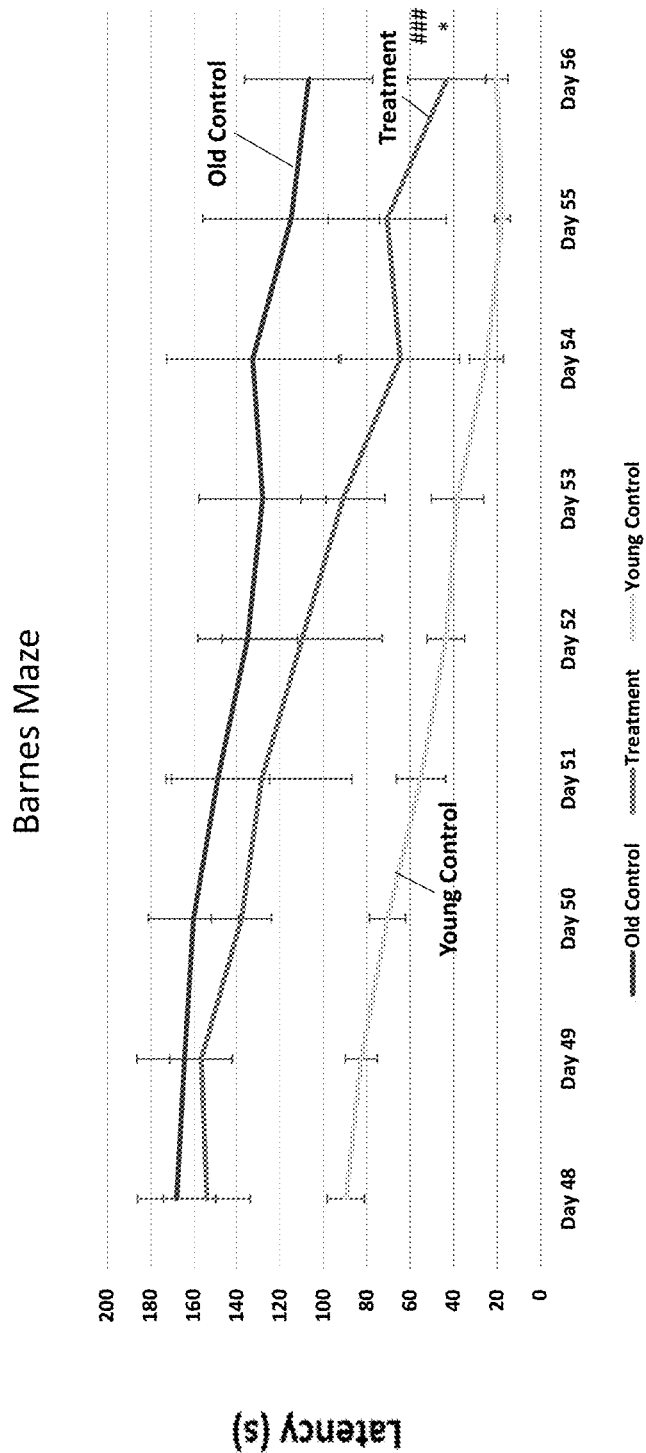
Figure 3C:
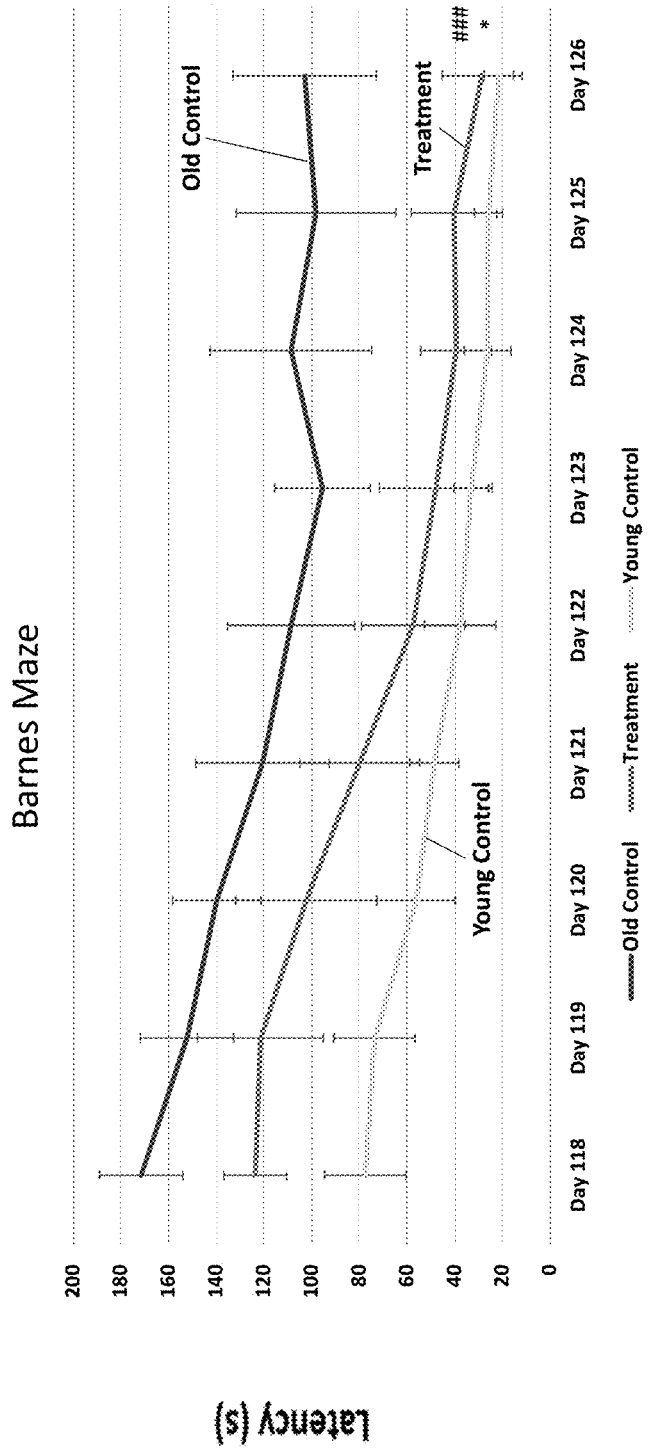
Figure 3D:
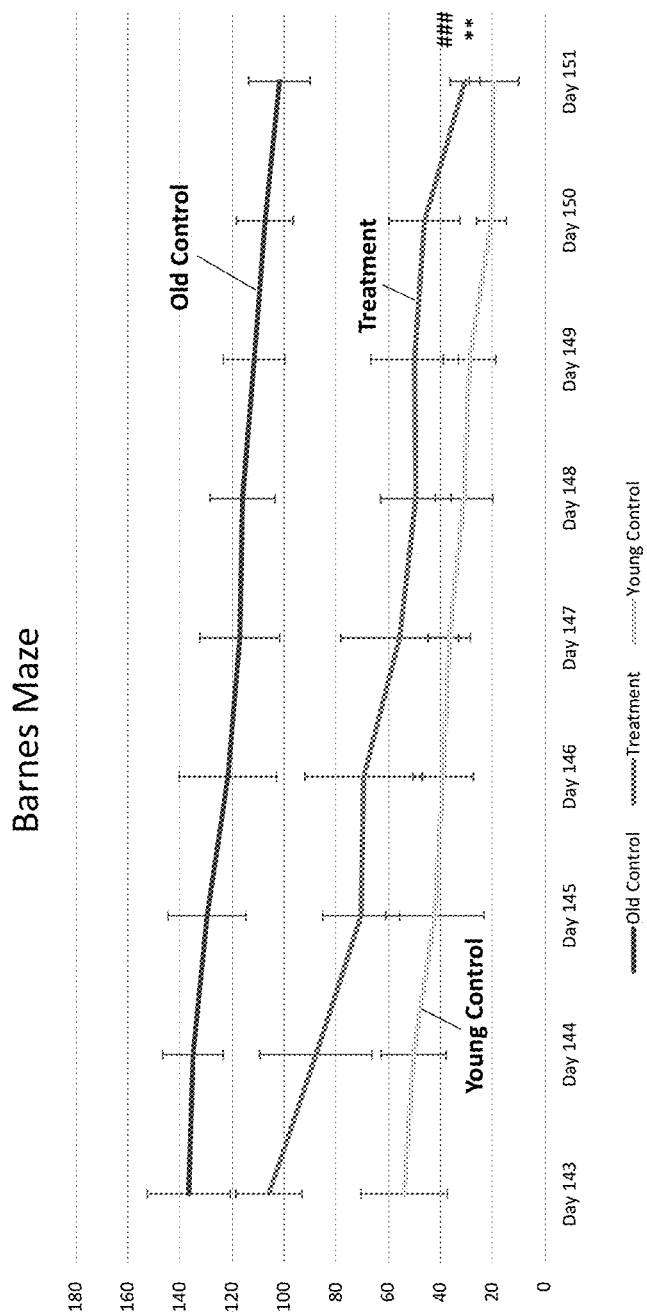

Within a month of plasma fraction treatment (FIG. 3A), the treated old rats exhibited significantly reduced latency to escape, i.e., they learned and remembered better. After the second month (FIG. 3B), the treated old rats began with a slightly reduced latency period compared to the untreated old rats, and once again, they learned much faster than the latter. By the third month (FIG. 3C), it was clear that treated old rats remembered the maze much better than the untreated old rats, even from the first day of test, as their latency period was significantly reduced, and by the end of the test period their latency was similar to that of the young control rats. This feature was sustained and repeated in the fourth month (FIG. 3D). Collectively, these results show that plasma fraction treatment improved the learning and memory of the old treated rats.

Example 6

Hematological Parameter Evaluations of Rats During Treatment

This example demonstrates the evaluation of hematological parameters of rats over the course of 155 days of plasma fraction treatment.

Blood was collected from the retro-orbital plexus of rats using heparinized capillary tubes before plasma fraction treatment, and on the 60$^{th}$ and 155$^{th}$ day of the experiment. The levels of hemoglobin (Hb), red blood cell count (RBC), packed cell volume (PCV), mean corpuscular volume (MCV), mean corpuscular hemoglobin (MCH), mean corpuscular hemoglobin concentration (MCHC), platelets, and lymphocytes (Lymps) were analyzed in the blood samples for all experimental groups (i.e., the old control group, old treatment group, and young control group).

The hematological parameters of animals were evaluated at 0 day, 60 day, and 155 day of the study. Data represented in Table 6 shows a slight difference in hematological parameters among the groups.

TABLE 6

Hematological parameters at initial, 60 days, and 115 days of treatment.

| Day | Groups | Hb (gm %) | RBC (×10⁶/ cmm) | WBC (×10³/ cmm) | Platelet (×10⁵/ cmm) | HCT (%) | MCV (fl) | MCH (pg) | MCHC (g/dL) | Lymps (10³ cells/µL) |
|---|---|---|---|---|---|---|---|---|---|---|
| 0 | Old Control | 13.10 ± 0.8 | 6.65 ± 0.5 | 10.87 ± 1.0 | 803.00 ± 6.2 | 43.03 ± 1.0 | 54.34 ± 0.9 | 19.29 ± 0.8 | 22.86 ± 0.7 | 6.48 ± 0.8 |
|  | Treatment | 13.26 ± 1.0 | 6.21 ± 0.6 | 10.63 ± 1.2 | 801.83 ± 5.3 | 41.61 ± 2.1 | 53.27 ± 1.5 | 19.13 ± 0.7 | 21.31 ± 1.2 | 6.35 ± 1.1 |
|  | Young Control | 14.85 ± 0.9 | 5.28 ± 0.9 | 9.40 ± 0.7 | 705.33 ± 8.0 | 40.31 ± 0.6 | 49.83 ± 1.3 | 17.74 ± 1.0 | 18.10 ± 1.1 | 5.17 ± 0.7 |
| 60 | Old Control | 13.46 ± 0.9 | 6.93 ± 0.4 | 10.22 ± 0.4 | 804.17 ± 4.0 | 42.11 ± 1.7 | 55.01 ± 0.9 | 20.65 ± 0.8 | 23.68 ± 1.3 | 6.04 ± 0.3 |
|  | Treatment | 14.52 ± 1.5 | 6.07 ± 0.4 | 9.30 ± 0.6 | 791.67 ± 7.2 | 40.11 ± 1.3 | 51.60 ± 1.2 | 18.02 ± 1.0 | 19.64 ± 1.3 | 5.92 ± 0.7 |
|  | Young Control | 14.24 ± 0.5 | 5.41 ± 0.4 | 9.17 ± 0.5 | 706.17 ± 7.6 | 40.14 ± 1.1 | 50.40 ± 0.8 | 19.36 ± 0.7 | 19.76 ± 1.3 | 5.51 ± 0.9 |
| 155 | Old Control | 13.56 ± 0.5 | 6.87 ± 0.6 | 10.65 ± 0.5 | 806.50 ± 5.1 | 42.86 ± 0.8 | 54.71 ± 0.9 | 21.77 ± 1.0 | 24.16 ± 0.8 | 6.08 ± 0.2 |
|  | Treatment | 14.26 ± 0.9 | 5.90 ± 06 | 9.16 ± 0.3 | 789.00 ± 3.5 | 40.80 ± 1.4 | 50.63 ± 1.3 | 18.97 ± 0.7 | 18.99 ± 0.8 | 5.72 ± 0.5 |
|  | Young Control | 14.21 ± 0.7 | 5.55 ± 0.6 | 9.28 ± 0.9 | 709.83 ± 7.7 | 39.88 ± 1.0 | 50.55 ± 0.7 | 19.52 ± 0.7 | 19.81 ± 1.0 | 5.51 ± 0.7 |

Data was expressed as mean±SEM. Statistical analysis were performed by 'Two-way ANOVA' with Bonferroni's multiple comparison test. The statistical analyses show that $P>0.05$, and the groups are not significantly different from one another.

These blood indices are informative indicators of malfunction of bone marrow and vital organs and importantly, they vary with the age of the animal. It will be appreciated that these blood indices were different between young control and old rats of either the old control or old treatment group at the start of the experiment, and in time, plasma fraction treatment modified these parameters in treated older rats towards those of the young control group, with the exception of platelets. Plasma fraction treatment did not cause any changes to the blood indices that would indicate any organ dysfunction. Instead upon treatment with the concentrated purified plasma fraction the blood of the old treated rats because more similar to the younger rats, as determined by modification of the hematological parameters towards those of the young control group.

Example 7

Biochemical Parameter Evaluations of Rats During Treatment

This example demonstrates the evaluation of biochemical parameters of rats over the course of 155 days of plasma fraction treatment.

Blood samples were collected from the retro-orbital plexus using heparinized capillary tubes before the treatment and on the $30^{th}$, $60^{th}$, $90^{th}$, $125^{th}$ and $155^{th}$ day of the experiment Determination of the levels of serum glutamate pyruvate transaminase (S.G.P.T-IU/L) were carried out by a kinetic method recommended by International Federation of Clinical Chemistry (IFCC). All the tests were performed with commercially available diagnostic kits (Erba Mannheim, Germany on Erba Mannheim biochemistry semi auto analyzer). Kidney function test-like determination of serum creatinine (mg/dL) and uric acid (mg/dL) levels were done according to a modified Jaffe's reaction with commercially available diagnostic kits (Erba Mannheim, Germany on Erba Mannheim biochemistry semi auto analyzer). Blood glucose level (Random) (mg/dL) (Gaikwad et al., 2015), total protein (g/dL), total bilirubin (mg/dL), direct bilirubin (mg/dL), triglyceride (mg/dL), HDL (mg/dL), cholesterol (mg/dL), and albumin (g/dL) ((Erba Mannheim), were determined.

Data represented in Table 7 shows changes in the biochemical parameters in animals at various time points during plasma fraction treatment.

TABLE 7

Summary of biochemical parameter results.

| Parameter | Group | Old control | Treatment | Young Control |
|---|---|---|---|---|
| Total Bilirubin (mg/dL) | 0 Day | 0.90 ± 0.10 | 0.90 ± 0.11 | 0.56 ± 0.08 |
|  | 30 Day | 0.92 ± 0.09 | 0.83 ± 0.12 | 0.55 ± 0.09 |
|  | 60 Day | 0.92 ± 0.11 | 0.82 ± 0.10 | 0.57 ± 0.08 |
|  | 90 Day | 0.97 ± 0.11 | 0.78 ± 0.09 | 0.57 ± 0.08 |
|  | 125 Day | 1.02 ± 0.12 | 0.72 ± 0.09 | 0.59 ± 0.08 |
|  | 155 Day | 1.08 ± 0.12 | 0.68 ± 0.07 ### * | 0.60 ± 0.07 |
| Direct Bilirubin (mg/dL) | 0 Day | 0.575 ± 0.06 | 0.583 ± 0.07 | 0.257 ± 0.05 |
|  | 30 Day | 0.588 ± 0.06 | 0.563 ± 0.06 | 0.258 ± 0.05 |
|  | 60 Day | 0.605 ± 0.07 | 0.520 ± 0.05 | 0.273 ± 0.04 |
|  | 90 Day | 0.618 ± 0.06 | 0.490 ± 0.06 | 0.283 ± 0.04 |
|  | 125 Day | 0.640 ± 0.06 | 0.468 ± 0.07 | 0.293 ± 0.05 |
|  | 155 Day | 0.680 ± 0.08 | 0.438 ± 0.04 ### *** | 0.308 ± 0.04 |
| Glucose (mg/dL) | 0 Day | 173.0 ± 5.57 | 174.9 ± 4.97 | 152.0 ± 8.80 |
|  | 30 Day | 174.4 ± 5.13 | 169.6 ± 2.88 | 152.3 ± 8.34 |

TABLE 7-continued

Summary of biochemical parameter results.

| Parameter | Group | Old control | Treatment | Young Control |
|---|---|---|---|---|
| | 60 Day | 178.7 ± 5.02 | 167.5 ± 3.53 | 155.4 ± 8.69 |
| | 90 Day | 180.0 ± 5.37 | 165.3 ± 3.00 | 157.9 ± 9.60 |
| | 125 Day | 183.2 ± 5.04 | 163.5 ± 3.59 | 161.2 ± 9.55 |
| | 155 Day | 186.0 ± 3.32 | 163.6 ± 4.10 ### * | 164.6 ± 10.09 |
| Triglyceride (mg/dL) | 0 Day | 57.2 ± 10.16 | 56.4 ± 10.45 | 25.0 ± 9.01 |
| | 30 Day | 70.5 ± 5.45 | 45.1 ± 6.67 | 28.9 ± 8.80 |
| | 60 Day | 79.3 ± 5.52 | 45.4 ± 5.84 | 30.8 ± 7.83 |
| | 90 Day | 84.1 ± 5.63 | 43.6 ± 6.05 | 33.1 ± 7.25 |
| | 125 Day | 91.4 ± 5.08 | 41.7 ± 5.78 | 34.7 ± 7.92 |
| | 155 Day | 103.7 ± 5.30 | 38.0 ± 5.64 ### | 37.9 ± 8.26 |
| HDL (mg/dL) | 0 Day | 109.7 ± 9.19 | 111.3 ± 8.95 | 142.5 ± 6.71 |
| | 30 Day | 110.7 ± 7.05 | 117.2 ± 8.44 | 144.3 ± 5.92 |
| | 60 Day | 108.9 ± 6.89 | 127.0 ± 8.16 | 145.1 ± 6.25 |
| | 90 Day | 108.0 ± 7.67 | 130.6 ± 9.13 | 147.2 ± 6.70 |
| | 125 Day | 105.9 ± 7.78 | 138.2 ± 10.11 | 149.0 ± 6.49 |
| | 155 Day | 102.3 ± 7.24 | 147.2 ± 8.58 ## ** | 151.6 ± 6.68 |
| Cholesterol (mg/dL) | 0 Day | 46.8 ± 6.74 | 45.9 ± 6.85 | 17.3 ± 3.17 |
| | 30 Day | 48.1 ± 6.49 | 40.3 ± 6.76 | 17.8 ± 4.21 |
| | 60 Day | 49.1 ± 49.1 | 37.6 ± 5.88 | 18.4 ± 4.33 |
| | 90 Day | 50.4 ± 50.4 | 34.9 ± 7.13 | 19.2 ± 4.12 |
| | 125 Day | 53.7 ± 53.7 | 32.0 ± 6.57 | 21.0 ± 3.78 |
| | 155 Day | 56.6 ± 56.6 | 28.1 ± 5.45 ### ** | 23.0 ± 3.75 |
| Creatinine (mg/dL) | 0 Day | 1.08 ± 0.10 | 1.07 ± 0.12 | 0.29 ± 0.02 |
| | 30 Day | 1.06 ± 0.09 | 1.02 ± 0.13 | 0.35 ± 0.04 |
| | 60 Day | 1.31 ± 0.24 | 0.87 ± 0.11 | 0.39 ± 0.03 |
| | 90 Day | 1.54 ± 0.26 | 0.80 ± 0.10 | 0.44 ± 0.04 |
| | 125 Day | 1.78 ± 0.22 | 0.70 ± 0.08 | 0.50 ± 0.03 |
| | 155 Day | 2.03 ± 0.33 | 0.63 ± 0.08 ### * | 0.54 ± 0.02 |
| BUN (mg/dL) | 0 Day | 16.23 ± 1.21 | 16.19 ± 0.92 | 4.03 ± 0.13 |
| | 30 Day | 16.36 ± 1.17 | 15.26 ± 0.74 | 4.07 ± 0.15 |
| | 60 Day | 16.66 ± 1.14 | 14.57 ± 0.66 | 4.14 ± 0.15 |
| | 90 Day | 16.80 ± 1.17 | 13.27 ± 0.78 | 4.22 ± 0.15 |
| | 125 Day | 16.99 ± 1.20 | 11.05 ± 0.79 | 4.32 ± 0.16 |
| | 155 Day | 17.11 ± 1.22 | 8.94 ± 0.73 ### *** | 4.46 ± 0.15 |
| SGPT (IU/L) | 0 Day | 34.30 ± 1.65 | 34.12 ± 1.91 | 22.20 ± 1.48 |
| | 30 Day | 34.06 ± 1.42 | 32.20 ± 1.52 | 23.25 ± 1.52 |
| | 60 Day | 34.93 ± 1.21 | 30.78 ± 1.41 | 24.56 ± 1.43 |
| | 90 Day | 36.02 ± 1.18 | 29.78 ± 1.03 | 25.70 ± 1.78 |
| | 125 Day | 37.16 ± 1.11 | 28.87 ± 0.89 | 27.05 ± 1.84 |
| | 155 Day | 38.29 ± 1.23 | 28.03 ± 0.76 ### * | 27.56 ± 1.52 |
| SGOT (IU/L) | 0 Day | 86.24 ± 3.77 | 86.79 ± 2.35 | 41.53 ± 1.93 |
| | 30 Day | 90.02 ± 3.95 | 80.74 ± 2.15 | 44.86 ± 1.87 |
| | 60 Day | 92.41 ± 3.69 | 75.26 ± 2.28 | 45.39 ± 1.78 |
| | 90 Day | 94.97 ± 3.87 | 66.39 ± 3.17 | 47.55 ± 2.41 |
| | 125 Day | 96.18 ± 3.33 | 60.60 ± 1.22 | 50.39 ± 2.36 |
| | 155 Day | 97.45 ± 2.38 | 54.13 ± 1.85 ### ** | 53.54 ± 2.43 |
| Total protein (g/dL) | 0 Day | 7.59 ± 1.06 | 7.75 ± 0.88 | 4.74 ± 0.95 |
| | 30 Day | 8.22 ± 1.07 | 7.55 ± 0.78 | 5.15 ± 0.73 |
| | 60 Day | 8.73 ± 0.73 | 7.39 ± 0.80 | 5.57 ± 0.77 |
| | 90 Day | 9.83 ± 0.59 | 7.15 ± 0.94 | 5.81 ± 0.87 |
| | 125 Day | 10.96 ± 0.35 | 7.04 ± 0.88 | 6.56 ± 0.80 |
| | 155 Day | 12.14 ± 0.53 | 7.12 ± 0.86 ## | 7.01 ± 0.86 |

Data was expressed as mean±SEM, and analyzed by 'Two-way ANOVA' followed by Bonferroni's multiple comparison test; $P<0.05$ was considered statistically significant. ###$P<0.001$, ##$P<0.01$ as compared with the old control group; *$P<0.01$, $P<0.01$, *$P<0.05$ as compared with the young control group.

The liver function tests and kidney function tests demonstrated improvement in organ function in the old treated group compared to the old control group after 8-8 (16) days of treatment. Bilirubin, serum glutamic-pyruvic transaminase (SGPT), and serum glutamic-oxaloacetic transaminase (SGOT) were used to monitor liver function; triglycerides (TG), HLD and cholesterol, were used to monitor risk of atherosclerosis and heart disease, in addition to liver function. Glucose was used to monitor the pancreas and diabetes, while creatinine and blood urea nitrogen was used to monitor for kidney function. The levels of all these biomarkers in the treated old rats were altered towards the values of young rats upon treatment. Collectively, these results show that the function of all the vital organs tested through their respective biomarkers, were rejuvenated by plasma fraction treatment. This is consistent with reversal of the epigenetic ages of their hearts and livers and successful treatment of age-related phenotypes.

Example 8

Grip Strength of Rats During Treatment

Figure 4:
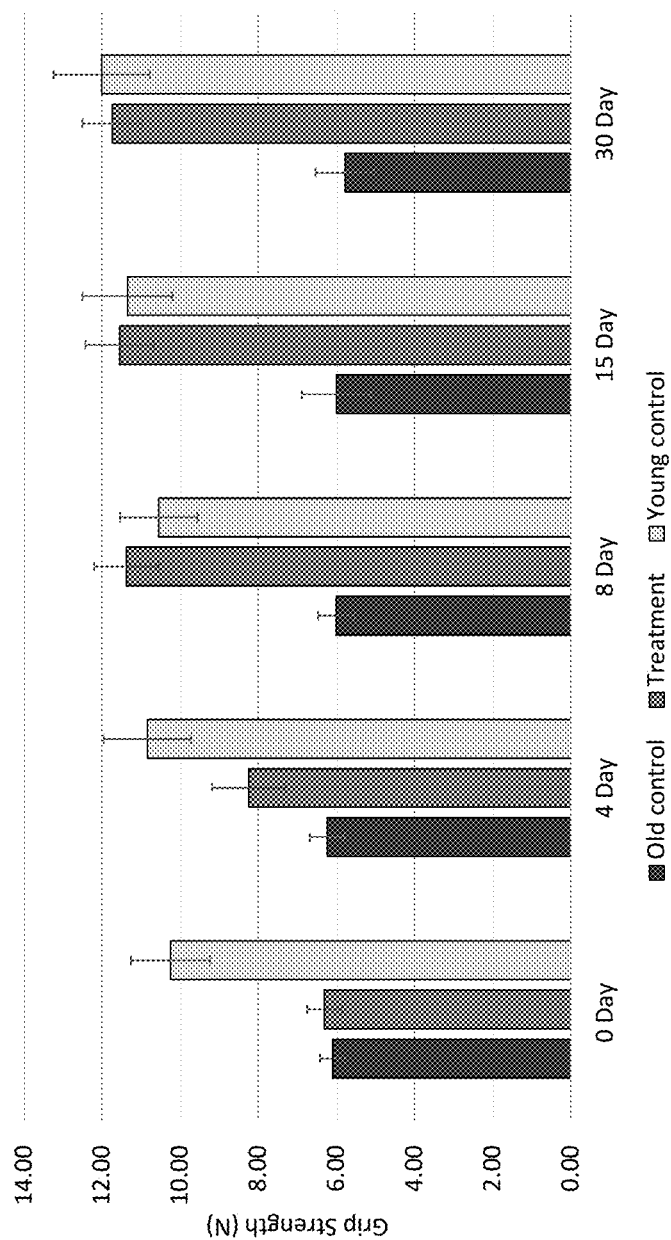
FIG. 4 shows the grip strength of old control, young group, and old animals who received treatment with a concentrated, purified plasma fraction (6 animals per group).

This example demonstrates the grip strength of rats over the course of 30 days of plasma fraction treatment. As seen in FIG. 4, the grip strength of the old control group was lower than the young control group. The treated old rats had increased grip strength compared to the old control following treatment (FIG. 4).

Example 9

Oxidative Stress Biomarker Evaluations of Rats Following Treatment

This example demonstrates the evaluation of various oxidative stress biomarkers of rats after 155 days of plasma fraction treatment.

Oxidative stress is the result of excessive production of oxidant species and/or depletion of intracellular antioxidant defenses, leading to an imbalance in the redox status of the cells. This causes reactive oxygen species (ROS) to react with lipids, protein and other cellular constituents, causing damage to mitochondria and cell membranes of the brain, heart, lung, and liver cells. In addition to the decline of organ function with age, there is generally a concurrent rise of two related cell stress features, namely oxidative stress and chronic inflammation. Excess amounts of these cell stress features has been linked to multiple pathologies.

Animals were sacrificed after completion of 155 days of the study and levels of various anti-oxidant markers were measured in brain, heart, lung, and liver. In particular, this example demonstrates the estimation of the extent of lipid peroxidation (LPO) (Malondialdehyde (MDA), estimation of reduced glutathione (GSH), determination of catalase activity, and estimation of superoxide dismutase (SOD) activity, in animals after 155 days of treatment.

Tissue Sample Preparation

At the end of the experiment, brain, heart, lung, and liver were isolated, and 10% tissue homogenate was prepared in ice-cold 50 mM phosphate buffer saline (PBS, pH=7.4) using a homogenizer followed by sonication for 5 min. The homogenate was centrifuged at 2000×g for 20 min at 4° C., and aliquots of supernatant were collected and stored at −20° C. for further evaluation.

Lipid Peroxidation (MDA) Levels

Levels of malondialdehyde (MDA), which is the end-product of poly-unsaturated fatty acid peroxidation, are an indication of the levels of cellular ROS.

In order to determine the extent of LPO (e.g., using MDA), the brain, heart, lung, and liver tissue homogenate samples were treated with 1% phosphoric acid solution and an aqueous solution of 0.6% thiobarbituric acid. The reaction mixture was heated at 80° C. for 45 mins, cooled in an ice bath, and extracted with 4.0 mL of n-butanol. The n-butanol layer was separated and the absorbance of the pink complex formed was estimated at 532 nm, as an indicator of the extent of lipid peroxidation. Table 8 shows the MDA concentrations as determined by this assay.

TABLE 8

| MDA concentration in vital organs of animals (n = 6) after completion of 155 days of study. | | | | |
|---|---|---|---|---|
| | Brain | Heart | Lung | Liver |
| Old Control | 43.62 | 77.99 | 64.61 | 119.39 |
| Treatment | 21.11 ## | 17.79 ### | 21.62 ## * | 31.86 ### |
| Young Control | 18.36 | 16.33 | 14.49 | 22.93 |

Data was expressed as mean±SEM, and analyzed by 'One-way ANOVA' followed by Bonferroni's multiple comparison test; $F(2, 15)=14$ (Brain), $F(2, 15)=29$ (Heart), $F(2, 15)=26$ (Lung) and $F(2, 15)=63$ (Liver); $P<0.05$ was considered statistically significant. ###$P<0.001$, ##$P<0.01$ as compared with the old control group; *$P<0.05$ as compared with the young control group.

Figure 5:
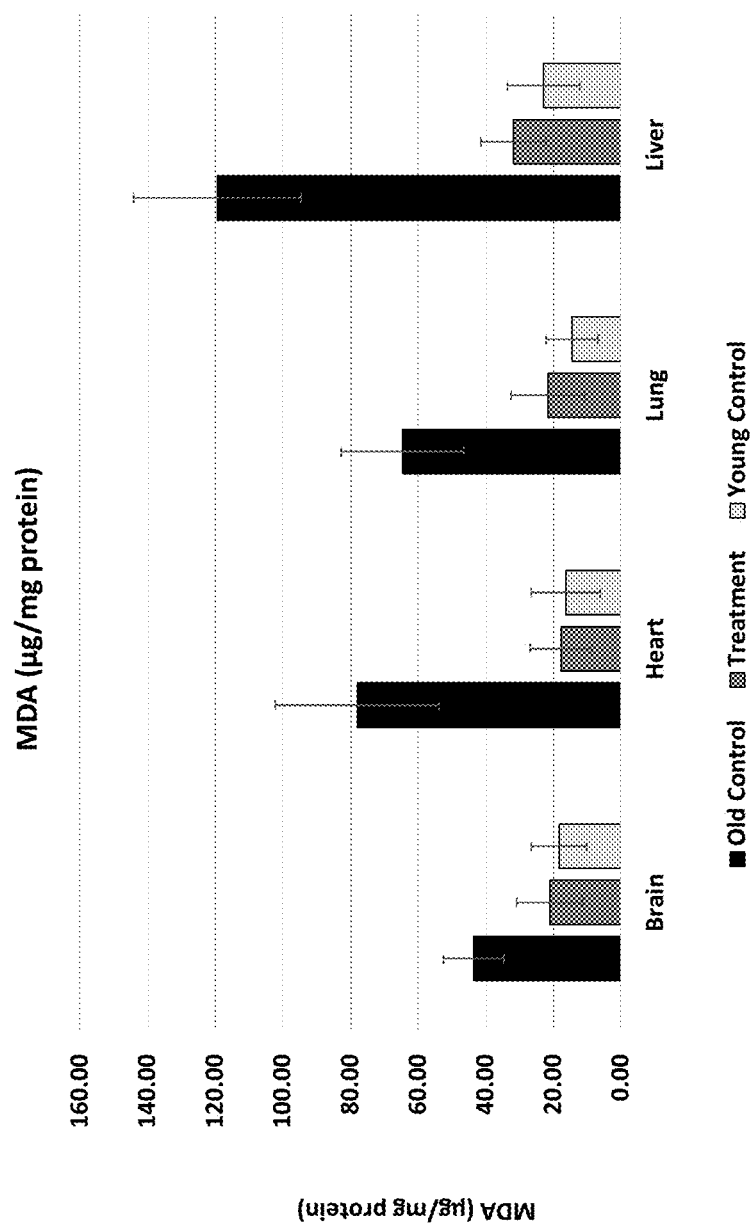
FIG. 5 shows the MDA concentration in vital organs of old control, young group, and old animals who received treatment with a concentrated, purified plasma fraction (n=6) after 155 days.

The amounts of MDA were higher in the brain, heart, lung, and liver of older rats compared to younger rats. Concentrated, purified plasma fraction treatment reduced the level of MDA in older treated rats to that of young rats (FIG. 5). This shows that treatment reduced the lipid peroxidation in brain, heart, lung, and liver tissue in older rats.

Glutathione Levels

Glutathione (GSH) is important in preventing damage to vital cellular components caused by reactive oxygen species such as free radicals, peroxides, lipid peroxides and heavy metals. The GSH content in the brain, heart, lung, and liver tissue homogenate of animals was determined by treating the homogenate with 5,5'-dithiobis-(2-nitrobenzoic acid) (i.e., the DTNB method). Briefly, 20 μL of tissue homogenate was treated with 180 μL of 1 mM DTNB solution at RT. The optical density of resulting yellow color was measured at 412 nm using a microplate spectrophotometer (Powerwave XS, Biotek, USA), shown in Table 9.

TABLE 9

Reduced glutathione concentration in vital organs of
animals (n = 6) after completion of 155 days of study.

| | Brain | Heart | Lung | Liver |
|---|---|---|---|---|
| Old Control | 18.55 | 25.20 | 13.96 | 15.03 |
| Treatment | 38.67 ## | 62.92 ## | 33.85 # * | 54.02 ### * |
| Young Control | 41.09 | 68.38 | 36.20 | 60.86 |

Data was expressed as mean±SEM, and analyzed by 'One-way ANOVA' followed by Bonferroni's multiple comparison test; $F(11, 60)=9.5$ (Brain), $F(2, 15)=5.3$ (Heart), $F(2, 15)=5.3$ (Lung), $F(2, 15)=20$ (Liver); $P<0.05$ was considered statistically significant. ####$P<0.001$, ##$P<0.01$, #$P<0.05$ as compared with the old control group; **$P<0.01$ and *$P<0.05$ as compared with the young control group.

Figure 6:
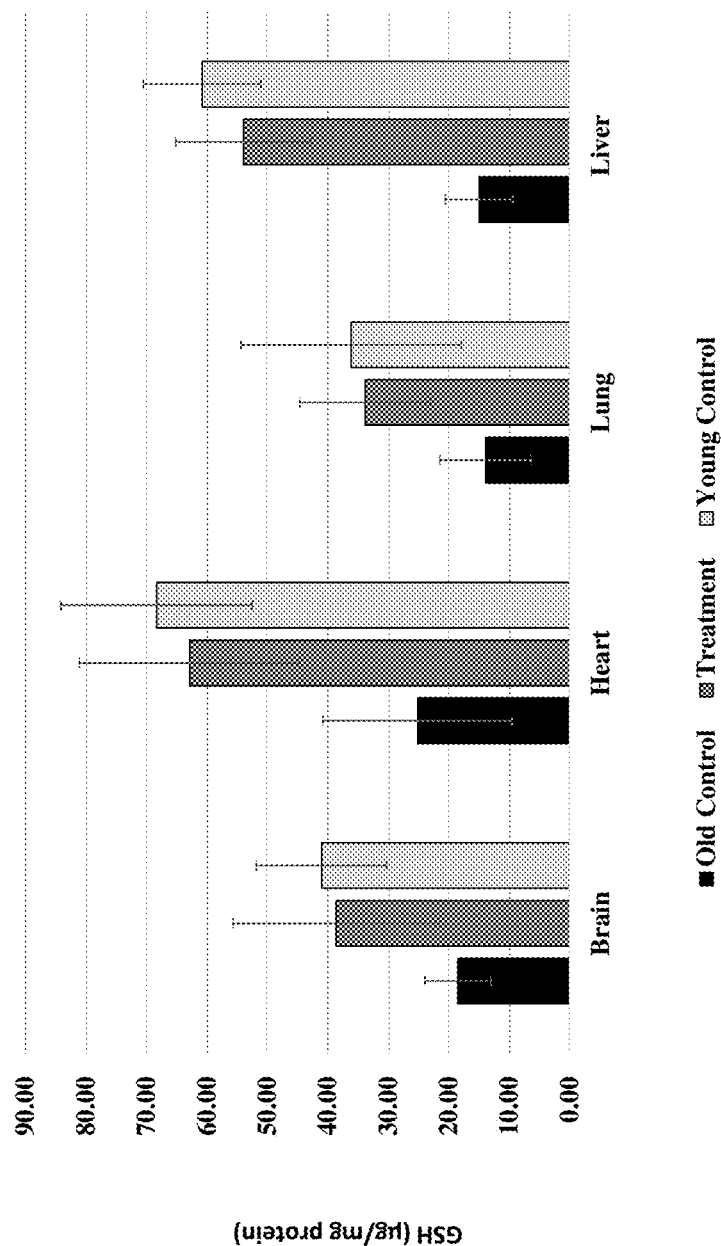
FIG. 6 shows the GSH concentration in vital organs of old control, young group, and old animals who received treatment with a concentrated, purified plasma fraction (n=6) after 155 days.

The GSH concentration decreased in the old control group, while the GSH concentrations in brain, heart, lung, and liver were similar in the old treatment group and the young control group (FIG. 6).

Catalase Activity

Alternation in catalase enzyme activity is another indication of oxidative stress in tissue. To determine catalase activity, the brain, heart, lung, and liver tissue homogenate (20 μL) was added to 1 mL of 10 mM $H_2O_2$ solution in a quartz cuvette. The reduction in optical density of this mixture was measured by using spectrophotometer in UV mode at 240 nm. The rate of decrease in the optical density across 3 mins from the addition of heart homogenate was taken as an indicator of the catalase activity present in the homogenate, and is shown in Table 10.

TABLE 10

Catalase activity in vital organs of animals
(n = 6) after completion of 155 days of study.

| | Brain | Heart | Lung | Liver |
|---|---|---|---|---|
| Old Control | 17.93 | 10.72 | 8.83 | 12.14 |
| Treatment | 19.73 # | 18.88 ## | 13.35 ## * | 21.04 ### |
| Young Control | 21.68 | 19.27 | 17.33 | 22.68 |

Data was expressed as mean±SEM, and analyzed by 'One-way ANOVA' followed by Bonferroni's multiple comparison test; $F(11, 60)=3.8$ (Brain), $F(2, 15)=11$ (Heart), $F(2, 15)=26$ (Lung), $F(2, 15)=12$ (Liver); $P<0.05$ was considered statistically significant. ####$P<0.001$, ##$P<0.01$, #$P<0.05$ as compared with the old control group; **$P<0.01$ and *$P<0.05$ as compared with the young control group.

Figure 7:
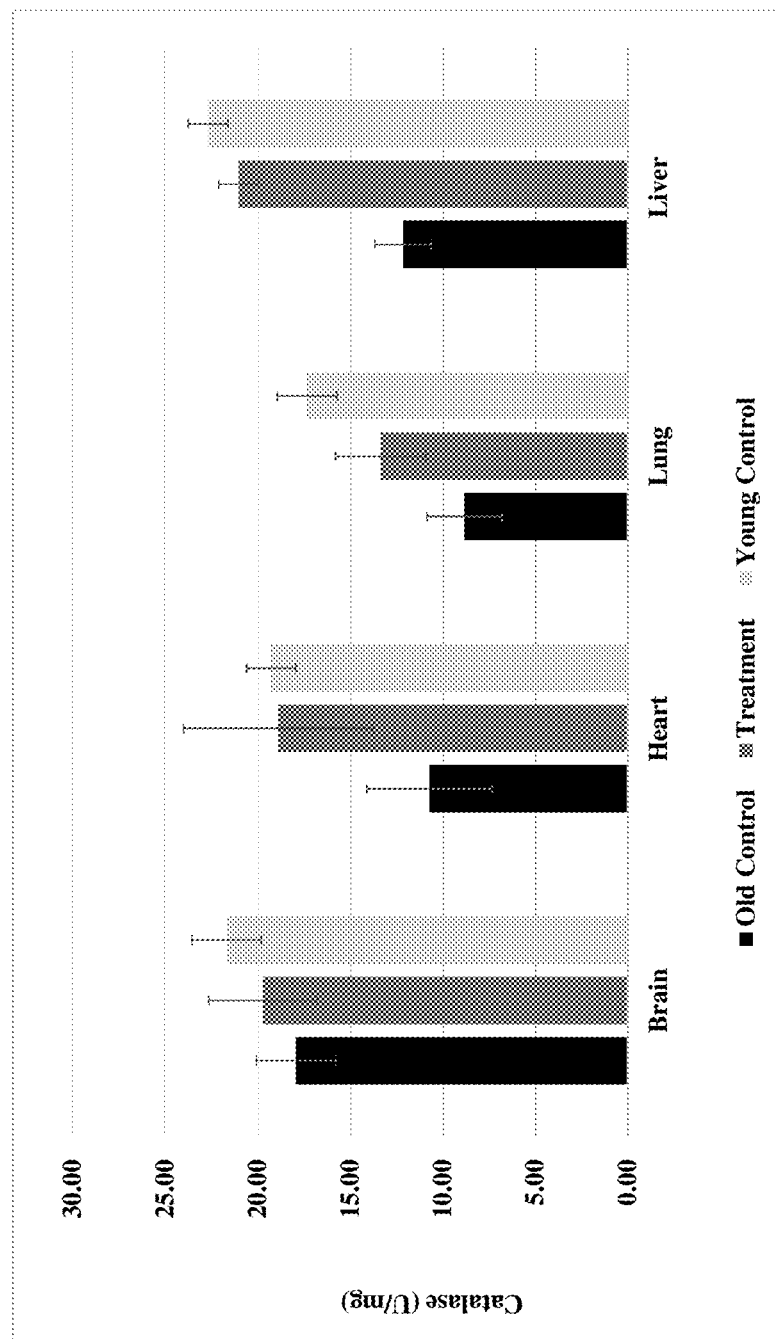
FIG. 7 shows the catalase activity in vital organs of old control, young group, and old animals who received treatment with a concentrated, purified plasma fraction (n=6) after 155 days.

Catalase concentration decreased in the old control group, and after treatment, the concentration of catalase was increased significantly in old treatment group (FIG. 7).

SOD Levels

Changes in SOD levels is an indication of oxidative stress in tissue. To estimate SOD activity, brain, heart, lung, and liver tissue homogenate (20 μL) were added to a mixture of 20 μL of 500 mM/1 of $Na_2CO_3$, 2 mL of 0.3% Triton X-100, 20 μL of 1.0 mM/1 of EDTA, 5 mL of 10 mM/1 of hydroxylamine, and 178 mL of distilled water. To this mixture, 20 μL of 240 μM/1 of nitro blue tetrazolium (NBT) was added. The optical density of this mixture was measured at 560 nm in kinetic mode for 3 mins, at 1 min intervals. The rate increase in the optical density was determined as indicator of the SOD activity, and is shown in Table 11.

TABLE 11

Superoxide dismutase (SOD) activity in vital organs of
animals (n = 6) after completion of 155 days of study.

| | Brain | Heart | Lung | Liver |
|---|---|---|---|---|
| Old Control | 14.65 | 22.62 | 19.34 | 21.53 |
| Treatment | 38.48 ### | 51.60 ### | 34.29 ### * | 41.81 ### * |
| Young Control | 39.14 | 53.59 | 42.64 | 44.13 |

Data was expressed as mean±SEM, and analyzed by 'One-way ANOVA' followed by Bonferroni's multiple comparison test; $F(11, 60)=32$ (Brain), $F(2, 15)=15$ (Heart), $F(2, 15)=31$ (Lung), $F(2, 15)=40$ (Liver); $P<0.05$ was considered statistically significant. ####$P<0.001$ as compared with the old control group; *$P<0.05$ as compared with the young control group.

Figure 8:
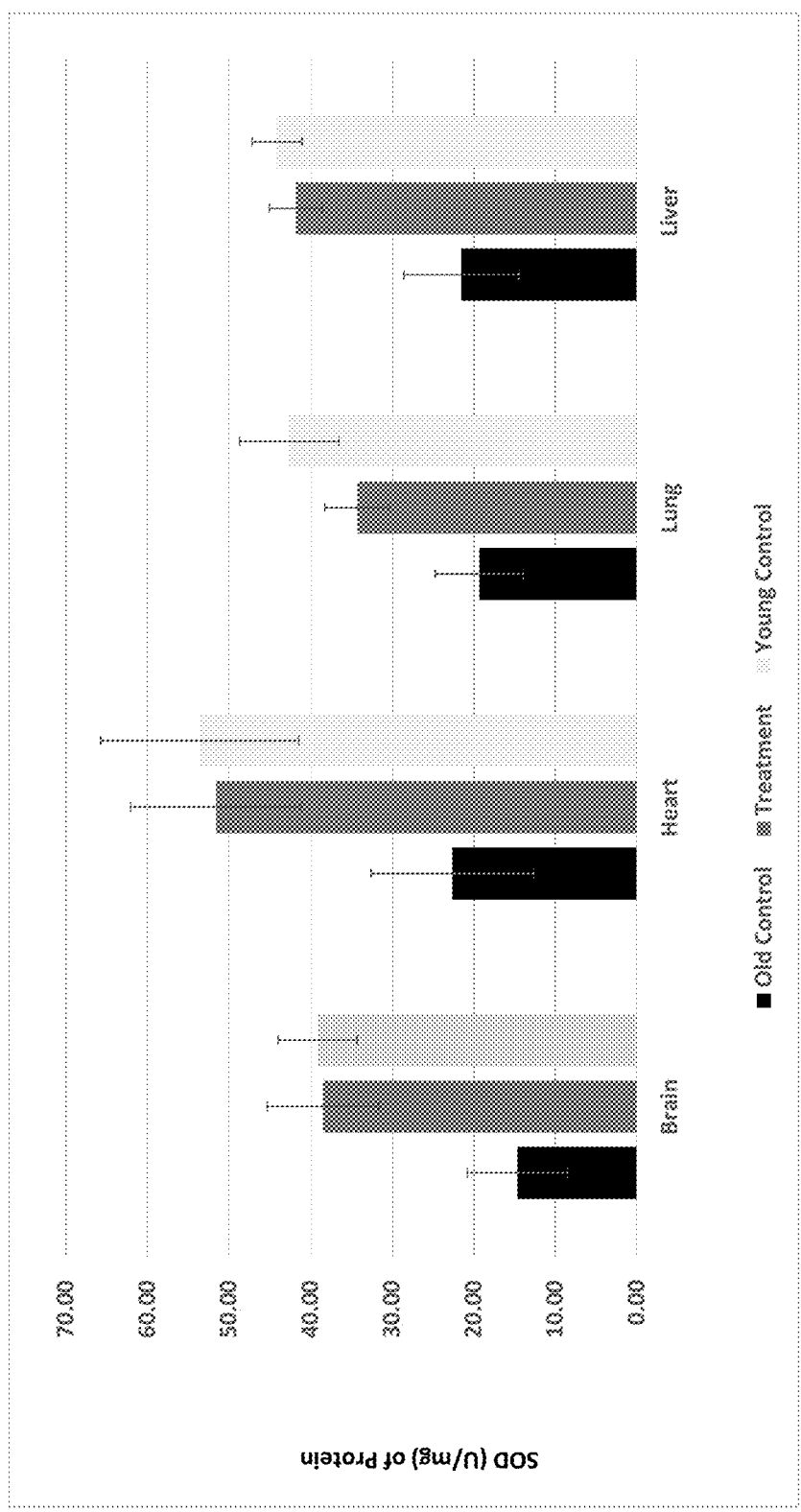
FIG. 8 shows the superoxide dismutase (SOD) activity in different organs of old control, young group, and old animals who received treatment with a concentrated, purified plasma fraction (n=6) after 155 days.

As seen in FIG. 8, the old control group displayed significantly decreased SOD concentration in brain, heart, lung, and liver tissue. Treatment was found to reverse the fall in the SOD levels in the old treated group.

Conclusion

The ROS levels in old treated rats were diminished to the ROS levels in young rats, as illustrated by the decrease in GSH levels, catalase activity, and SOD levels.

Example 10

Pro-Inflammatory Biomarker Evaluations of Rats Following Treatment

IL-6 has been implicated in age associated vascular disease. Indeed, high plasma levels of IL-6 are correlated with greater disability and mortality in older people.

IL-6 and TNF-α levels were estimated in plasma. Blood was removed, plasma was separated as described, and kept at −20° C. until the execution of the assay. The pro-inflammatory cytokine levels, including TNF-α and IL-6, were determined using sandwich ELISA methods according to the manufacturer's protocol, and the values were calculated from the optical density. The levels of IL-6 are summarized in Table 12.

TABLE 12

Levels of Interleukin 6 (IL-6) in animals (n = 6) at various time points.

| Group | Old Control | Treatment | Young Control |
|---|---|---|---|
| | First Dosing (4 Injection) | | |
| 0 Day | 67.60 ± 10.10 | 65.54 ± 1337 | 35.04 ± 7.98 |
| 4 Day | 67.80 ± 10.01 | 59.90 ± 12.55 * | 35.16 ± 8.03 |
| 8 Day | 68.02 ± 10.05 | 32.28 ± 7.33 ### | 35.42 ± 7.87 |
| 15 Day | 68.47 ± 9.95 | 32.42 ± 8.38 | 35.71 ± 8.12 |
| 30 Day | 69.62 ± 9.78 | 35.58 ± 8.12 ## * | 36.45 ± 8.02 |
| 45 Day | 70.71 ± 9.59 | 38.69 ± 12.41 | 36.88 ± 8.06 |
| 52 Day | 71.41 ± 9.42 | 42.98 ± 14.38 | 37.18 ± 8.02 |
| 60 Day | 71.98 ± 9.35 | 46.67 ± 10.32 ### | 37.58 ± 8.00 |
| 75 Day | 73.91 ± 1.97 | 48.49 ± 10.42 | 38.02 ± 8.02 |
| 90 Day | 75.04 ± 10.91 | 49.50 ± 10.43 ### ** | 38.81 ± 8.10 |
| | Second Dosing (4 Injection) | | |
| 95 Day (0 Day) | 75.16 ± 10.96 | 49.62 ± 10.60 | 38.63 ± 8.18 |
| 99 Day (4 Day) | 75.28 ± 10.92 | 44.03 ± 10.19 | 38.79 ± 8.15 |
| 103 Day (8 Day) | 75.40 ± 10.80 | 34.86 ± 10.65 | 38.77 ± 8.24 |
| 110 Day (15 Day) | 75.48 ± 10.90 | 33.61 ± 10.25 ### | 38.65 ± 8.32 |
| 125 Day (30 Day) | 76.53 ± 10.83 | 32.50 ± 10.24 | 39.01 ± 8.29 |
| 140 Day (45 Day) | 79.25 ± 11.12 | 33.23 ± 10.32 | 41.01 ± 9.04 |
| 155 Day (60 Day) | 83.04 ± 10.80 | 36.03 ± 9.30 ### | 42.90 ± 9.16 |

Data was expressed as mean±SEM, and analyzed by 'Two-way ANOVA' followed by Bonferroni's multiple comparison test; P<0.05 was considered statistically significant. ###P<0.001, ##P<0.01 as compared with the old control group; **P<0.01, *P<0.05 as compared with the young control group.

The levels of TNFα are summarized in Table 13.

TABLE 13

Levels of Tumor Necrosis Factor (TNF) α in animals (n = 6) at various time points.

| Group | Old Control | Treatment | Young Control |
|---|---|---|---|
| | First Dosing (4 Injection) | | |
| 0 Day | 125.88 ± 17.51 | 124.60 ± 14.30 | 46.58 ± 8.27 |
| 4 Day | 125.96 ± 17.09 | 110.44 ± 5.50 | 46.84 ± 8.08 |
| 8 Day | 126.40 ± 17.01 | 68.46 ± 8.90 ### * | 47.32 ± 8.02 |
| 15 Day | 127.02 ± 16.88 | 71.25 ± 13.02 | 48.01 ± 8.11 |
| 30 Day | 128.16 ± 16.60 | 69.89 ± 10.81 ### * | 48.90 ± 8.06 |
| 45 Day | 129.60 ± 16.73 | 74.49 ± 9.24 | 49.67 ± 7.99 |
| 52 Day | 129.93 ± 16.50 | 77.87 ± 10.02 | 50.22 ± 7.91 |
| 60 Day | 130.07 ± 16.52 | 82.02 ± 10.75 ### ** | 50.77 ± 8.03 |
| 75 Day | 132.21 ± 17.66 | 86.47 ± 10.02 | 51.47 ± 8.21 |
| 90 Day | 135.07 ± 17.58 | 89.41 ± 10.11 ### ** | 52.98 ± 8.42 |
| | Second Dosing (4 Injection) | | |
| 95 Day (0 Day) | 135.04 ± 17.55 | 89.56 ± 10.31 | 53.05 ± 8.58 |
| 99 Day (4 Day) | 135.26 ± 17.52 | 77.98 ± 11.60 * | 53.09 ± 8.56 |
| 103 Day (8 Day) | 135.33 ± 17.69 | 61.43 ± 16.26 | 53.16 ± 8.60 |
| 110 Day (15 Day) | 135.55 ± 17.43 | 58.75 ± 16.36 ### | 53.24 ± 8.50 |
| 125 Day (30 Day) | 137.65 ± 17.47 | 55.11 ± 15.99 | 54.15 ± 8.09 |
| 140 Day (45 Day) | 139.96 ± 18.55 | 58.09 ± 15.39 | 56.07 ± 8.01 |
| 155 Day (60 Day) | 144.30 ± 19.37 | 60.15 ± 13.94 ### | 57.76 ± 8.11 |

Data was expressed as mean±SEM, and analyzed by 'Two-way ANOVA' followed by Bonferroni's multiple comparison test; P<0.05 was considered statistically significant. ###P<0.001, ##P<0.01 as compared with the old control group; **P<0.01,*P<0.05 as compared with the young control group.

Figure 9:
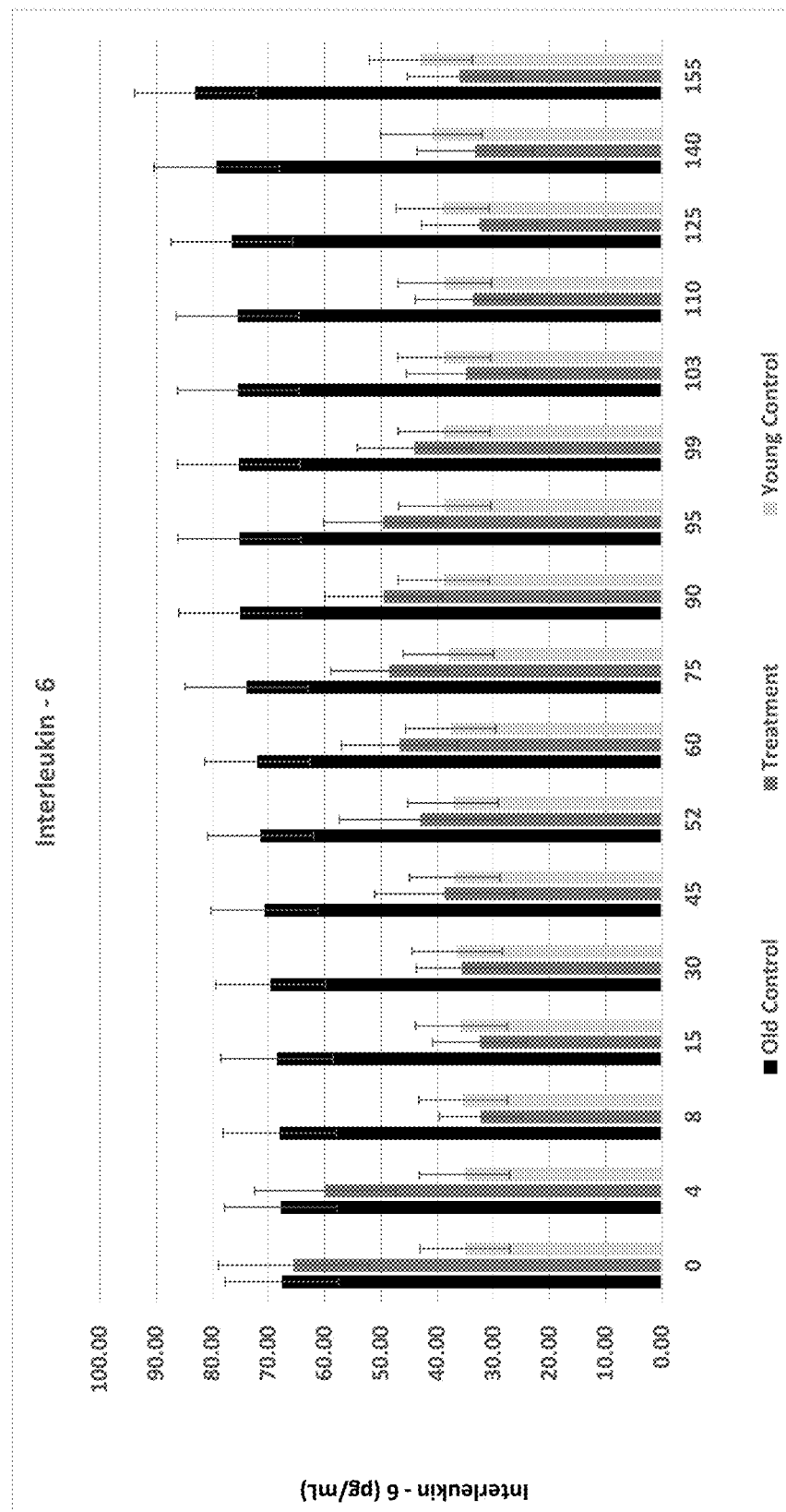
FIG. 9 shows the levels of Interleukin 6 (IL-6) of old control, young group, and old animals who received treatment with a concentrated, purified plasma fraction (n=6) at various time points.

IL-6 and TNFα concentrations were significantly increased in the old control group. Treatment significantly reduced these elevated IL-6 (FIG. 9) and TNF alpha (FIG. 10) concentrations in old treated rats.

Figure 10:
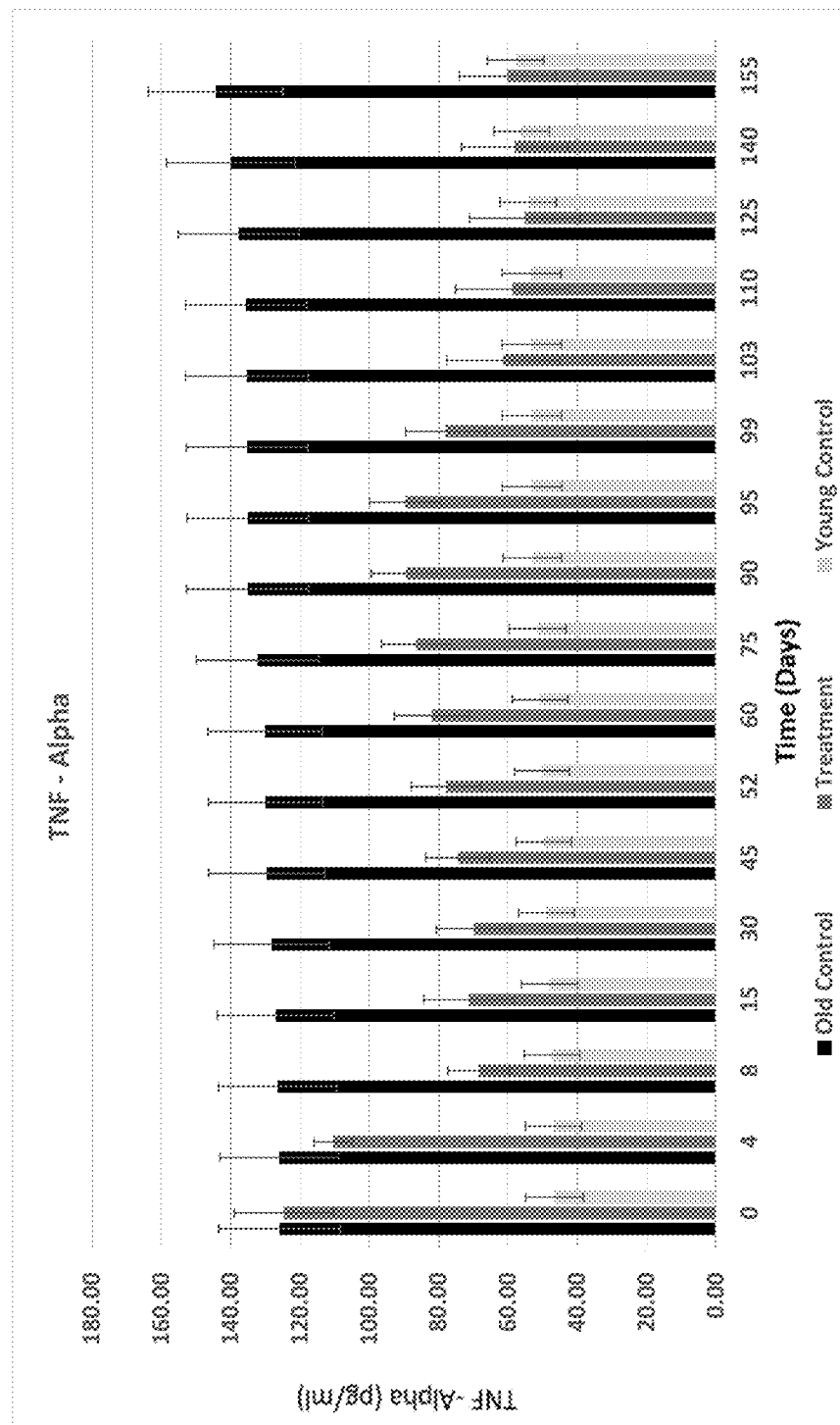
FIG. 10 shows the levels of Tumor Necrosis Factor (TNF) alpha of old control, young group, and old animals who received treatment with a concentrated, purified plasma fraction (n=6) at various time points.
Figure 11:
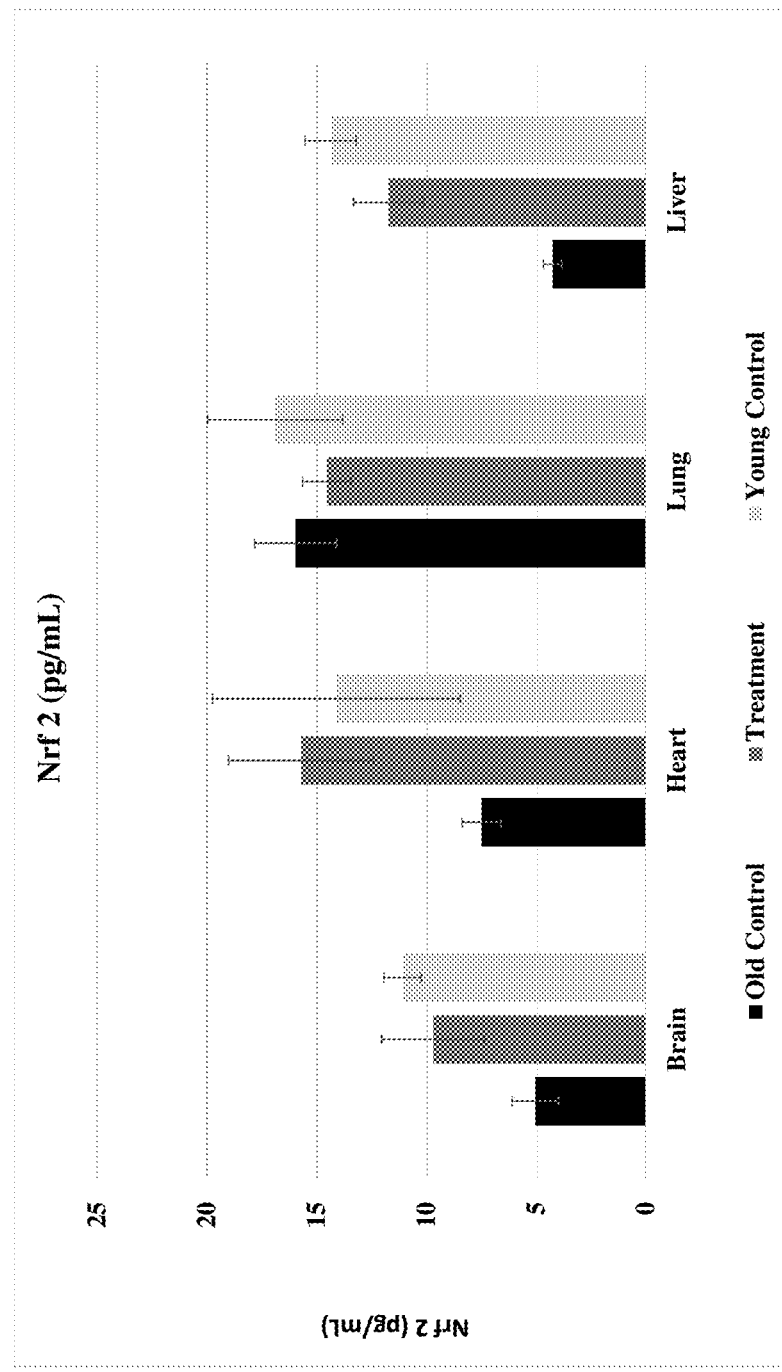
FIG. 11 shows the levels of Nrf2 in vital organs of old control, young group, and old animals who received treatment with a concentrated, purified plasma fraction (n=6) after 155 days.

Inflammation is an important response that helps protect the body, but excess inflammation, especially in terms of duration of this response, may have detrimental effects instead. This occurs when inflammation fails to subside and persists indefinitely; a condition referred to as chronic inflammation that often increases with age, and is associated with various conditions and pathologies. The levels of two of the most reliable and common biomarkers of chronic inflammation, IL-6 and TNFα, were found to be considerably higher in old rats, and were rapidly diminished within days by concentrated, purified plasma fraction treatment to comparable levels with those of young rats (FIGS. 10 & 11). After treatment, the levels of these inflammatory factors began to rise gradually, but they were once again effectively reduced following the second administration of the plasma fraction treatment on the $95^{th}$ day (FIGS. 10 & 11).

Example 11

Evaluation of Nrf2 Levels in Rats Following Treatment

Nrf2 is a key transcription factor in the cellular response to oxidative stress. Increasing oxidative stress is a major characteristic of aging, and has been implicated in variety of age-related pathologies.

The levels of Nrf2 were estimated in brain, heart, lung, and liver homogenate. The organ was removed, and homogenate was prepared and kept at $-20°$ C. until the execution of the assay. The Nrf2 levels were determined using a kit according to the manufacturer's protocol, and the values were calculated from the optical density, as shown in Table 14.

TABLE 14

Levels of Nrf2 in vital organs of animals (n = 6) after completion of 155 days of study.

| | Old Control | Treatment | Young Control |
|---|---|---|---|
| Brain | 5.04 ± 1.05 | 9.69 ± 2.34 # | 11.09 ± 0.84 |
| Heart | 7.49 ± 0.88 | 15.71 ± 3.30 ## | 14.10 ± 5.63 |
| Lung | 15.96 ± 1.86 | 14.53 ± 1.11 # * | 16.90 ± 1.98 |
| Liver | 4.25 ± 0.41 | 11.72 ± 1.58 ### | 14.36 ± 1.16 |

Data was expressed as mean±SEM, and analyzed by 'One-way ANOVA' followed by Bonferroni's multiple comparison test; $F_{(2, 6)}=12$ (Brain), $F_{(2, 6)}=3.9$ (Heart), $F_{(2, 6)}=0.90$ (Lung), $F_{(2, 6)}=61$ (Liver); $P<0.05$ was considered statistically significant. ###$P<0.001$, ##$P<0.01$, #$P<0.05$ as compared with the old control group; *$P<0.05$ as compared with the young control group.

The concentration of Nrf2 was decreased in brain, heart, lung, and liver tissue of the old control group. After treatment, Nrf2 concentration was significantly increased in brain, heart, and liver tissue of old treated rats compared to old control rats (FIG. 11).

The profile of Nrf2 (FIG. 11), which plays major role in resolving inflammation in part by inhibiting the expression of IL-6 and TNFα, is consistent with the reduction of the IL-6 (FIG. 9) and TNF alpha (FIG. 10) inflammation markers shown in Example 9. Nrf2 also induces the expression of antioxidants that neutralizes ROS, which is a significant factor in inflammation. Plasma fraction treatment reduces oxidative stress and chronic inflammation in old treated rats, which are age-associated pan-tissue stresses, to the levels found in young rats.

Example 12

Histopathological Studies of Rat Tissues Following Treatment

This example demonstrates the histopathological evaluation of rat tissues (e.g., brain, heart, spleen, kidney, lung, liver, and testis) following 155 days of plasma fraction treatment.

Brain, heart, spleen, kidney, lung, liver, and testis tissues were fixed in buffered formalin and embedded in paraffin, and serial sections (3 μm thick) were cut using a microtome (Leica R M 2125, Germany). The representative sections were stained with hematoxylin and eosin, and examined under a light microscope (Leica, Germany). The histopathological data was objective and the sections were screened from a pathologist blinded to the treatments.

There were no abnormalities detected (NAD), and lesions suggestive of any toxicity of the plasma fraction treatment were not noted. Histological examinations of the various organs did not indicate any obvious abnormalities after 155 days of treatment.

Example 13

SA-β-Galactosidase Staining of Rat Tissues Following Treatment

This example demonstrates the level of cellular senescence in rat tissues after 155 days of plasma fraction treatment, using SA-β-galactosidase as a marker of the senescent state of cells.

One of the best characterized contributors to aging is the senescent cell. Cells become senescent due to numerous causes, including exhaustive replication (replicative senescence), over-expression of oncogenes, or chronic DNA damage signalling due to un-repaired DNA. Many senescent cells switch on the expression of acidic beta-galactosidase, which is known as senescence-associated beta-galactosidase (SA-β-galactosidase). As the presence of this enzyme activity signals the senescent state of cells, SA-β-galactosidase was used as a biomarker of senescent cells.

This assay was performed using a commercially available senescence β-Galactosidase staining detection kit (Cell Signaling, #9860). Briefly, cryosections were fixed with fixative solution for 10-15 min at RT, followed by staining with fresh β-gal staining solution overnight at $37°$ C. While the β-galactosidase was still on the plate, the section was checked under a microscope (200× total magnification) for the development of the blue color.

Figure 12:
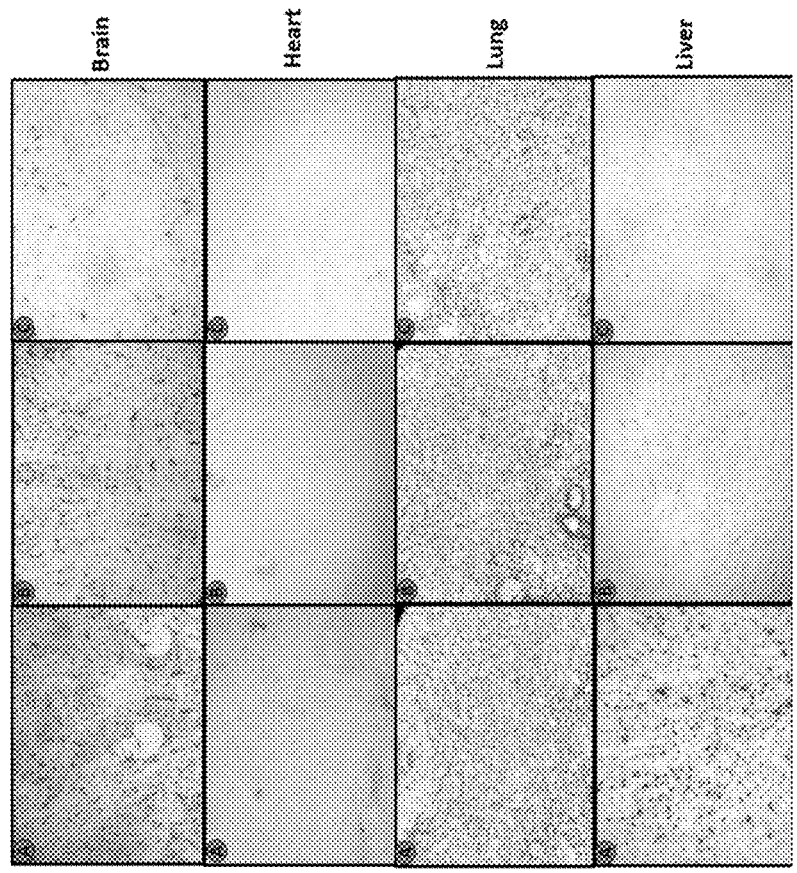
FIG. 12 shows SA-β-gal staining of brain, heart, lung and liver of old control (A), young group (C), and old animals who received treatment with a concentrated, purified plasma fraction (B) after completion of 155 days of study.

Senescent cells were stained blue when provided with SA-β-galactosidase substrate in acidic pH, and was seen in high levels in the brains and livers of old rats (FIG. 12; Old Control (A), Treatment (B), and Young Control (C)). Plasma fraction treatment reduced the level of senescent cells by a considerable degree (e.g., old treated rats compared to old control rats).

Example 14

Oil Red O Staining of Rat Tissues Following Treatment

This example demonstrates Oil red O staining of rat tissues after 155 days of plasma fraction treatment.

Excess lipid accumulation in peripheral tissues is a key feature of many metabolic disorder s. Oil red O is a lysochrome (fat-soluble) diazo-dye, and may be used for staining neutral triglycerides and lipids in frozen tissue sections or unfixed (air-dried) slides. Oil red O staining was used to identify both exogenous and endogenous lipid deposits after 155 days was plasma fraction treatment.

Figure 13:
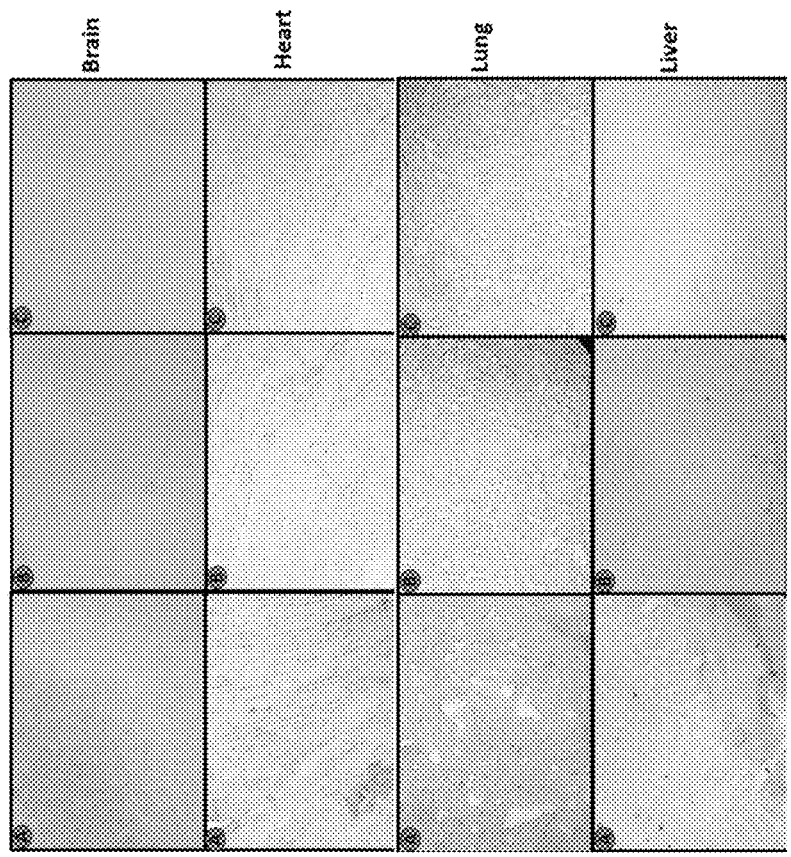
FIG. 13 shows Oil red O staining of brain, heart, lung and liver of old control (A), young group (C), and old animals who received treatment with a concentrated, purified plasma fraction (B) after completion of 155 days of study.

Cryosections (6 1 m thick) were fixed in 10% formalin for 10 min. The slides were incubated with freshly prepared Oil red O working solution for 15 min. Lipid accumulation was digitalized using a microscope. Oil red O staining showed that accumulation of fat in old tissues was reduced in old treated rats compared to old control rats, as seen in FIG. 13; Old Control (A), Treatment (B), and Young Control (C)

Example 15

Alternative Doses of Plasma Fractions Do Not Work as Effectively

In order to determine whether the most effective dosing strategy was used for the plasma fraction treatment, another study was conducted to evaluate a different dosing protocol. This example demonstrates that an alternative dosing strategy of plasma fraction is less effective in improving the age-related markers of old treated rats.

The dose of plasma fraction treatment was prepared and injected intravenously using saline as a vehicle, as described. The doses were calculated as previously described, and were administered intravenously to the animals of old treated group. The calculated exact half dose (2 injections) was administered intravenously to the female old treated group on the 1$^{st}$ and 5$^{th}$ day of the treatment schedule.

The same amount of saline solution (placebo) was administered to the animals of old control group. The parameters of this study are outlined in Table 15.

TABLE 15

Protocol of a less effective plasma fraction dosing strategy.

| Particulars | Description |
| --- | --- |
| Animals | Sprague Dawley rats |
| Age | Old rats (20 months) |
| Gender | Female |
| Grouping | Old Treated Animals (7 Animals) |
| | Old Vehicle Control Animals (7 Animals) |
| Treatment | Plasma fraction |
| Dosing time point | 1$^{st}$ day and 5$^{th}$ day |
| Evaluation Time Points | Initial 0, 4, 8, 15 and 30 days |

Plasma was separated from the blood samples of each animal and evaluated for inflammatory markers (i.e., TNF alpha and IL-6). The learning ability of animals was evaluated using the Barnes Maze apparatus at each time point after training of one week. Additionally, bodyweight, food, and water intake of the animals were monitored at each time point.

Bodyweight of the old animals, both treated and control groups, increased over a period of 30 days. There was no change observed in the food intake, however, an increase in water intake was evident in the old treated animals group. Results are summarized in Table 16.

TABLE 16

Bodyweight of both treated old rats and old control rats increases over the course of less effective plasma fraction dosing strategy.

| Group | Old control | SD | Treatment | SD |
| --- | --- | --- | --- | --- |
| 0 Day | 308.00 | 13.72 | 299.00 | 10.44 |
| 4 Day | 305.71 | 13.28 | 300.29 | 9.41 |
| 8 Day | 304.86 | 12.65 | 300.86 | 9.04 |
| 15 Day | 310.29 | 14.19 | 302.71 | 9.30 |
| 30 Day | 311.57 | 12.87 | 303.71 | 8.56 |

The learning ability of the old treated group did not increase over the treatment period as determined by a Barnes maze, compared to the old control group. Results of this assay are shown in Table 17.

TABLE 17

Learning ability of treated old rats does not change compared to old control rats over the course of a less effective plasma fraction dosing strategy.

| | Day 18 | Day 19 | Day 20 | Day 21 | Day 22 | Day 23 | Day 24 | Day 25 | Day 26 |
| --- | --- | --- | --- | --- | --- | --- | --- | --- | --- |
| Old Control | 169.43 | 166.00 | 161.71 | 154.71 | 142.86 | 121.57 | 96.29 | 87.29 | 78.43 |
| SD | 24.07 | 23.59 | 22.95 | 18.78 | 14.44 | 16.62 | 13.78 | 18.60 | 11.37 |
| Treatment | 168.29 | 167.86 | 162.00 | 136.86 | 111.29 | 93.57 | 69.57 | 54.71 | 40.86 |
| SD | 11.66 | 12.16 | 11.06 | 11.26 | 21.24 | 23.62 | 15.11 | 11.60 | 15.87 |

The levels of the anti-inflammatory markers IL-6 (pg/mL) and TNFα (pg/mL) were similarly unchanged in the old treated group compared to the old control group. Results of this assay are shown in Tables 18 & 19.

TABLE 18

IL-6 levels (pg/mL) do not change in old treated rats compared to old control rats over the course of a less effective plasma fraction dosing strategy.

| Group | Old control | SD | Treatment | SD |
| --- | --- | --- | --- | --- |
| 0 Day | 53.05 | 5.14 | 51.20 | 4.32 |
| 4 Day | 54.52 | 5.10 | 34.75 | 5.55 |
| 8 Day | 54.96 | 5.17 | 26.89 | 6.07 |
| 15 Day | 67.31 | 6.03 | 38.02 | 7.71 |
| 30 Day | 78.16 | 2.81 | 45.07 | 6.17 |

TABLE 19

TNFα levels (pg/mL) do not change in old treated rats compared to old control rats over the course of a less effective plasma fraction dosing strategy.

| Group | Old control | SD | Treatment | SD |
| --- | --- | --- | --- | --- |
| 0 Day | 145.07 | 14.31 | 146.77 | 10.39 |
| 4 Day | 148.57 | 18.25 | 122.72 | 18.73 |
| 8 Day | 146.59 | 9.91 | 93.50 | 26.45 |
| 15 Day | 149.17 | 19.52 | 113.59 | 14.41 |
| 30 Day | 147.28 | 9.28 | 138.53 | 17.66 |

The plasma fraction treatment in a single dose format administered on the 1$^{st}$ and 5$^{th}$ day of treatment, was not effective in improving age-related markers of old treated animals. Therefore, the double dosing strategy, as previously described, represents the most effective method that was tested for administered plasma fraction treatment.

Overall, plasma fraction treatment showed significant improvement in the age-related markers of old treated animals, suggesting that plasma fraction treatment may reverse age-related changes, and could be helpful in preventing age-related disorder. Further, this treatment is safe, as no abnormalities were observed in treated animals. Moreover, there was no apparent immune response of the rats to the porcine plasma fraction.

Example 16

Lifespan Extension Study of Rats

This example demonstrates the effect of purified plasma fraction treatment on lifespan extension of old rats.

Rats were procured for evaluation of treatment with the concentrated, purified plasma fraction of Example 1. Female Sprague Dawley rats of 24 months (250-300 g) were procured from the National Institute of Bioscience, Pune, India. Animals were housed in the animal house facility of NMIMS, Mumbai during the study under standard conditions (12:12 h light: dark cycles, 55-70% of relative humidity) at 22±2° C. with free access to water and standard pellet feed (Nutrimix Std-1020, Nutrivet Life Sciences, India).

A lifespan study was designed to administer a single intravenous dose of plasma fraction in divided doses. The dose was divided and administered on alternate days over a 15 day period so that animals were best able to tolerate the treatment. In this study, each group (i.e., old control and old treated group) had 8 rats.

The dose of plasma fraction treatment was prepared and injected intravenously using saline as a vehicle, as described using a Sephadex G-100 column. A total of 8 injections were administered intravenously on each alternate day for the first dosing (e.g., on day 1, 3, 5, 7, 9, 11, 13, and 15). The same amount of saline solution (placebo) was administered intravenously to the animals of old control group. Similarly, a total of 8 injections were administered intravenously on each alternate day for the second dosing beginning on day 90 (e.g., on day 90, 92, 94, 96, 98, 100, 102, and 104), while the same amount of saline solution (placebo) was administered intravenously to the animals of old control group. The parameters of this study are outlined in Table 20.

TABLE 20

Protocol of a lifespan extension study.

| Particulars | Description |
| --- | --- |
| Animals | Sprague Dawley rats |
| Age | Old rats (24 months) |
| Gender | Female |
| Grouping | Old Treated (8 Animals) |
|  | Old Control (8 Animals) |
| Treatment | Plasma Fraction |
| Dosing | Dosing was performed as shown in FIGS. 15-18. |
| Duration of study | Lifespan of animal |
| Evaluation Time Points | Evaluation was performed as shown in FIGS. 15-18. |

Figure 15:
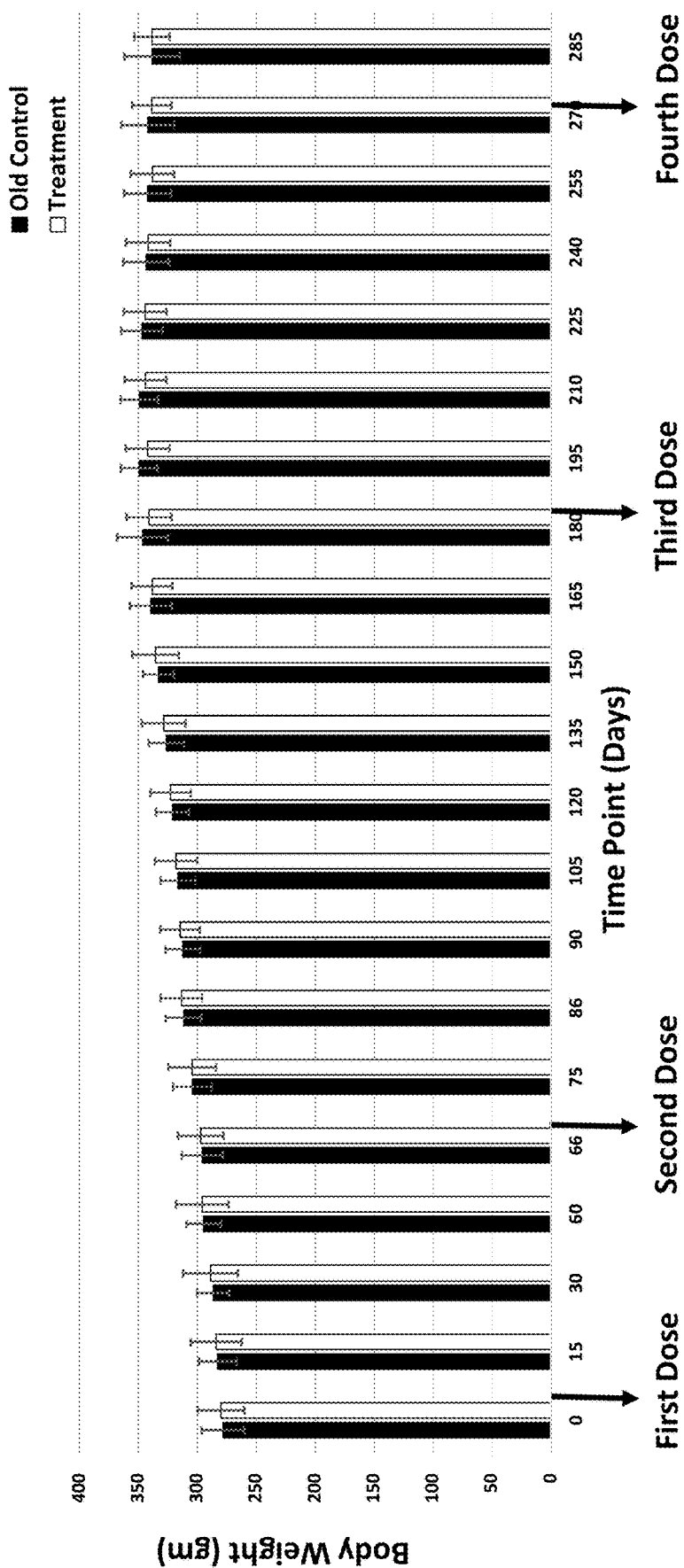
FIG. 15 shows the body weight of animals upon treatment with a concentrated, purified plasma fraction over a period of 280 days at various time points.

Bodyweight was monitored at each time point. Bodyweight of the old animals, both treated and control groups, increased over a period of 180 days. Results are shown in FIG. 15.

Figure 16:
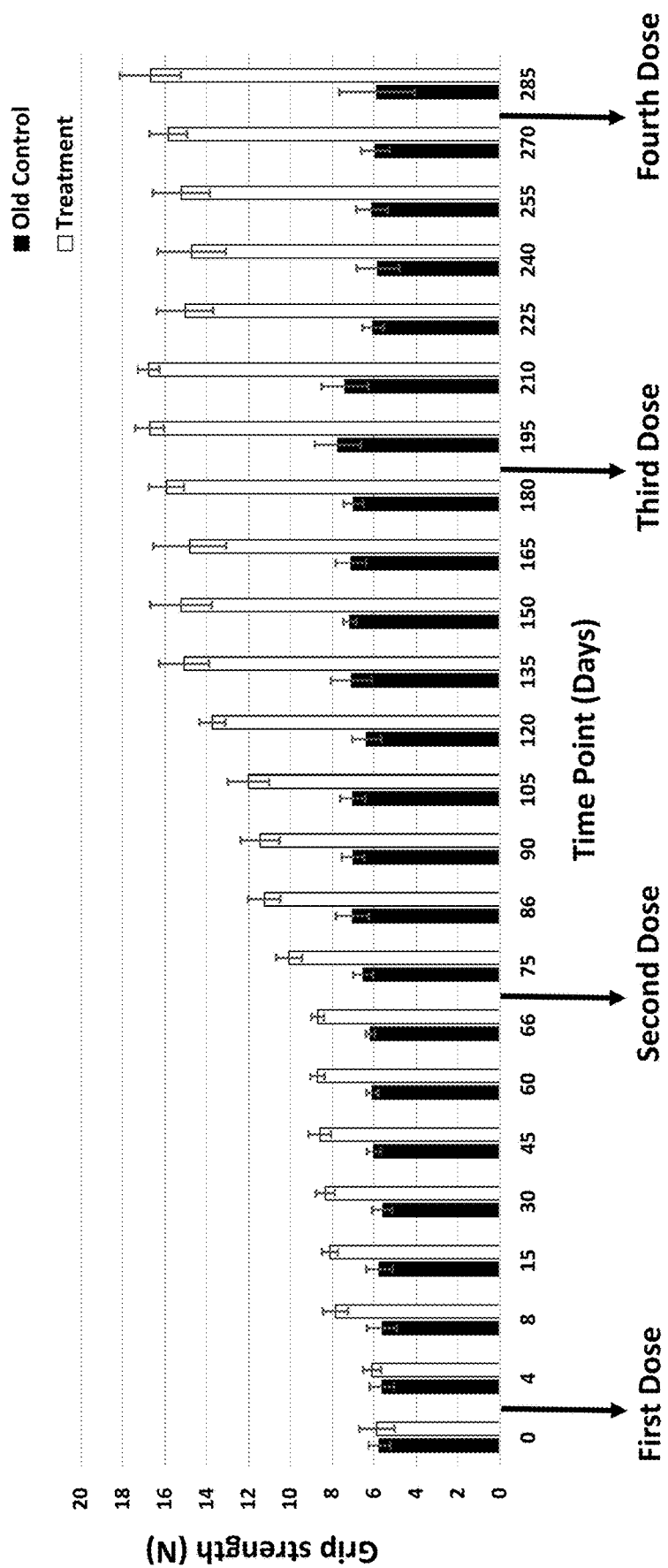
FIG. 16 shows the grip strength of old control and old animals who received treatment with a concentrated, purified plasma fraction (n=8) at various time points.

Grip strength was similarly monitored at each time point. As seen in FIG. 16, the treated old rats had increased grip strength compared to the old control following treatment.

Figure 17:
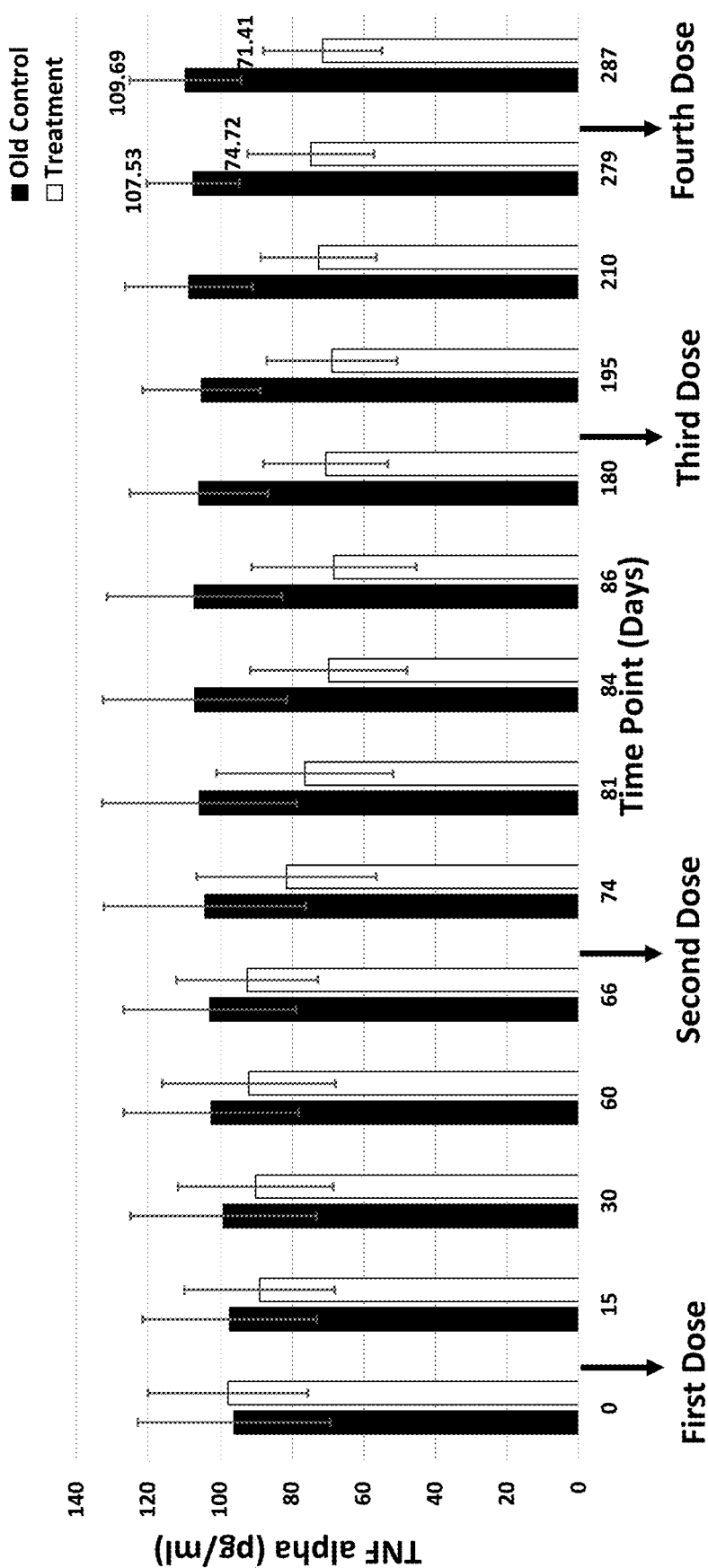
FIG. 17 shows the levels of IL-6 of old control and old animals who received treatment with a concentrated, purified plasma fraction (n=8) at various time points.
Figure 18:
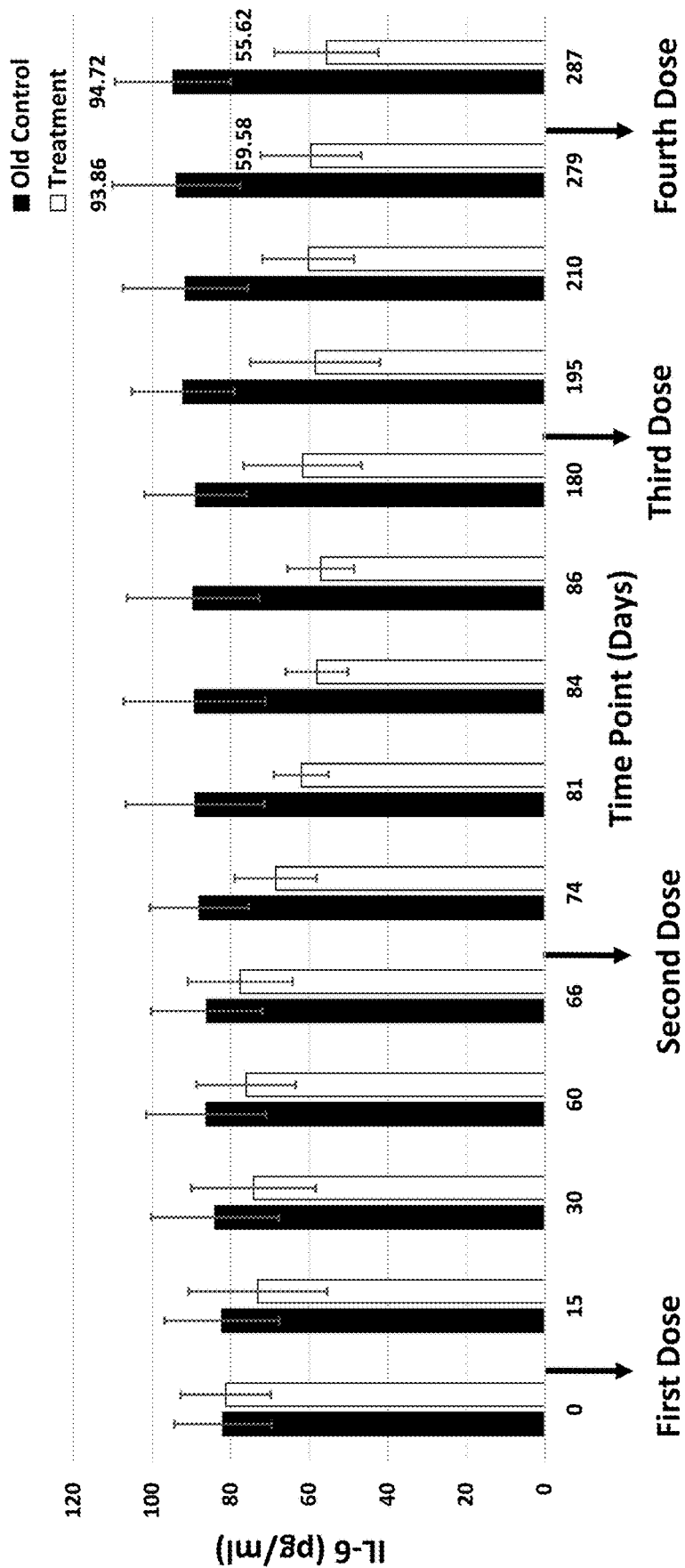
FIG. 18 shows the levels of TNFα of old control and old animals who received treatment with a concentrated, purified plasma fraction (n=8) at various time points.

Plasma was separated from the blood samples of each animal and evaluated for inflammatory markers (i.e., TNFα and IL-6). The levels of the anti-inflammatory markers IL-6 (pg/mL) and TNFα (pg/mL) were lower in the old treated group compared to the old control group. Results of these assay are shown in FIGS. 17 and 18. Specifically, the levels of TNFα were 74.72 pg/mL and 71.41 pg/mL at day 279 and 287, respectively, in old treated rats, whereas the levels of TNFα were 107.53 pg/mL and 109.69 pg/mL at day 279 and 287, respectively, in old control rats (FIG. 17). The levels of IL-6 were 59.58 pg/mL and 55.62 pg/mL at day 279 and 287, respectively, in old treated rats, whereas the levels of IL-6 were 93.86 pg/mL and 94.72 pg/mL at day 279 and 287, respectively, in old control rats (FIG. 17).

7 animals from the old control group survived the duration of the study, whereas 8 animals from the old treated group survived the duration of the study. Overall, the plasma fraction treatment showed significant improvement in the age-related markers of old treated animals, suggesting that plasma fraction treatment may reverse age-related changes, and could be helpful in extending lifespan. Further, this treatment is safe, as no abnormalities were observed in treated animals. Moreover, there was no apparent immune response of the rats to the porcine plasma fraction.

The invention claimed is:

1. A method of reducing levels of IL-6 or TNFα in a recipient mammal in need thereof, comprising:
administering to the recipient mammal a pharmaceutical composition comprising a concentrated, purified plasma fraction obtained from a donor,
wherein the concentrated, purified plasma fraction obtained from the donor: (a) is purified of immunogenic components comprising platelets and HLA presenting cells, wherein the concentrated, purified plasma fraction comprises less than 1% concentration by volume of platelets, (b) is suitable for cross-mammalian administration, and (c) comprises exosomes concentrated at least 10-fold compared to the exosome concentration in the plasma from the donor, and
wherein the recipient mammal is an adult or geriatric mammal, wherein the recipient mammal is not immunocompromised, and the donor is a juvenile or adolescent mammal of a different species than the recipient mammal.

2. The method of claim 1, wherein the concentrated, purified plasma fraction is concentrated from an initial volume of plasma from the donor that is at least equal to the total plasma volume of the recipient mammal.

3. The method of claim 1, wherein the pharmaceutical composition is administered intravenously, transdermally, nasally, or transmucusoly.

4. The method of claim 1, wherein the recipient mammal has a functioning immune system.

5. The method of claim 1, wherein the concentrated, purified plasma fraction comprises exosomes concentrated at least 12 fold compared to the exosome concentration in the plasma from the donor.

6. The method of claim 1, wherein the concentrated, purified plasma fraction comprises exosomes concentrated at least 14 fold compared to exosome concentration in the plasma from the donor.

7. The method of claim 1, wherein the concentrated, purified plasma fraction comprises exosomes concentrated at least 16 fold compared to exosome concentration in the plasma from the donor.

8. The method of claim 1, wherein the concentrated, purified plasma fraction comprises exosomes concentrated at least 20 fold compared to exosome concentration in the plasma from the donor.

9. The method of claim 1, wherein the recipient mammal is a human, dog, horse, cat, rabbit, mouse, gerbil, or hamster.

10. The method of claim 9, wherein the recipient mammal is a human that is at least 18 years old.

11. The method of claim 9, wherein the recipient mammal is a human that is a geriatric human.

12. The method of claim 9, wherein the recipient mammal is a human that is older than 65 years old.

13. The method of claim 1, wherein the donor is selected from the group consisting of pig, sheep, goat and human.

14. The method of claim 1, wherein the donor's age is at most half of the recipient mammal's expected life span.

15. The method of claim 1, wherein the donor is a non-human mammal less than 18 months old.

16. The method of claim 1, wherein the pharmaceutical composition is administered to the recipient mammal at least twice.

17. The method of claim 1, wherein the pharmaceutical composition comprises one or more of exomeres, and non-membrane bound proteins.

18. The method of claim 1, wherein the pharmaceutical composition comprises one or more of CD63, CD81, and CD9.

* * * * *